(12) United States Patent
Liu et al.

(10) Patent No.: US 12,085,751 B2
(45) Date of Patent: Sep. 10, 2024

(54) SEMICONDUCTOR DEVICE AND METHODS OF FORMATION

(71) Applicant: Taiwan Semiconductor Manufacturing Company, Ltd., Hsinchu (TW)

(72) Inventors: Wei-kang Liu, Taichung (TW); Chih-Tsung Shih, Hsinchu (TW); Hau-Yan Lu, Hsinchu (TW); YingKit Felix Tsui, Cupertino, CA (US); Lee-Shian Jeng, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/811,381

(22) Filed: Jul. 8, 2022

(65) Prior Publication Data

US 2024/0012199 A1  Jan. 11, 2024

(51) Int. Cl.
*G02B 6/12* (2006.01)
*G02B 6/122* (2006.01)
(Continued)

(52) U.S. Cl.
CPC ............ *G02B 6/122* (2013.01); *G02B 6/131* (2013.01); *G02B 6/1347* (2013.01); *G02B 6/136* (2013.01);
(Continued)

(58) Field of Classification Search
CPC .......... G02B 6/243; G02B 2006/12126; G02B 2006/12188
See application file for complete search history.

(56) References Cited

U.S. PATENT DOCUMENTS 3,542,536 A * 11/1970 Flam et al. ............... G02B 6/13
   333/239
3,897,276 A *  7/1975 Kondo ..................... H01L 29/00
   148/33.5
(Continued)

FOREIGN PATENT DOCUMENTS

GB        2383644 A  *  7/2003
JP    2004-109784 A  *  4/2004
(Continued)

OTHER PUBLICATIONS

W.K. Burns et al. Applications of ion implantation to integrated optical spectrum analyzers. Optics Letters, 5:2:45-47, Feb. 1980. (https://doi.org/10.1364/OL.5.000045) (Year: 1980).*
(Continued)

*Primary Examiner* — Michael Stahl
(74) *Attorney, Agent, or Firm* — Harrity & Harrity, LLP

(57) ABSTRACT

Some implementations described herein include a photonics integrated circuit device including a photonics structure. The photonics structure includes a waveguide structure and an optical attenuator structure. In some implementation, the optical attenuator structure is formed on an end region of the waveguide structure and includes a metal material or a doped material. In some implementations, the optical attenuator structure includes a gaussian doping profile within a portion of the waveguide structure. The optical attenuator structure may absorb electromagnetic waves at the end of the waveguide structure with an efficiency that is improved relative to a spiral optical attenuator structure or metal cap optical attenuator structure.

20 Claims, 54 Drawing Sheets

(51) Int. Cl.
*G02B 6/13* (2006.01)
*G02B 6/134* (2006.01)
*G02B 6/136* (2006.01)

(52) U.S. Cl.
CPC .............. *G02B 2006/12061* (2013.01); *G02B 2006/12126* (2013.01); *G02B 2006/12169* (2013.01); *G02B 2006/12173* (2013.01); *G02B 6/1342* (2013.01)

(56) References Cited

U.S. PATENT DOCUMENTS

| | | | | |
|---|---|---|---|---|
| 4,348,074 | A * | 9/1982 | Burns | G02F 1/125 324/76.36 |
| 4,585,299 | A * | 4/1986 | Strain | G02B 6/1347 216/2 |
| 4,840,816 | A * | 6/1989 | Appleton | G02B 6/1347 385/132 |
| 4,934,774 | A * | 6/1990 | Kalnitsky | G02B 6/1347 385/14 |
| 5,463,705 | A * | 10/1995 | Clauberg | G02B 6/125 385/38 |
| 5,483,609 | A * | 1/1996 | Nakaya | G02B 6/136 385/11 |
| 6,115,518 | A * | 9/2000 | Clapp | G02B 6/124 385/37 |
| 6,169,825 | B1 * | 1/2001 | Morey | G02B 6/126 385/11 |
| 6,298,178 | B1 * | 10/2001 | Day | G02B 6/125 385/129 |
| 6,816,648 | B2 * | 11/2004 | Goldstein | G02B 6/132 359/569 |
| 2003/0185534 | A1 * | 10/2003 | Kaneko | G02B 6/42 385/129 |
| 2007/0041691 | A1 * | 2/2007 | Tran | G02B 6/136 385/129 |
| 2010/0327385 | A1 * | 12/2010 | Shiba | H01L 31/105 257/E31.127 |
| 2012/0219249 | A1 * | 8/2012 | Pitwon | G02B 6/138 427/163.2 |
| 2014/0105544 | A1 * | 4/2014 | Ushida | G02B 6/12 385/77 |
| 2015/0192735 | A1 * | 7/2015 | Ellis-Monaghan | G02B 6/125 427/163.2 |
| 2017/0038529 | A1 * | 2/2017 | Takahashi | G02B 6/126 |
| 2017/0038532 | A1 * | 2/2017 | Dumais | G02B 6/243 |
| 2019/0025504 | A1 * | 1/2019 | Tsujita | G02B 6/138 |
| 2019/0129095 | A1 * | 5/2019 | Nguyen | G02B 6/243 |
| 2019/0212498 | A1 * | 7/2019 | Fathololoumi | G02B 6/327 |
| 2021/0223473 | A1 | 7/2021 | Bian et al. | |
| 2022/0019097 | A1 * | 1/2022 | Chen | G02B 6/4266 |
| 2024/0004131 | A1 * | 1/2024 | Liu | G02B 6/136 |
| 2024/0004134 | A1 * | 1/2024 | Tang | G02B 6/243 |

FOREIGN PATENT DOCUMENTS

| | | | |
|---|---|---|---|
| JP | 2009-49073 A | * | 3/2009 |
| JP | 2010186132 A | | 8/2010 |
| JP | 5321809 B2 | * | 7/2013 |
| WO | WO 02/25334 A1 | * | 3/2002 |

OTHER PUBLICATIONS

C.K. Sze. Optical waveguides in GaAs by MeV ion implantation. Master's Thesis, Department of Electronic Engineering, The Chinese University of Hong Kong, dated Jun. 1994. (retrieved via https://core.ac.uk/download/pdf/48546994.pdf) (Year: 1994).*

* cited by examiner

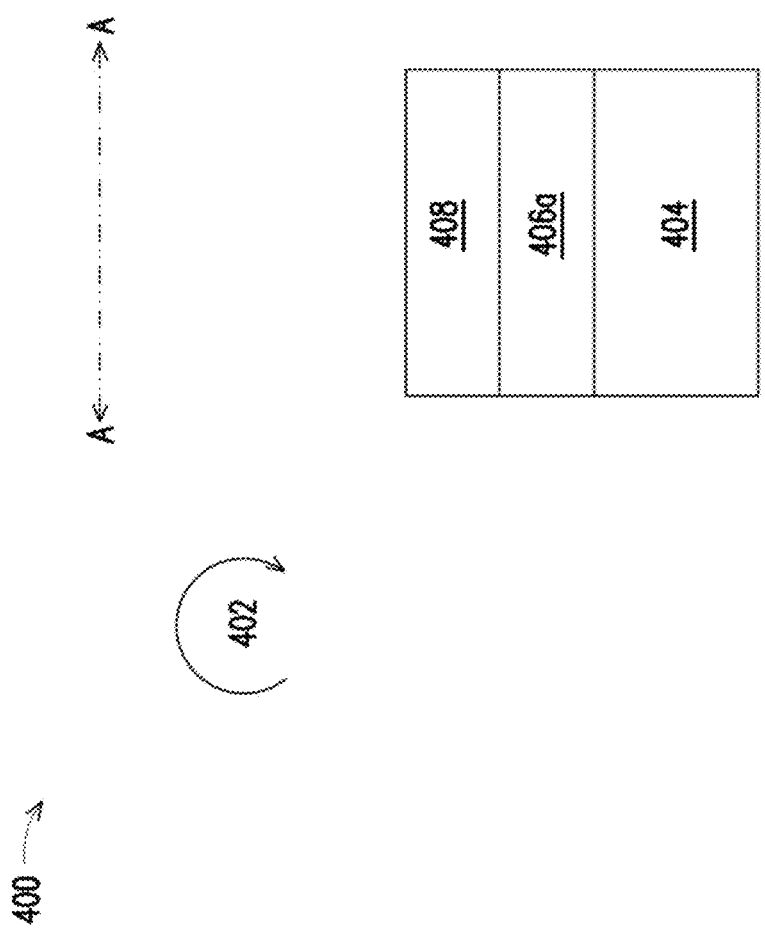

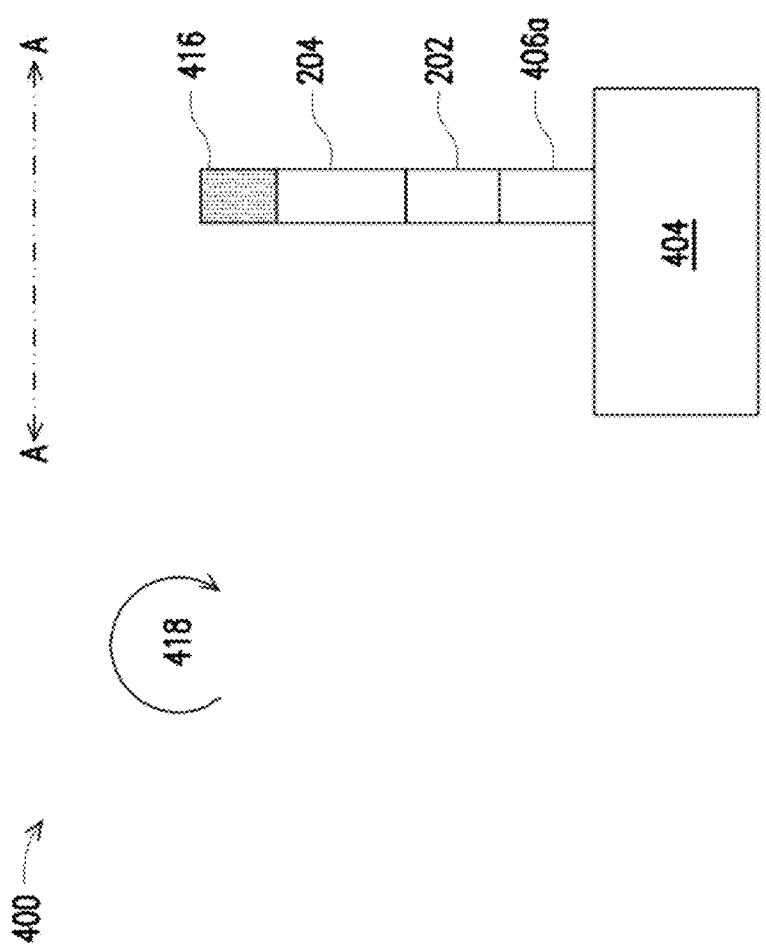

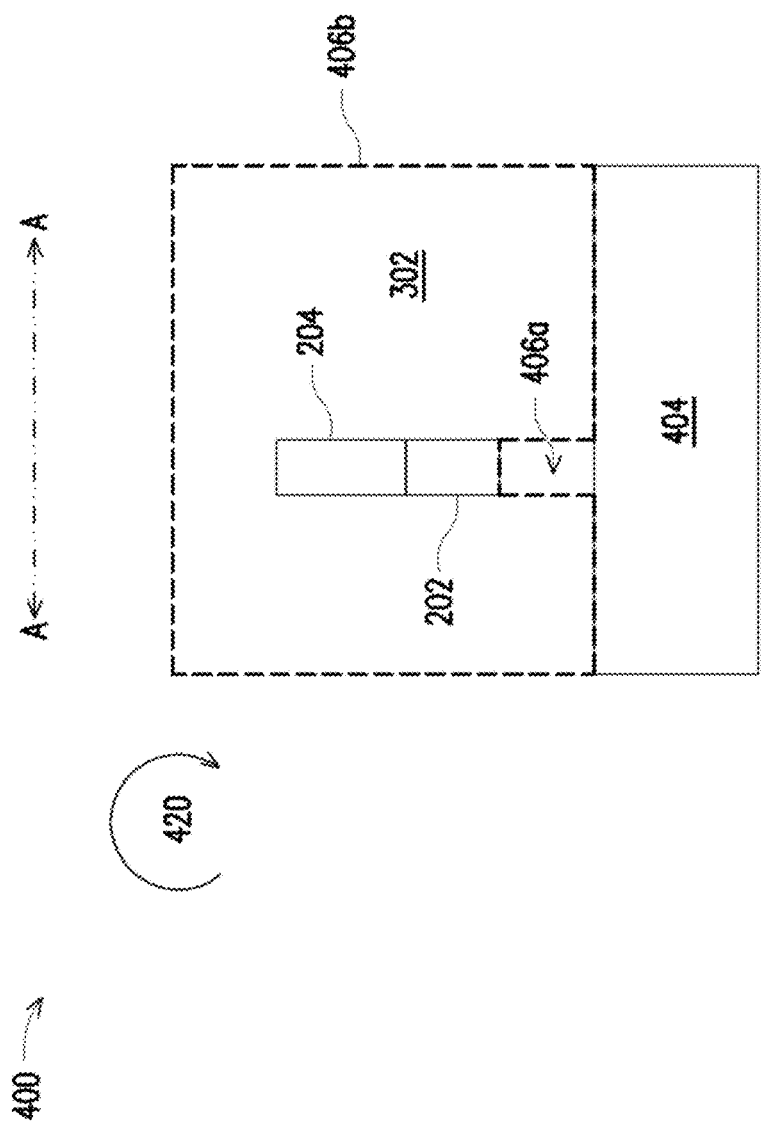

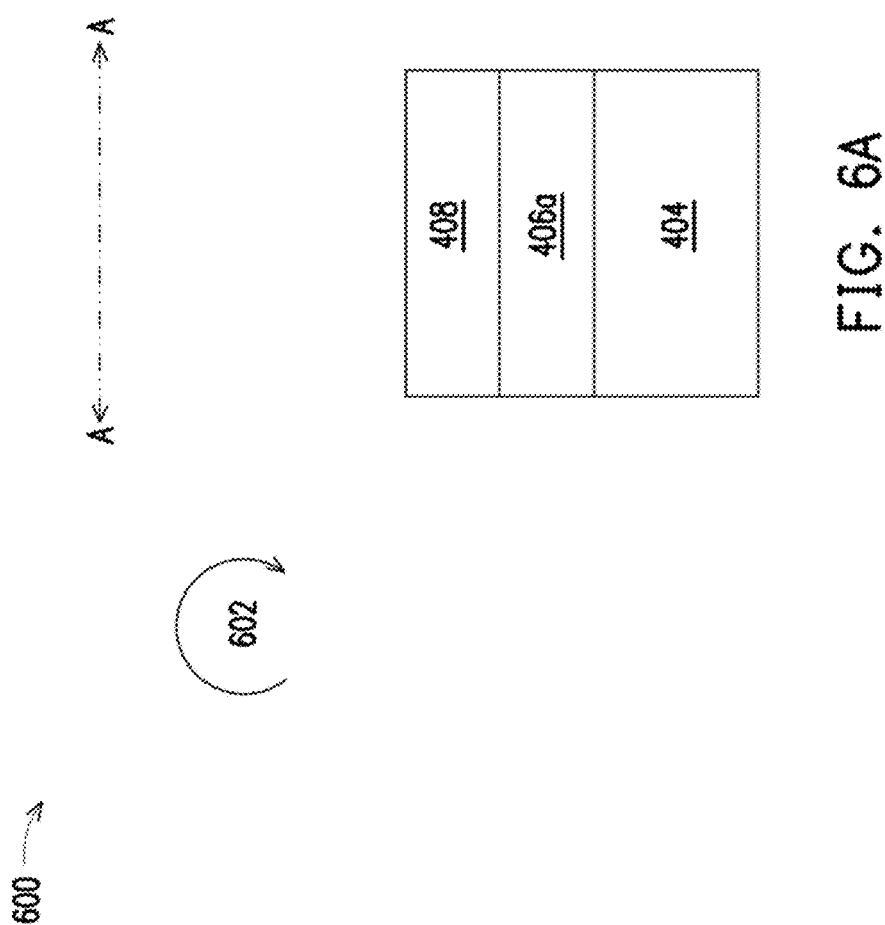

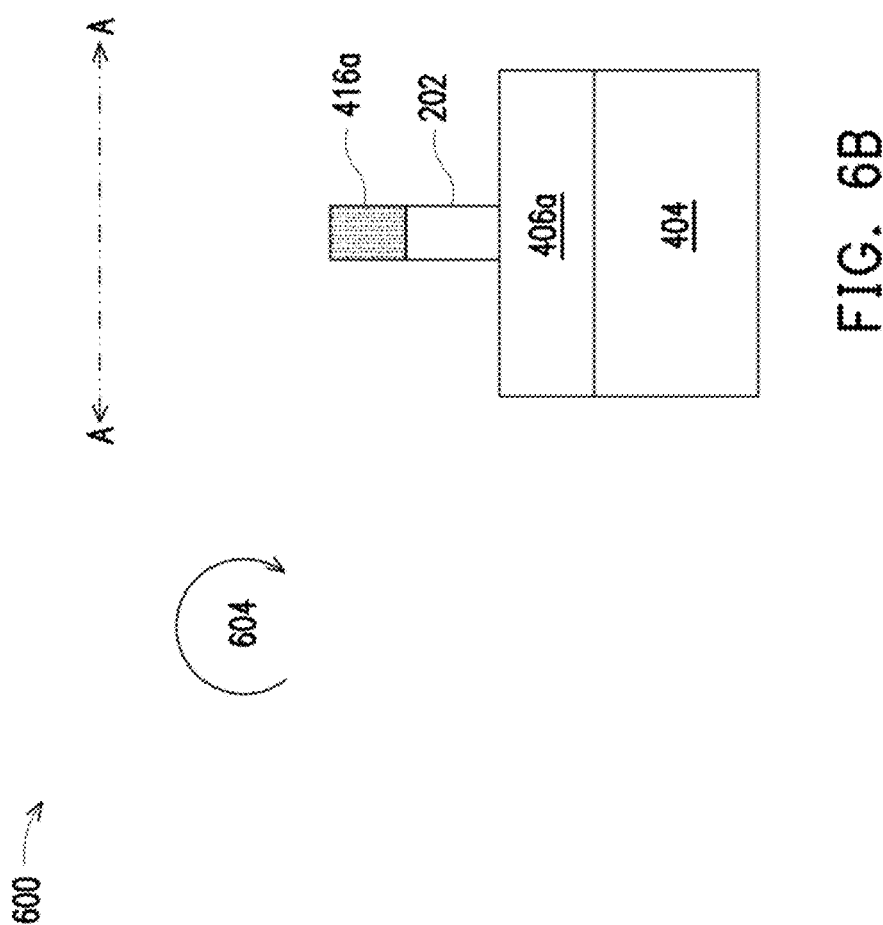

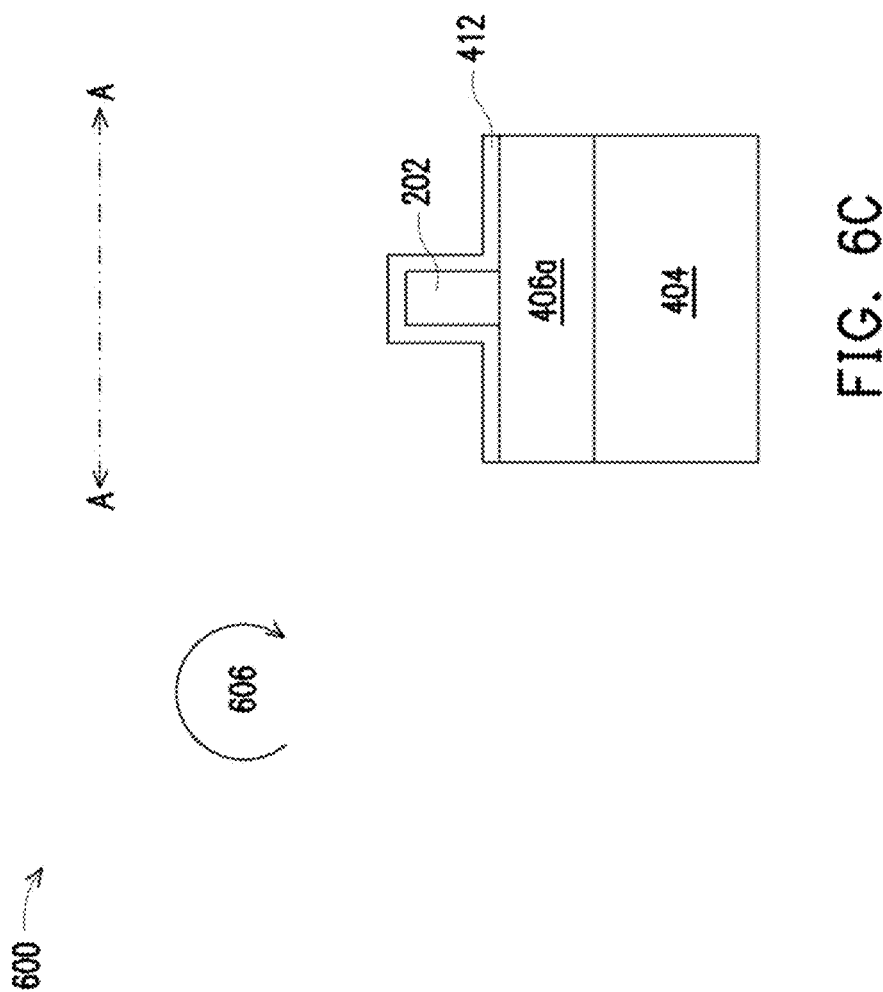

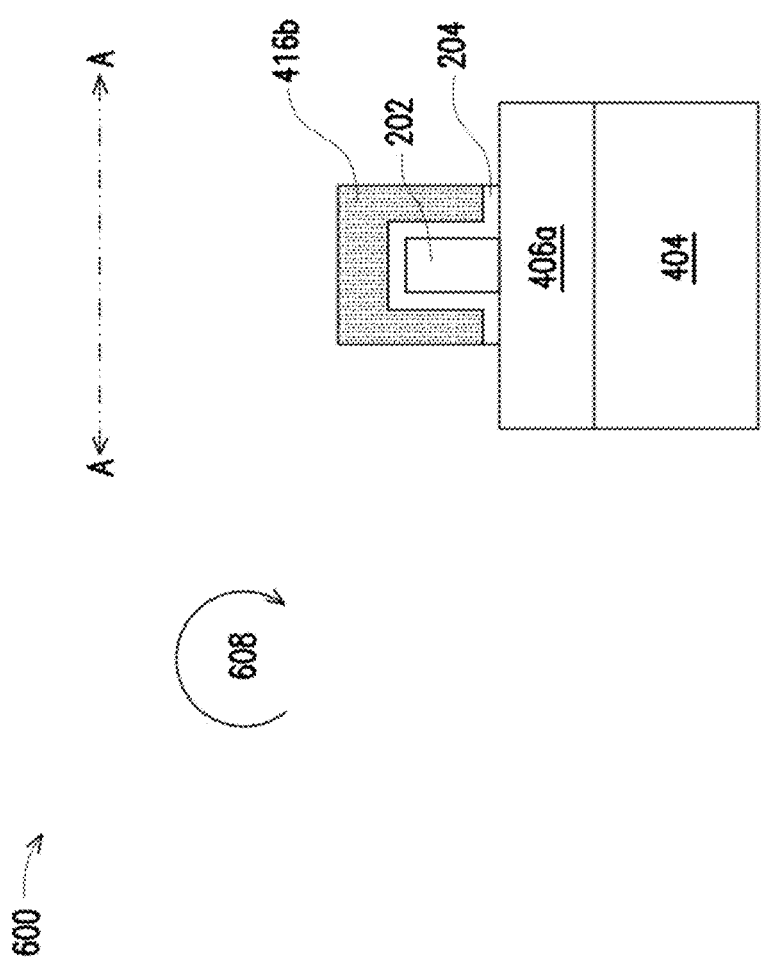

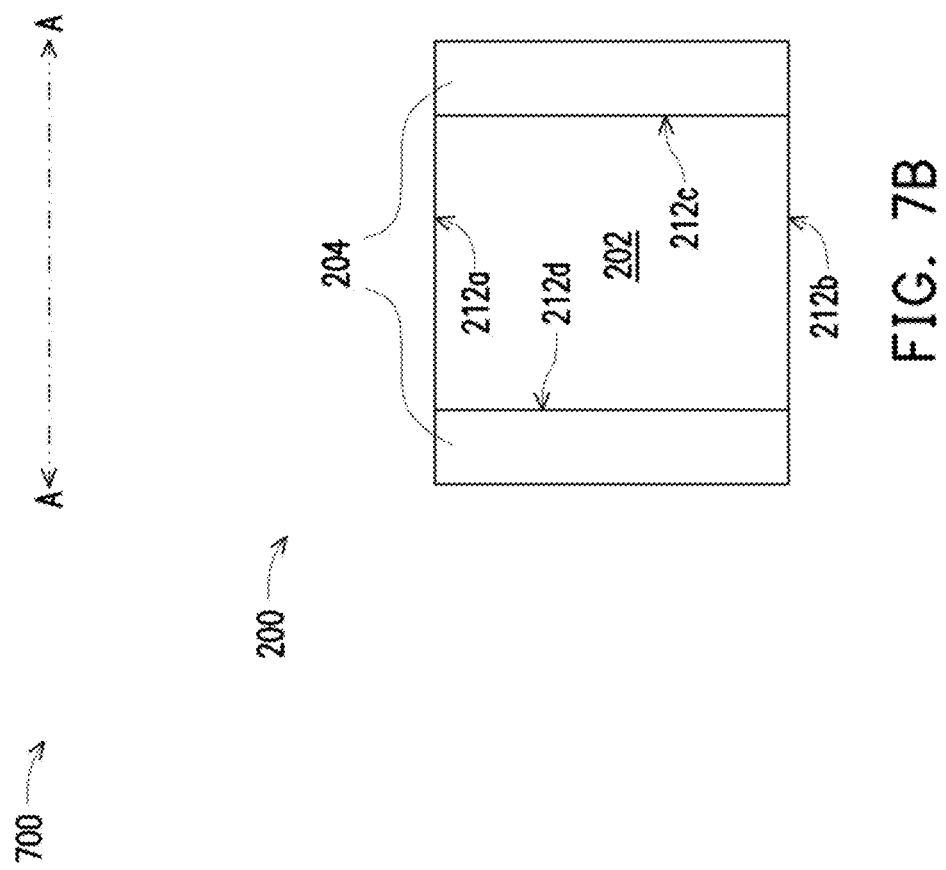

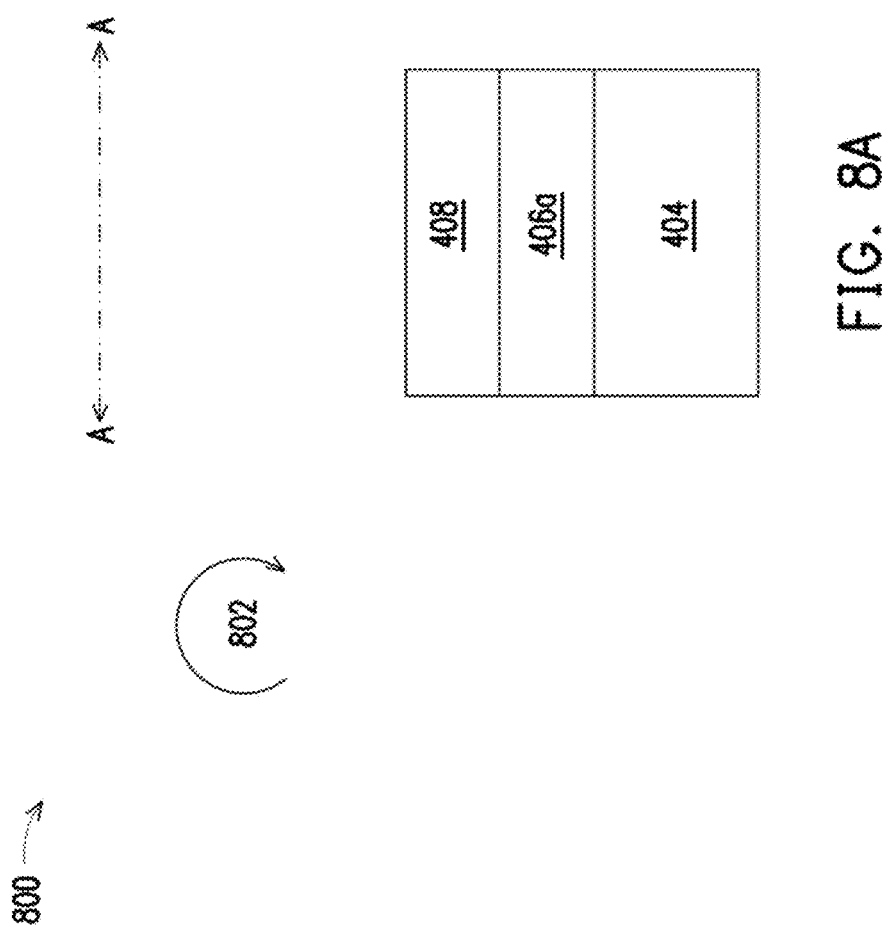

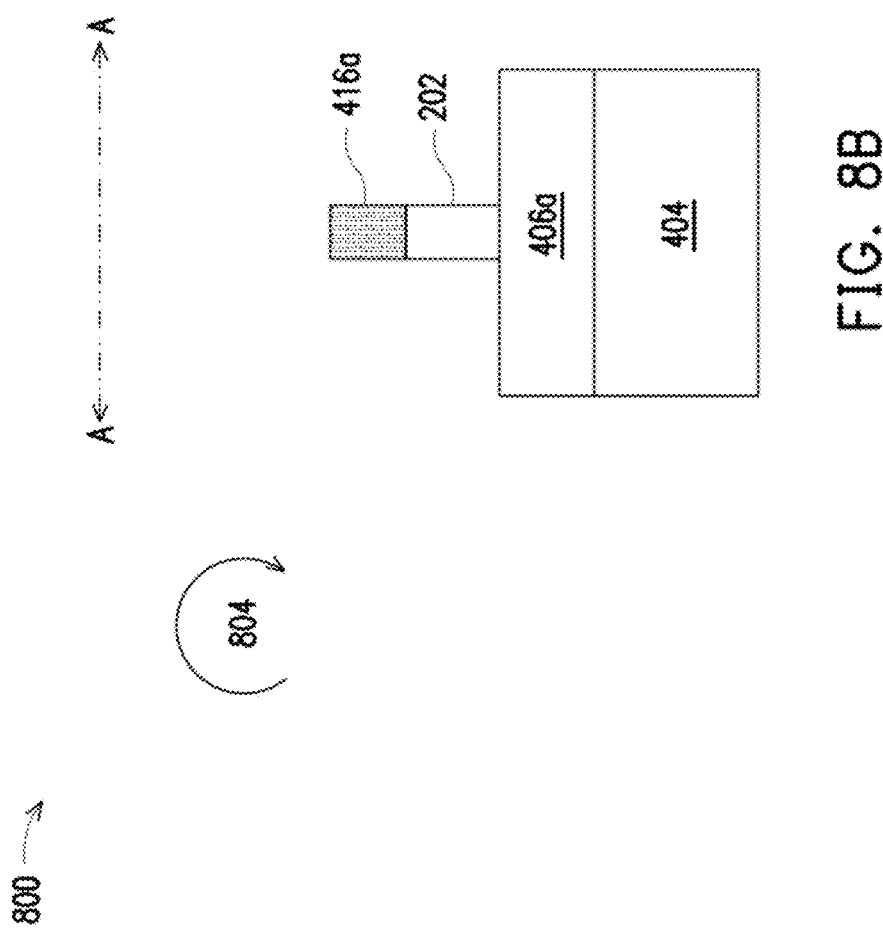

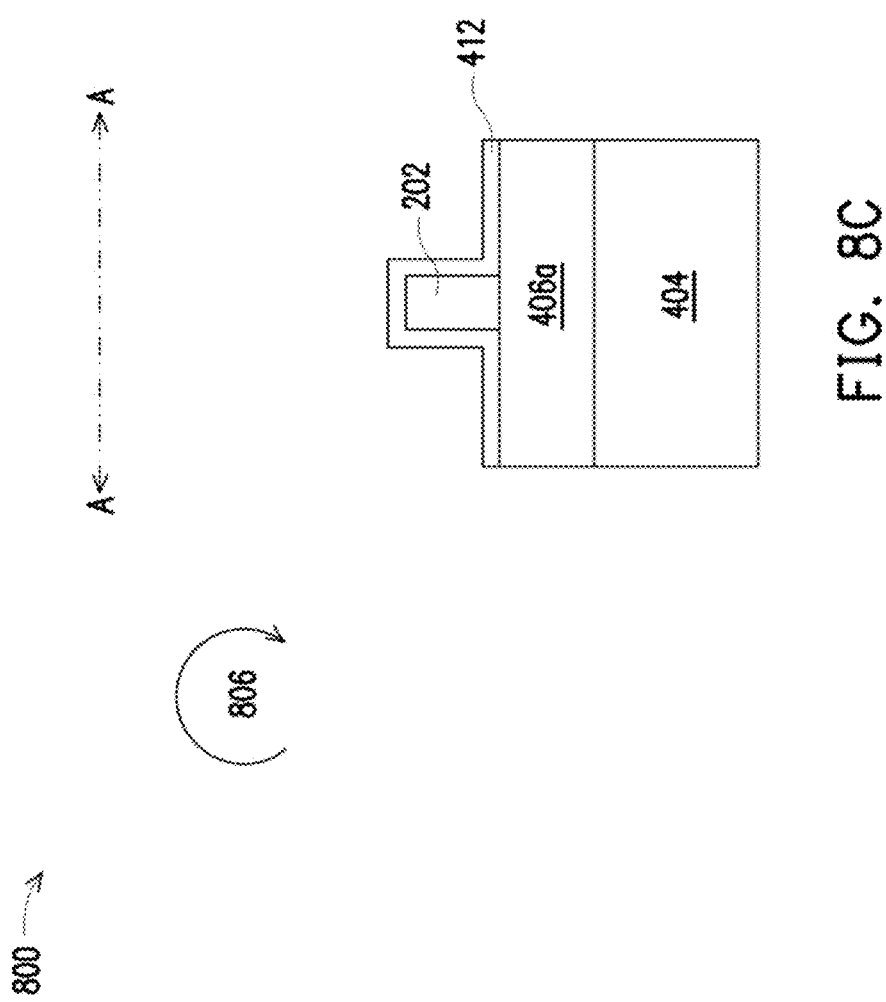

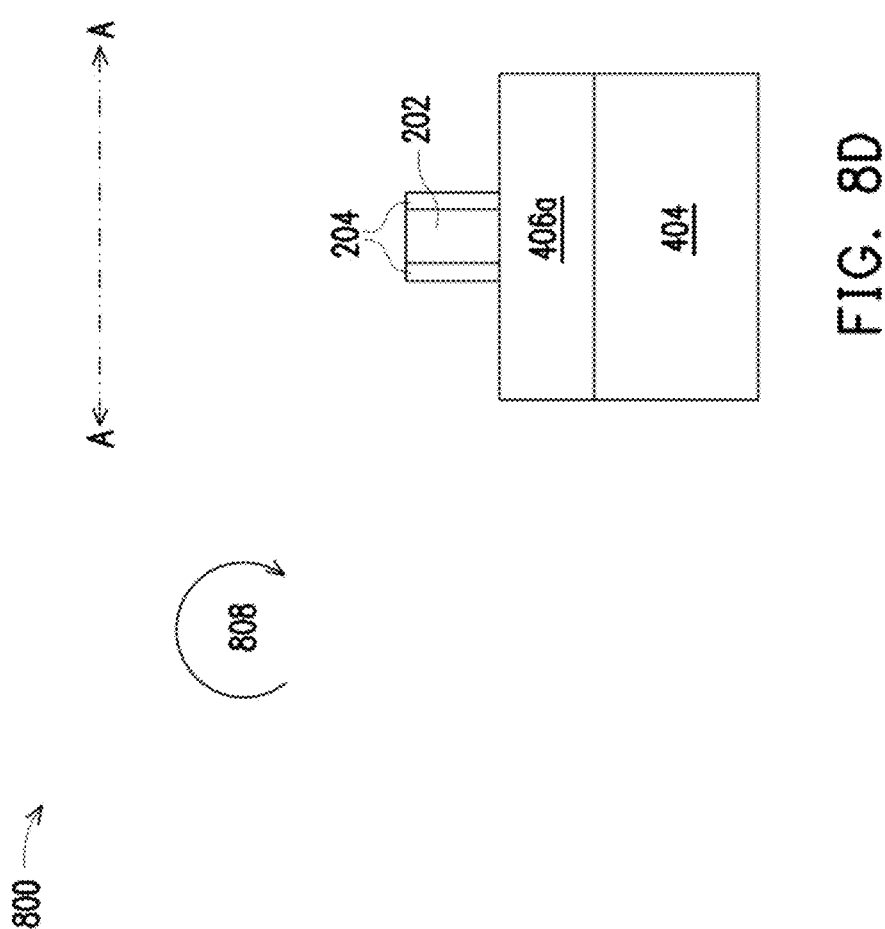

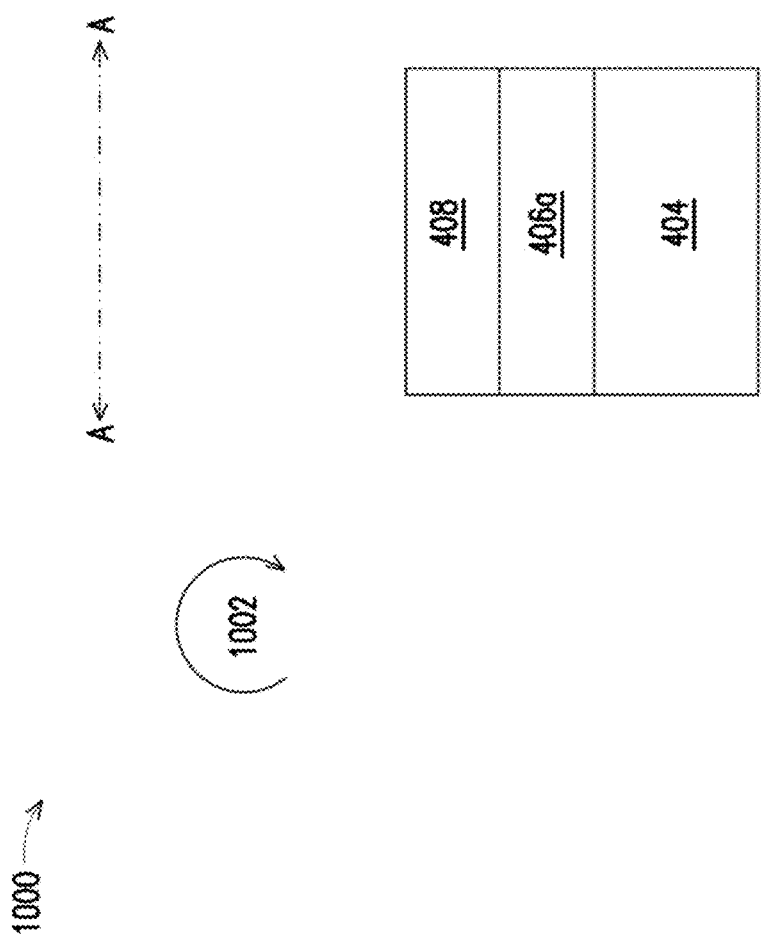

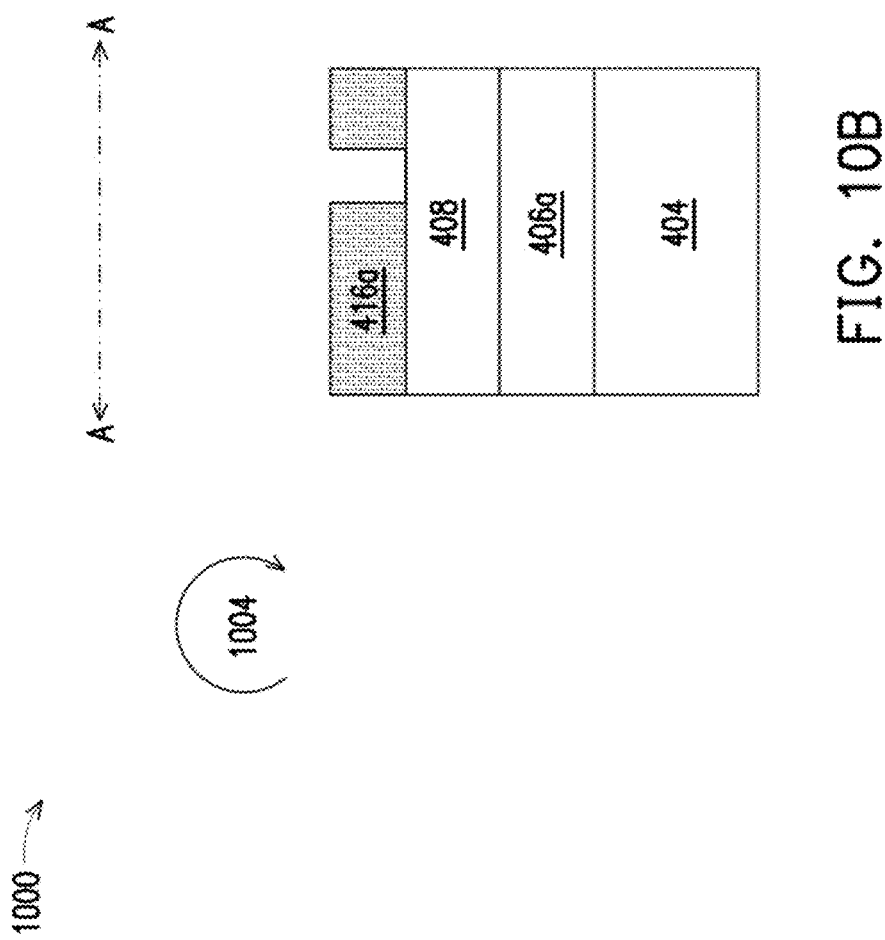

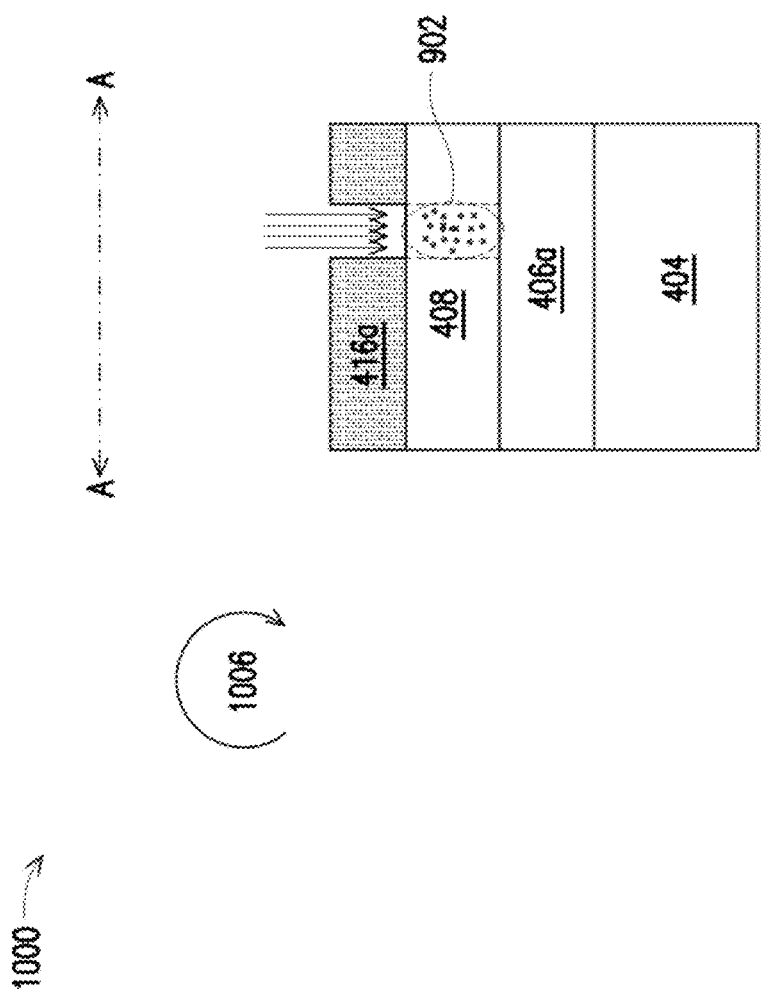

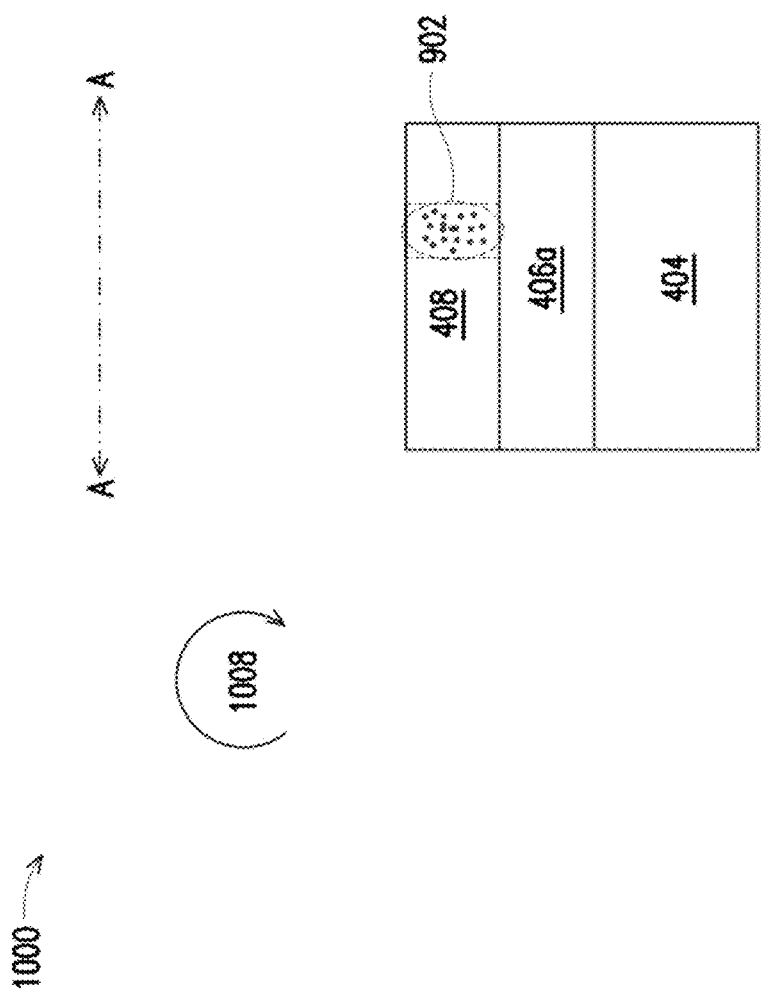

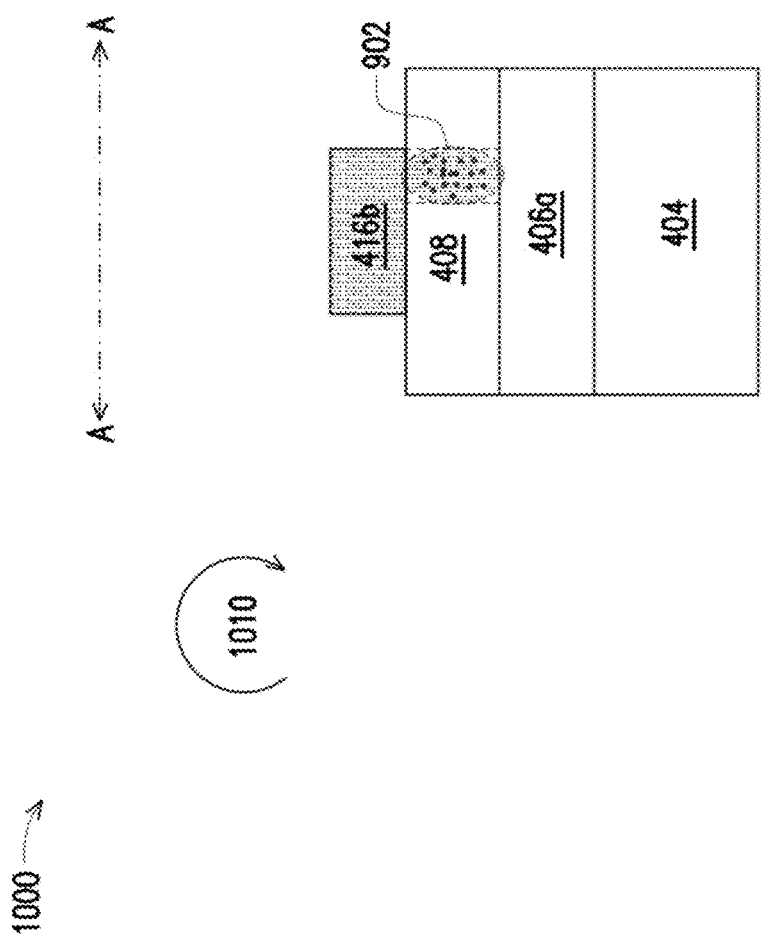

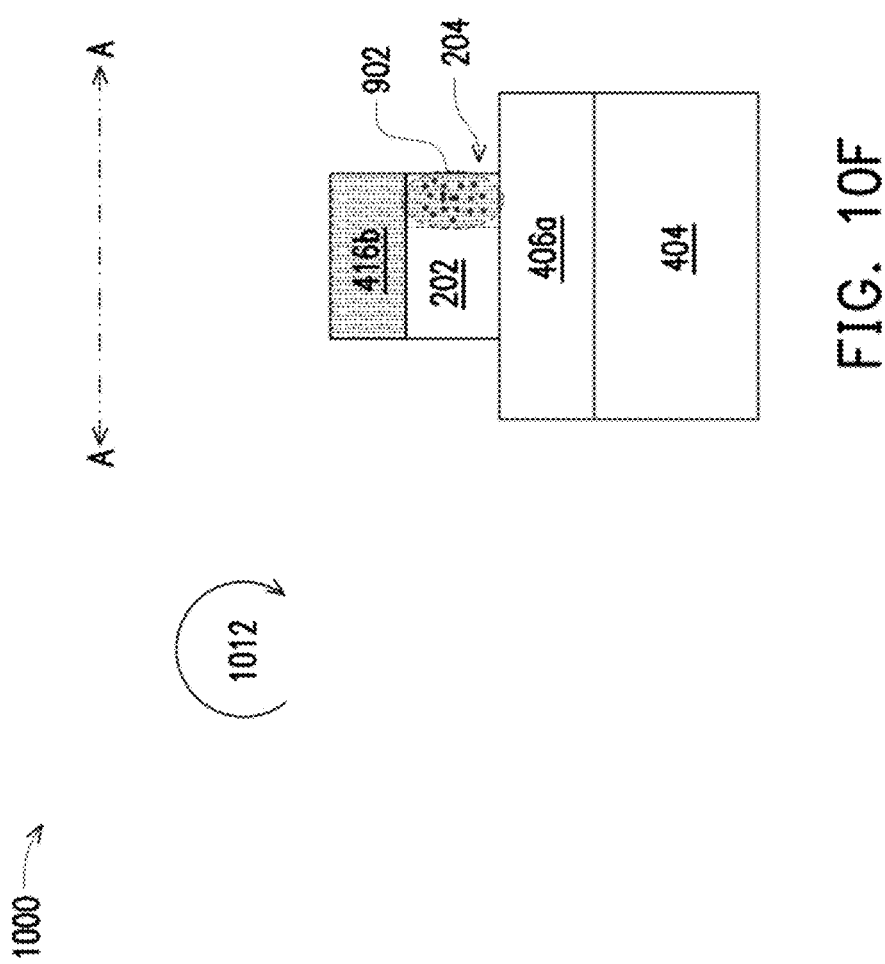

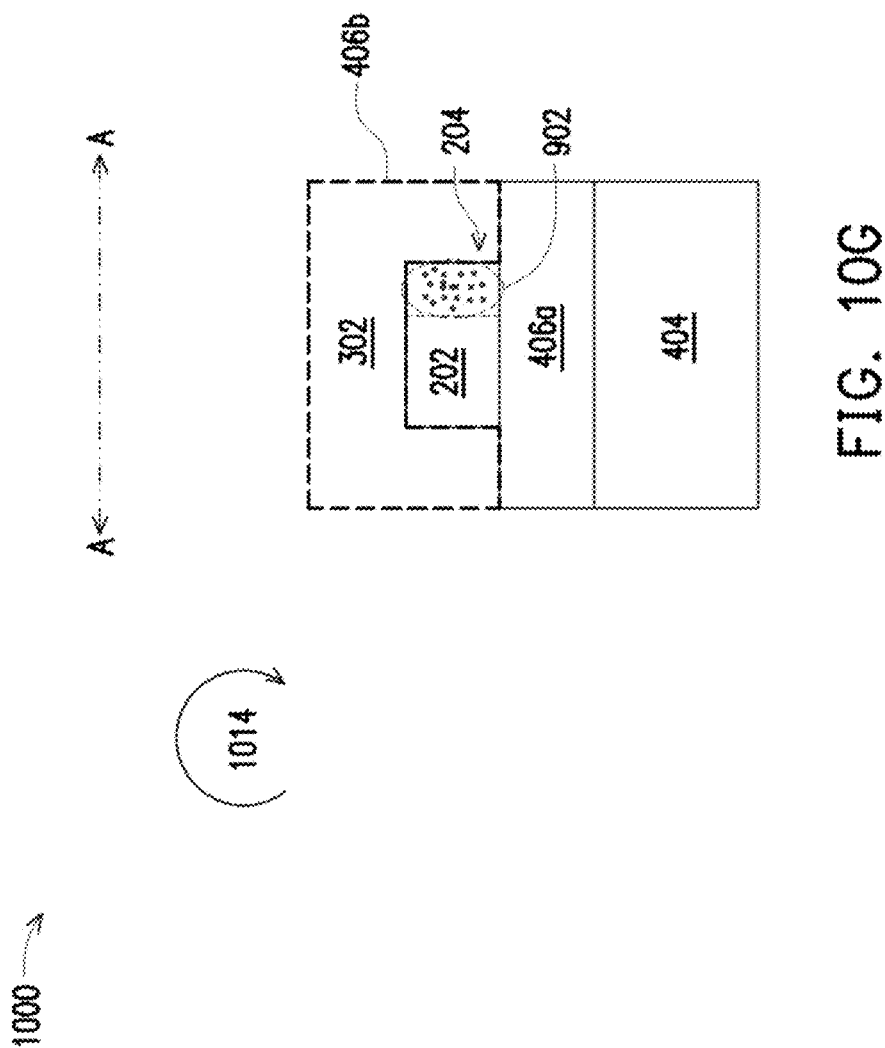

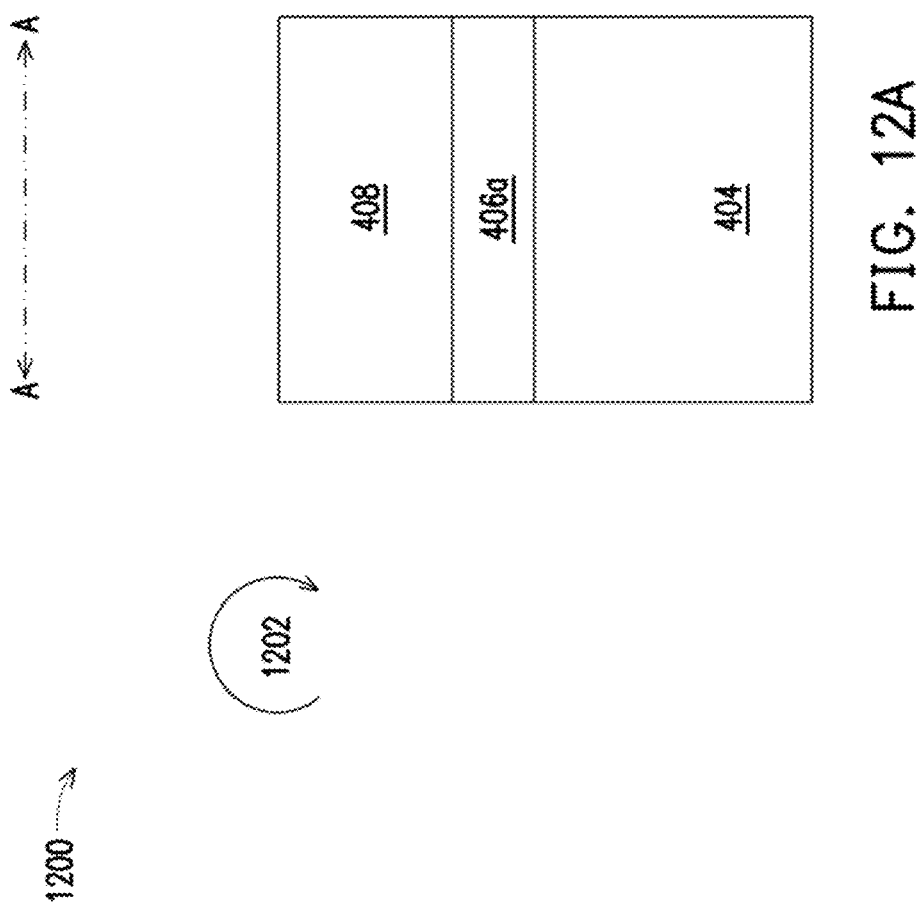

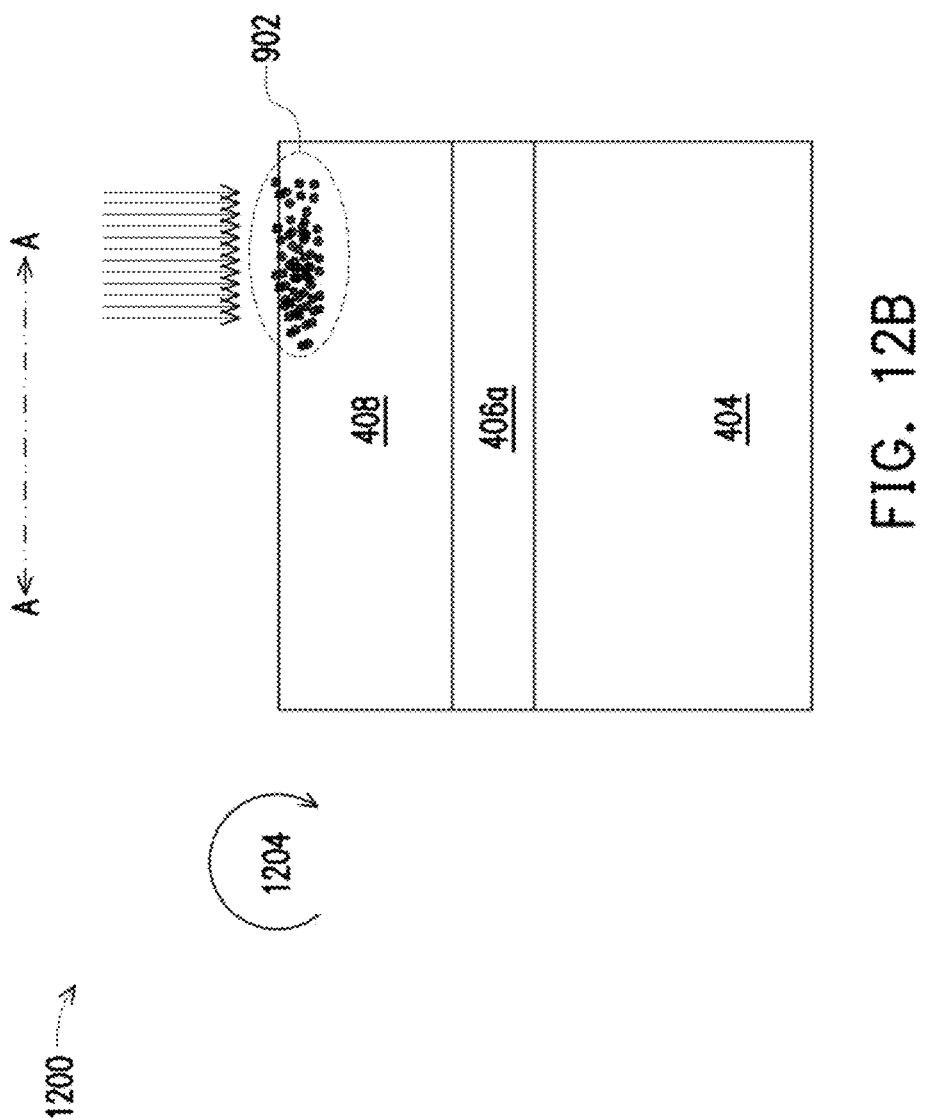

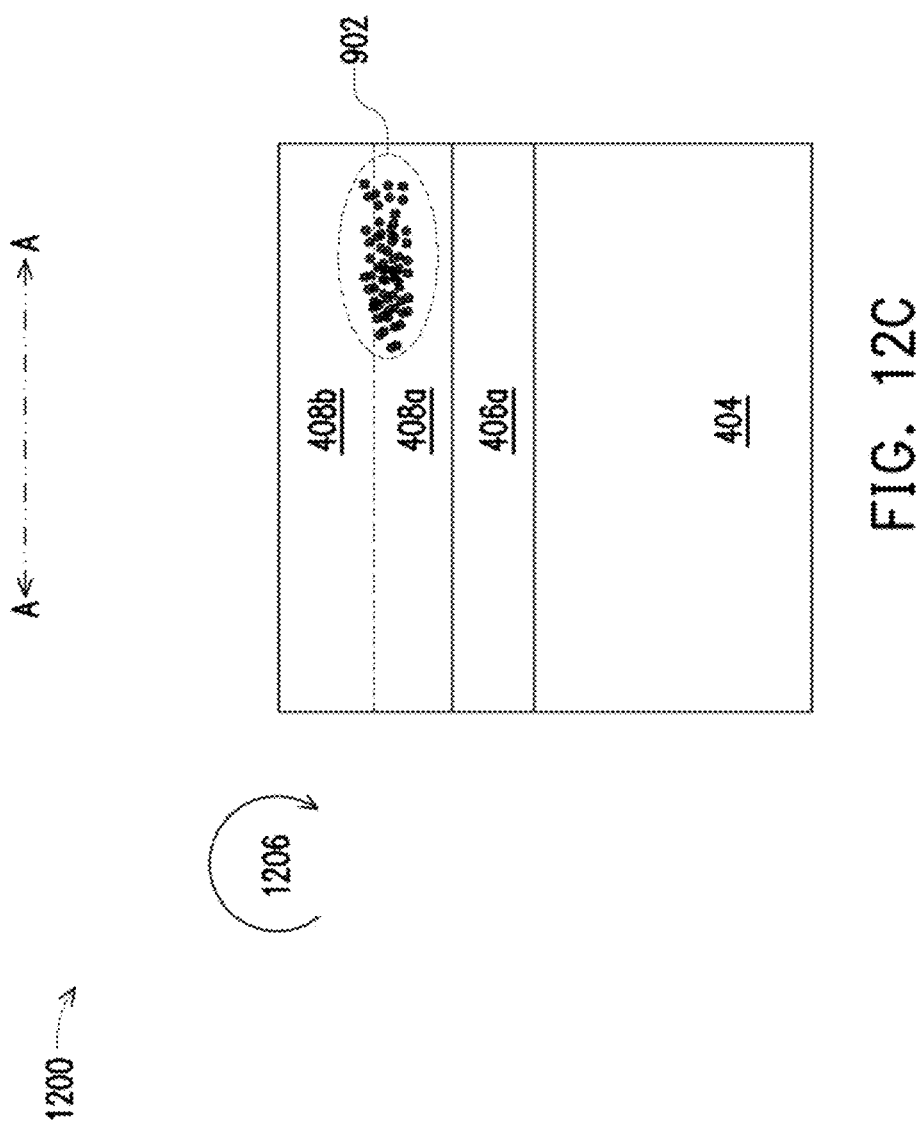

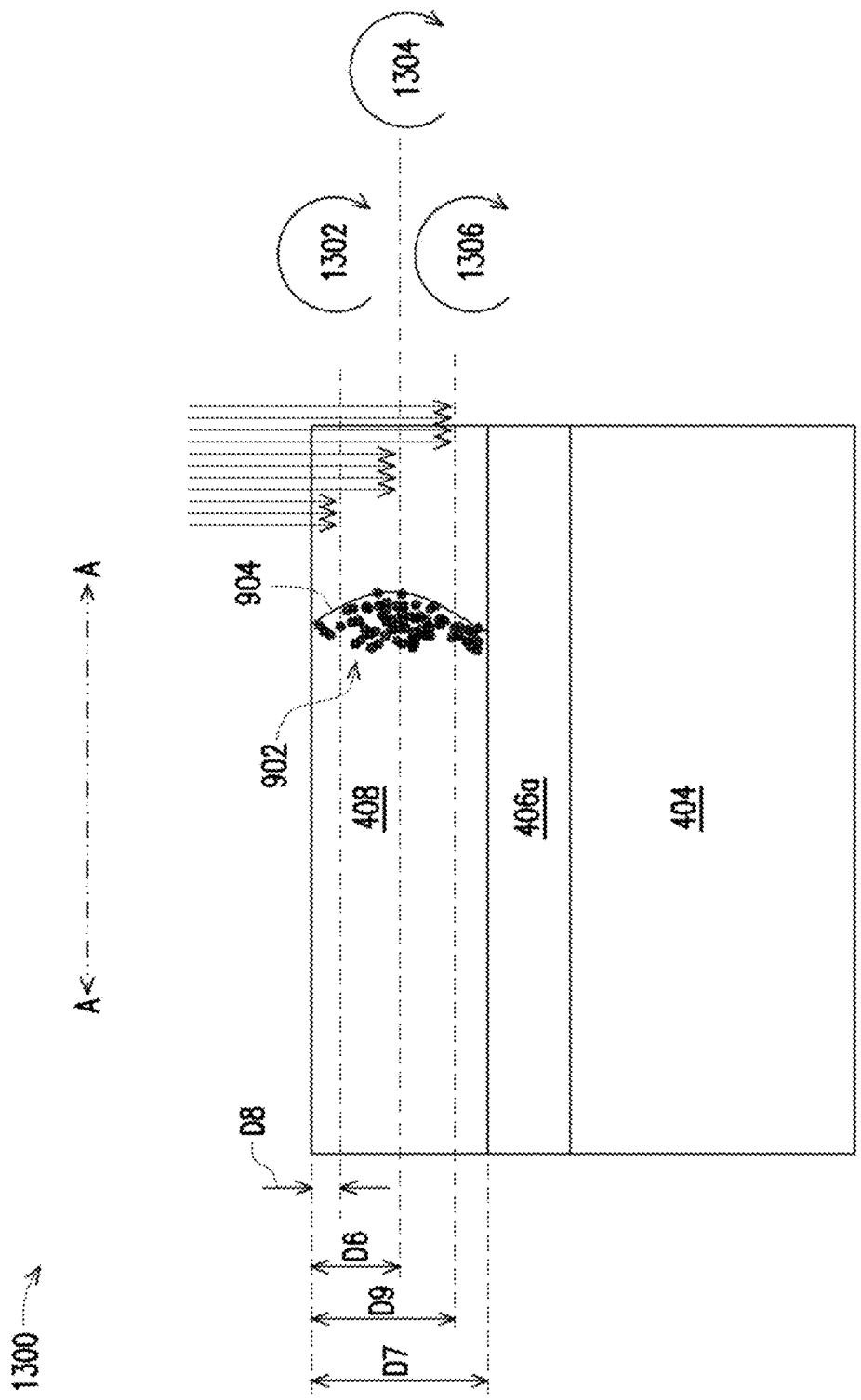

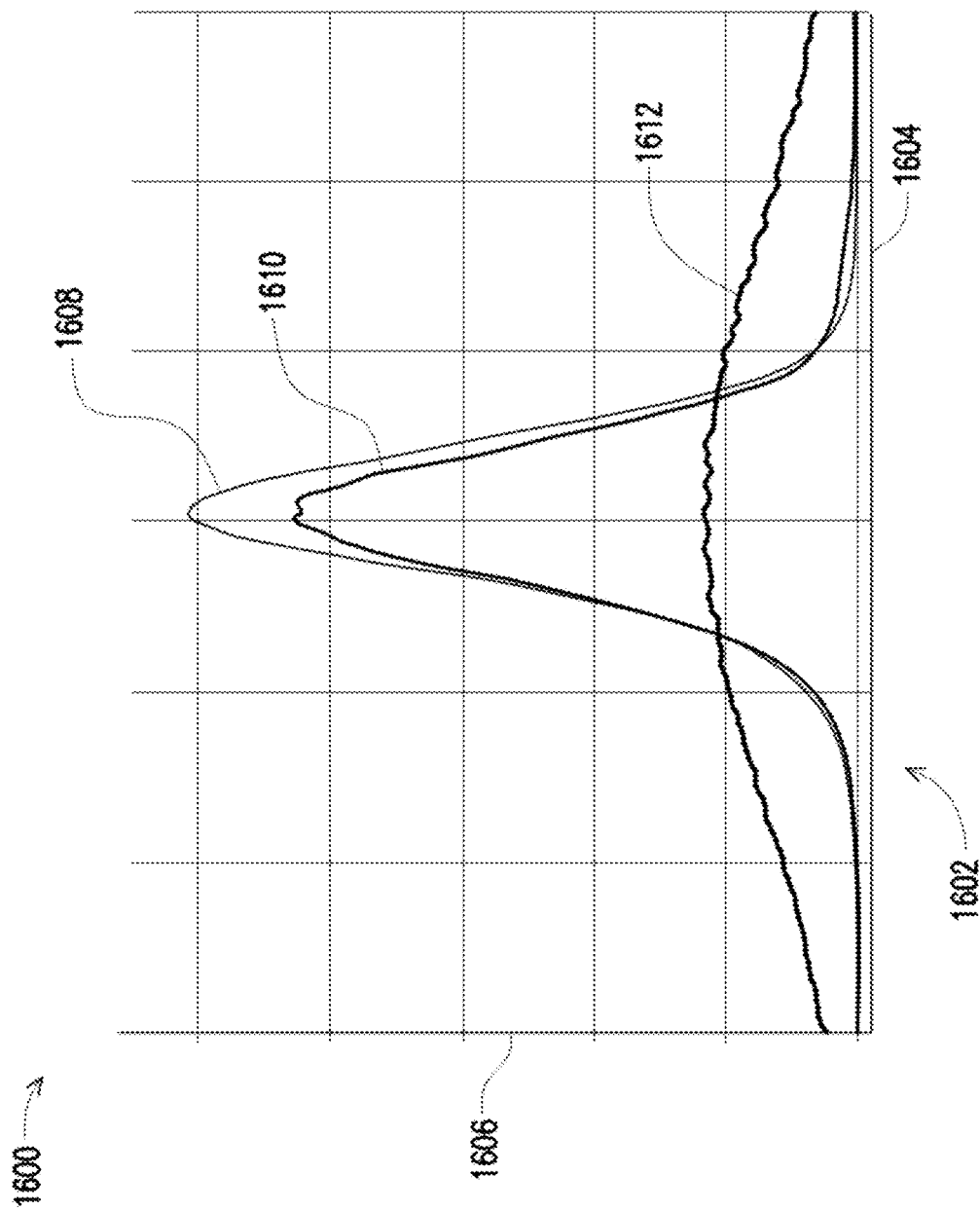

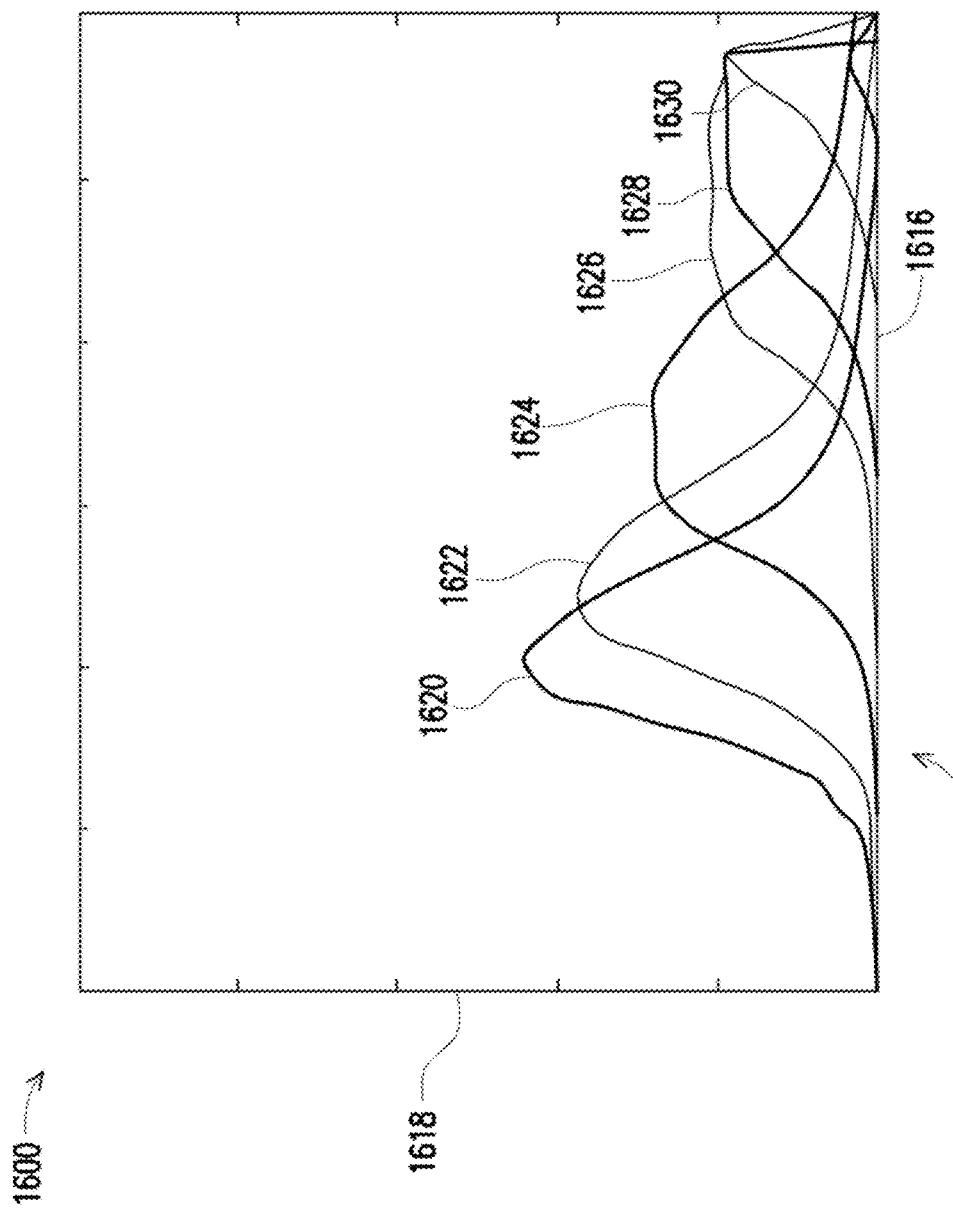

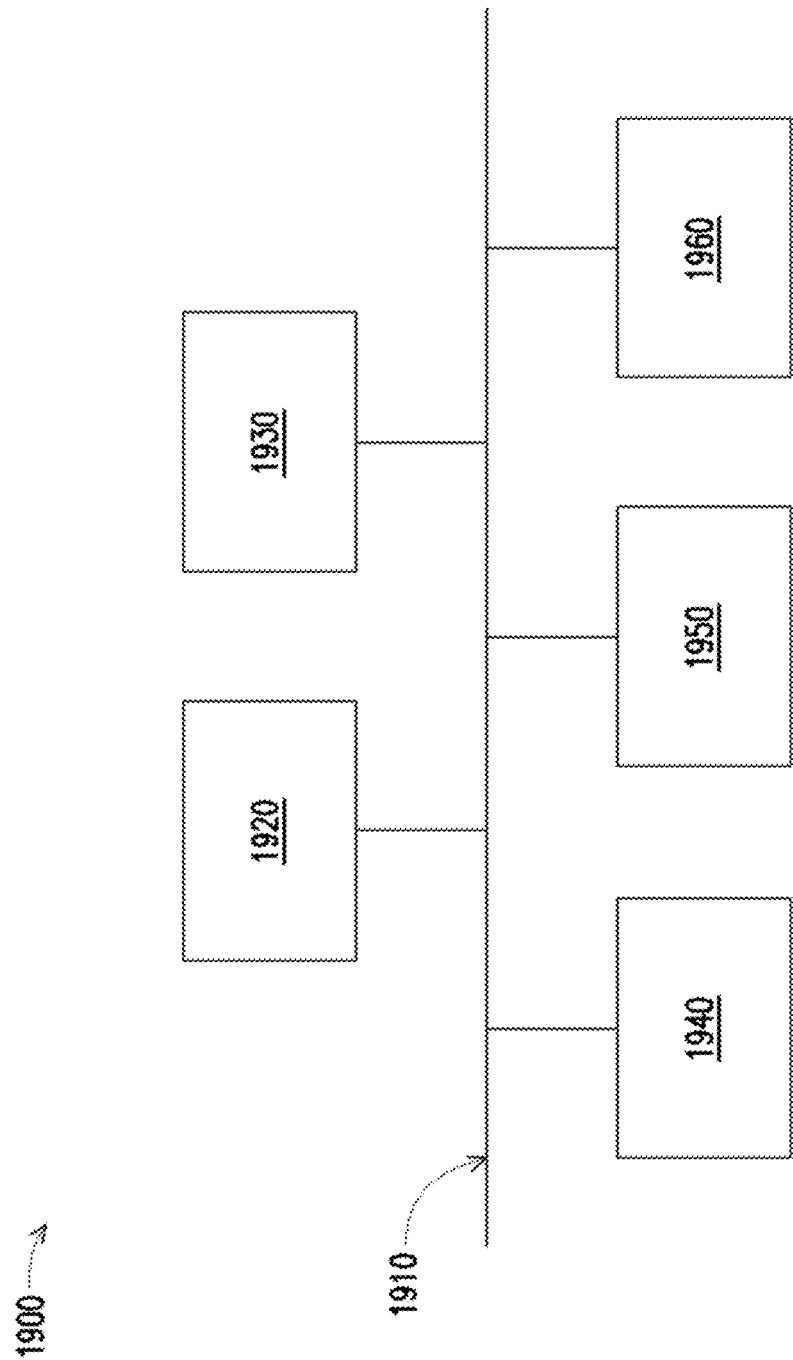

SEMICONDUCTOR DEVICE AND METHODS OF FORMATION

An integrated circuit device, such as a silicon photonics integrated circuit (PIC) device, may include a photonics structure such as a waveguide structure. The photonics structure may further include an optical attenuator structure to reduce a reflection of electromagnetic waves within the waveguide structure and reduce noise or distortion within the PIC device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 4A-4E are diagrams of an example implementation described herein.

FIGS. 6A-6D are diagrams of an example implementation described herein.

FIGS. 7A and 7B are diagrams of an example photonics structure described herein.

FIGS. 8A-8D are diagrams of an example implementation described herein.

FIGS. 10A-10G, 11A, 11B, 12A-12D, and 13 are diagrams of example implementations described herein.

FIGS. 14, 15A-15C, 16A-16D, 17A-17C, and 18A-18C and are diagrams of example data described herein.

FIG. 19 is a diagram of example components of one or more devices of FIG. 1 described herein.

DETAILED DESCRIPTION

Figure 1:
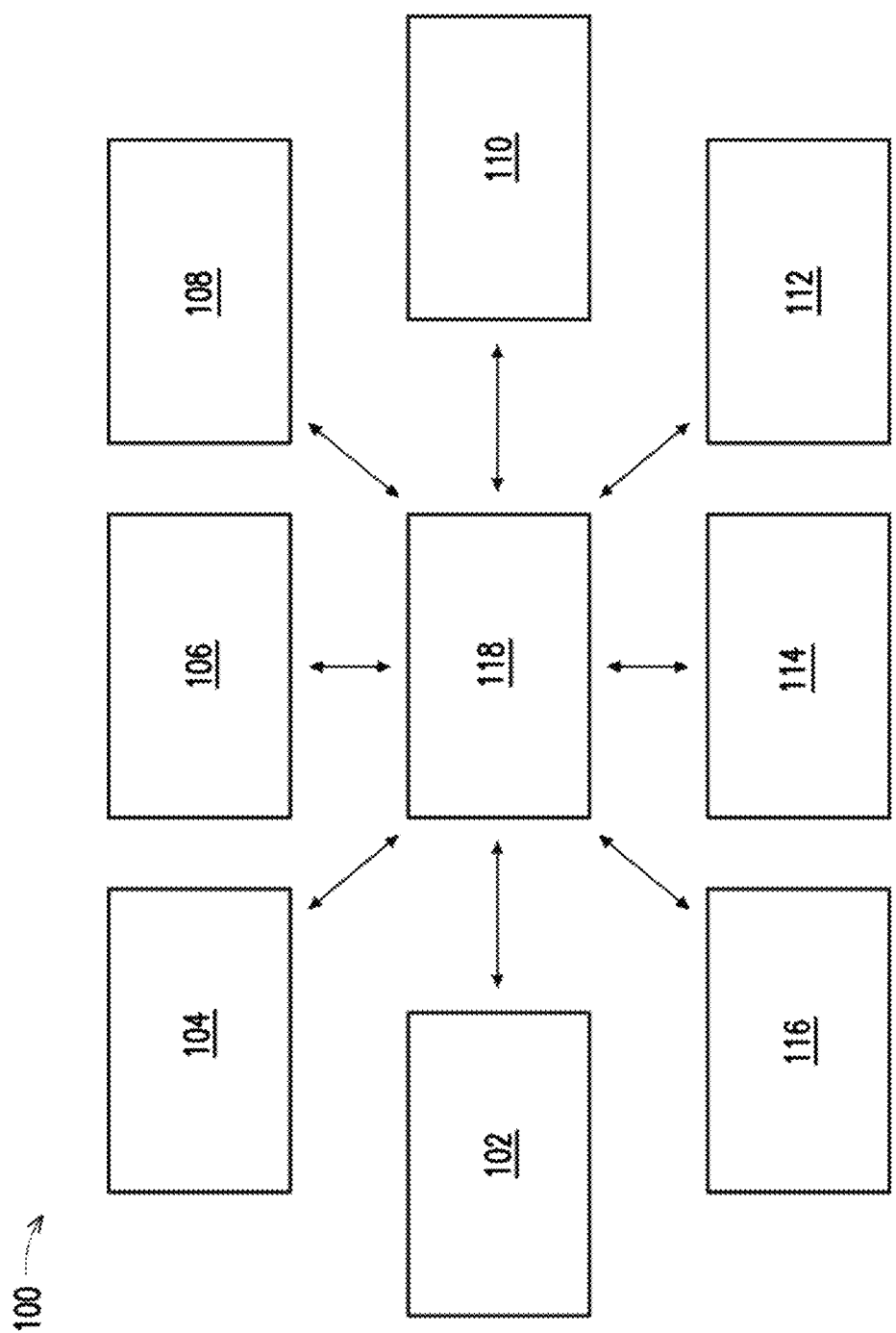
FIG. 1 is a diagram of an example environment in which systems or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" or the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some cases, a silicon photonics integrated circuit (PIC) device, such as photodetector, may include a photonics structure. The photonics structure may include a waveguide structure to propagate electromagnetic waves (e.g., light waves) within the PIC device. The photonics structure may further include an optical attenuator structure to reduce reflection of the electromagnetic waves within the photonics structure and reduce noise or distortion within the PIC device. Conventional optical attenuator structures, such as a spiral optical attenuator structure or a metal cap optical attenuator structure, may be inefficient and allow a reflection of electromagnetic waves at an end of the waveguide structure sufficient to cause noise or distortion within the PIC device.

Some implementations described herein include a PIC device including a photonics structure. The photonics structure includes a waveguide structure and an optical attenuator structure. In some implementation, the optical attenuator structure is formed on an end region of the waveguide structure and includes a metal material or a doped material. In some implementations, the optical attenuator structure includes a gaussian doping profile within a portion of the waveguide structure. The optical attenuator structure may absorb electromagnetic waves at the end of the waveguide structure with an efficiency that is improved relative to a spiral optical attenuator structure or metal cap optical attenuator structure.

By efficiently absorbing the electromagnetic waves at the end of the waveguide structure, a likelihood of a reflection of electromagnetic waves may be reduced relative to a photonics structure including a spiral optical attenuator structure or a metal cap optical attenuator structure. In this way, noise or distortion within the PIC device may be reduced to improve a performance of the PIC device.

FIG. 1 is a diagram of an example environment 100 in which systems or methods described herein may be implemented. As shown in FIG. 1, environment 100 may include a plurality of semiconductor processing tools 102-116 and a wafer/die transport tool 118. The plurality of semiconductor processing tools 102-116 may include a deposition tool 102, an exposure tool 104, a developer tool 106, an etch tool 108, a planarization tool 110, a plating tool 112, an, an annealing tool 116, or another type of semiconductor processing tool. The tools included in example environment 100 may be included in a semiconductor clean room, a semiconductor foundry, a semiconductor processing facility, or manufacturing facility, among other examples.

The deposition tool 102 is a semiconductor processing tool that includes a semiconductor processing chamber and one or more devices capable of depositing various types of materials onto a substrate. In some implementations, the deposition tool 102 includes a spin coating tool that is capable of depositing a photoresist layer on a substrate such as a wafer. In some implementations, the deposition tool 102 includes a chemical vapor deposition (CVD) tool such as a plasma-enhanced CVD (PECVD) tool, a high-density plasma CVD (HDP-CVD) tool, a sub-atmospheric CVD (SACVD) tool, a low-pressure CVD (LPCVD) tool, an atomic layer deposition (ALD) tool, a plasma-enhanced atomic layer deposition (PEALD) tool, or another type of CVD tool. In some implementations, the deposition tool 102 includes a physical vapor deposition (PVD) tool, such as a sputtering tool or another type of PVD tool. In some implementations, the deposition tool 102 includes an epitaxial tool that is configured to form layers or regions of a device by epitaxial growth. In some implementations, the example environment 100 includes a plurality of types of deposition tools 102.

The exposure tool 104 is a semiconductor processing tool that is capable of exposing a photoresist layer to a radiation source, such as an ultraviolet light (UV) source (e.g., a deep UV light source or an extreme UV light (EUV) source, among other examples), an x-ray source, or an electron beam (e-beam) source, among other examples. The exposure tool 104 may expose a photoresist layer to the radiation source to transfer a pattern from a photomask to the photoresist layer. The pattern may include one or more semiconductor device layer patterns for forming one or more semiconductor devices, may include a pattern for forming one or more structures of a semiconductor device, may include a pattern for etching various portions of a semiconductor device, among other examples. In some implementations, the exposure tool 104 includes a scanner, a stepper, or a similar type of exposure tool.

The developer tool 106 is a semiconductor processing tool that is capable of developing a photoresist layer that has been exposed to a radiation source to develop a pattern transferred to the photoresist layer from the exposure tool 104. In some implementations, the developer tool 106 develops a pattern by removing unexposed portions of a photoresist layer. In some implementations, the developer tool 106 develops a pattern by removing exposed portions of a photoresist layer. In some implementations, the developer tool 106 develops a pattern by dissolving exposed or unexposed portions of a photoresist layer through the use of a chemical developer.

The etch tool 108 is a semiconductor processing tool that is capable of etching various types of materials of a substrate, wafer, or semiconductor device. For example, the etch tool 108 may include a wet etch tool or a dry etch tool, among other examples. In some implementations, the etch tool 108 includes a chamber that is filled with an etchant, and the substrate is placed in the chamber for a particular time period to remove particular amounts of one or more portions of the substrate. In some implementations, the etch tool 108 may etch one or more portions of the substrate using a plasma etch or a plasma-assisted etch, which may involve using an ionized gas to isotropically or directionally etch the one or more portions.

The planarization tool 110 is a semiconductor processing tool that is capable of polishing or planarizing various layers of a wafer or semiconductor device. For example, a planarization tool 110 may include a chemical mechanical planarization (CMP) tool or another type of planarization tool that polishes or planarizes a layer or surface of deposited or plated material. The planarization tool 110 may polish or planarize a surface of a semiconductor device with a combination of chemical and mechanical forces (e.g., chemical etching and free abrasive polishing). The planarization tool 110 may utilize an abrasive and corrosive chemical slurry in conjunction with a polishing pad and retaining ring (e.g., typically of a greater diameter than the semiconductor device). The polishing pad and the semiconductor device may be pressed together by a dynamic polishing head and held in place by the retaining ring. The dynamic polishing head may rotate with different axes of rotation to remove material and even out any irregular topography of the semiconductor device, making the semiconductor device flat or planar.

The plating tool 112 is a semiconductor processing tool that is capable of plating a substrate (e.g., a wafer or a semiconductor device, among other examples) or a portion thereof with one or more metals. For example, the plating tool 112 may include a copper electroplating device, an aluminum electroplating device, a nickel electroplating device, a tin electroplating device, a compound material or alloy (e.g., tin-silver or tin-lead, among other examples) electroplating device, or an electroplating device for one or more other types of conductive materials, metals, or similar types of materials.

The ion implantation tool 114 is a semiconductor processing tool that is used to implant ions into a substrate such as a semiconductor wafer. The generates ions in an arc chamber from a source material such as a gas or a solid. The source material is provided into the arc chamber, and an arc voltage is discharged between a cathode and an electrode to produce a plasma containing ions of the source material. One or more extraction electrodes are used to extract the ions from the plasma in the arc chamber and accelerate the ions to form an ion beam. The ion beam may be directed toward the substrate such that the ions are implanted below the surface of the substrate to dope the substrate.

The annealing tool 116 is a semiconductor processing tool that includes a semiconductor processing chamber and one or more devices capable of heating a semiconductor substrate or semiconductor device. For example, the annealing tool 116 may include a rapid thermal annealing (RTA) tool or another type of annealing tool that is capable of heating a semiconductor substrate to cause a reaction between two or more materials or gasses, to cause a material to decompose. As another example, the annealing tool 116 may be configured to heat (e.g., raise or elevate the temperature of) a structure or a layer (or portions thereof) to re-flow the structure or the layer, or to crystallize the structure or the layer, to remove defects such as voids or seams. As another example, the annealing tool 116 may be configured to heat (e.g., raise or elevate the temperature of) a layer (or portions thereof) to enable bonding of two or more semiconductor devices.

Wafer/die transport tool 118 includes a mobile robot, a robot arm, a tram or rail car, an overhead hoist transport (OHT) system, an automated materially handling system (AMHS), or another type of device that is configured to transport substrates or semiconductor devices between semiconductor processing tools 102-116, that is configured to transport substrates or semiconductor devices between processing chambers of the same semiconductor processing tool, or that is configured to transport substrates or semiconductor devices to and from other locations such as a wafer rack or a storage room, among other examples. In some implementations, wafer/die transport tool 118 may be a programmed device that is configured to travel a particular path or may operate semi-autonomously or autonomously. In some implementations, the environment 100 includes a plurality of wafer/die transport tools 118.

For example, the wafer/die transport tool 118 may be included in a cluster tool or another type of tool that includes a plurality of processing chambers, and may be configured to transport substrates or semiconductor devices between the plurality of processing chambers, to transport substrates or semiconductor devices between a processing chamber and a buffer area, to transport substrates or semiconductor devices between a processing chamber and an interface tool such as an equipment front end module (EFEM), or to transport substrates or semiconductor devices between a processing chamber and a transport carrier (e.g., a front opening unified pod (FOUP)), among other examples. In some implementations, a wafer/die transport tool 118 may be included in a multi-chamber (or cluster) deposition tool 102, which may include a pre-clean processing chamber (e.g., for cleaning or removing oxides, oxidation, or other types of contamination or byproducts from a substrate or semiconductor device) and a plurality of types of deposition processing chambers (e.g., processing chambers for depositing different types of materials, processing chambers for performing different types of deposition operations). In these implementations, the wafer/die transport tool 118 is configured to transport substrates or semiconductor devices between the processing chambers of the deposition tool 102 without breaking or removing a vacuum (or an at least partial vacuum) between the processing chambers or between processing operations in the deposition tool 102, as described herein.

In some implementations, and as described in connection with FIGS. 2-21 and elsewhere herein, the semiconductor processing tools 102-116 perform one or more operations to form a photonics structure. The one or more operations may include, for example, forming a cladding layer on a top surface of a substrate, forming a waveguide layer on a top surface of the cladding layer, and forming an optical attenuator structure on one or more surfaces of a waveguide structure that corresponds to a portion of the waveguide layer.

Additionally, or alternatively, the one or more operations may include forming a cladding layer on a top surface of a substrate and forming a waveguide layer on a top surface of the cladding layer. The one or more operations may further include forming an optical attenuator structure including a gaussian doping profile within a portion of the waveguide layer and forming a waveguide structure that includes the optical attenuator structure from the waveguide layer.

The number and arrangement of devices shown in FIG. 1 are provided as one or more examples. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
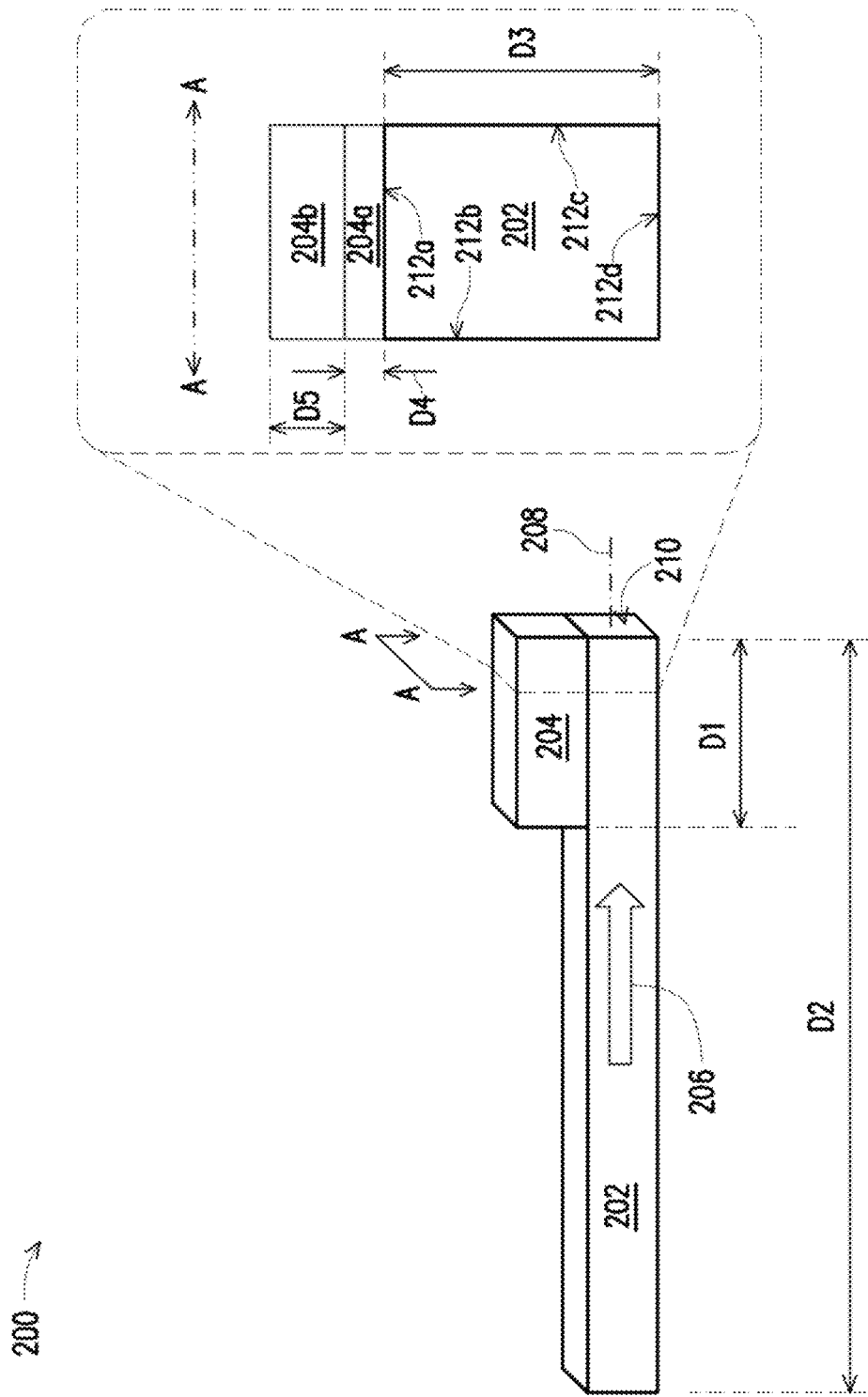
FIG. 2 is a diagram of an example photonics structure described herein.

FIG. 2 is a diagram of an example photonics structure 200 described herein. The photonics structure 200 includes a waveguide structure 202 and an optical attenuator structure 204. The waveguide structure 202 may be configured to propagate electromagnetic waves 206 (e.g., light waves, among other examples) along an approximately linear path 208 and towards an end surface 210 of the waveguide structure 202. The end surface 210 is approximately orthogonal to the approximately linear path 208. The optical attenuator structure 204 may be configured to absorb (e.g., attenuate) reflections of the electromagnetic waves 206 from the end surface 210.

In some implementations, the waveguide structure 202 includes a silicon (Si) material, among other examples. Additionally, or alternatively, the waveguide structure 202 may include optical properties that induce the reflections of the electromagnetic waves 206 from the end surface 210. For example, the waveguide structure 202 may include a refractive index that is included in a range of approximately 3 to approximately 4. However, other values and ranges for the refractive index of the waveguide structure 202 are within the scope of the present disclosure.

In some implementations, a cross-sectional shape of waveguide structure 202 may correspond to a rectangular shape, a square shape, or a hexagonal shape. Additionally, or alternatively, a cross-sectional shape of the waveguide structure 202 may correspond to a triangular shape, a round shape, or an elliptical shape. However, other shapes corresponding to the cross-sectional shape of the waveguide structure 202 are within the scope of the present disclosure.

The optical attenuator structure 204 may include a doped material (e.g., a polysilicon (PO) material, a germanium (Ge) material, or a silicon (Si) material doped with a phosphorus (P) dopant, an arsenic (As) dopant, or a boron (B) dopant, among other examples). In some implementations, the dopant corresponds to a p-type dopant or an n-type dopant. In some implementations, the dopant corresponds to a combination of dopants (e.g., a p-type dopant and an n-type dopant). Additionally, or alternatively, the optical attenuator structure 204 may include a metal material (e.g., an aluminum (Al) material, a copper (Cu) material, a tungsten (W) material, or a silicide material, among other examples). However, other doped-materials, dopants, mixtures of dopants, and metal materials are within the scope of the present disclosure.

As shown in the magnified view of FIG. 2 (corresponding to a cross-section A-A of the photonics structure 200), the waveguide structure 202 may include a plurality of sidewalls 212a-212d (e.g., exterior surfaces). In some implementations, the optical attenuator structure 204 may include a substructure 204a including a layer of an oxide material and a substructure 204b including a layer of a doped polysilicon material, among other examples.

The photonics structure 200 may include one or more dimensional properties or relationships. For example, a length D1 of the optical attenuator structure 204 may correspond to a portion of a length D2 of waveguide structure 202. Additionally, or alternatively, a thickness D3 of the waveguide structure 202 may be included in a range of approximately 2.7 microns to approximately 3.3 microns. Additionally, or alternatively, a thickness D4 of the substructure 204a may be included in a range of approximately 90 angstroms to approximately 110 angstroms. Additionally, or alternatively, a thickness of the substructure 204b may be included in a range of up to approximately 10,000 angstroms. However, and as described in greater detail in connection with FIGS. 14-18C, other values and ranges for the dimensional properties D1-D5 are within the scope of the present disclosure.

As shown in FIG. 2, the photonics structure 200 includes the waveguide structure 202 including the plurality of sidewalls 212a-212d and the end surface 210. In some implementations, the waveguide structure 202 is configured to propagate the electromagnetic waves 206 along an approximately linear path 208 between the plurality of sidewalls 212a-212d towards the end surface 210. In some implementations, the end surface 210 is oriented approximately orthogonal to the approximately linear path 208. The photonics structure 200 includes the optical attenuator structure 204 on one or more of the plurality of sidewalls 212a-212d near the end surface 210.

As indicated above, FIG. 2 is provided as an example. Other examples may differ from what is described with regard to FIG. 2.

As described in greater detail in connection with FIGS. 3A-21 and elsewhere herein, the waveguide structure 202 or the optical attenuator structure 204 may be formed using techniques that reduce noise or distortion within a PIC device including the waveguide structure 202 or the optical attenuator structure 204. Some techniques may increase attenuation (e.g., losses) by a factor of up to 2.5× relative to techniques related to a photonics structure including a spiral optical attenuator structure or metal cap optical attenuator structure. Additionally, or alternatively, some techniques may alter a refractive index, alter an optical field mode, alter convergence or divergence properties, or change absorption properties of the waveguide structure 202 or the optical attenuator structure 204. In some implementations, one or more of the techniques are combinable to increase a performance of the PIC device including the waveguide structure 202 or the optical attenuator structure 204.

Figure 3A:
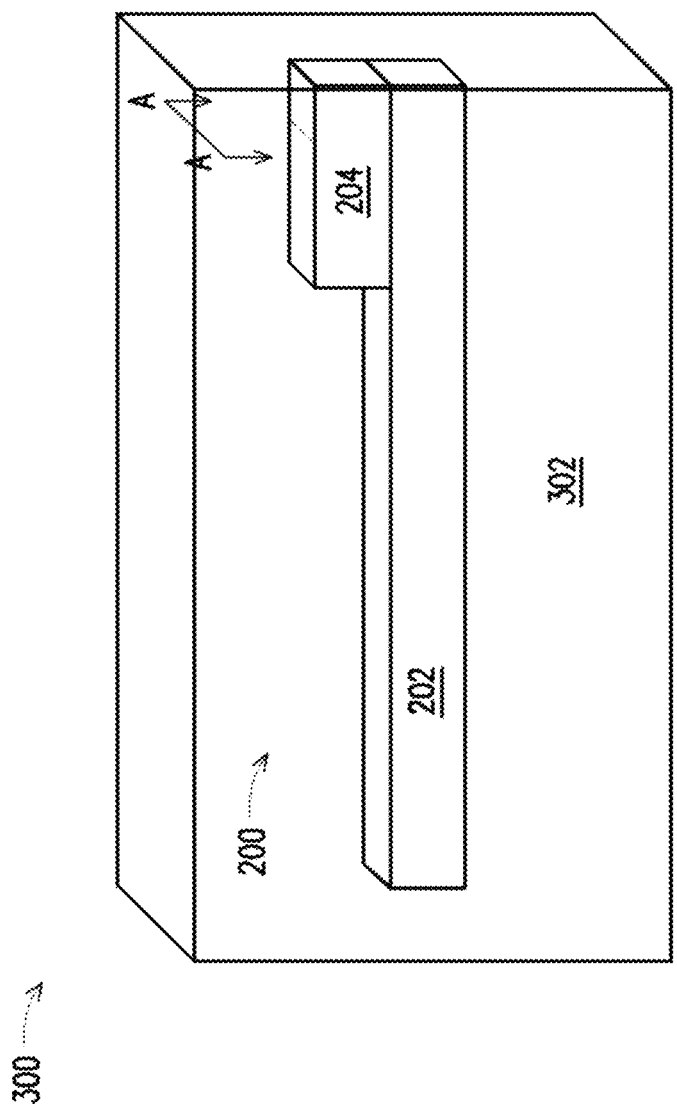
FIGS. 3A and 3B are diagrams of an example implementation of the photonics structure described herein.
Figure 3B:
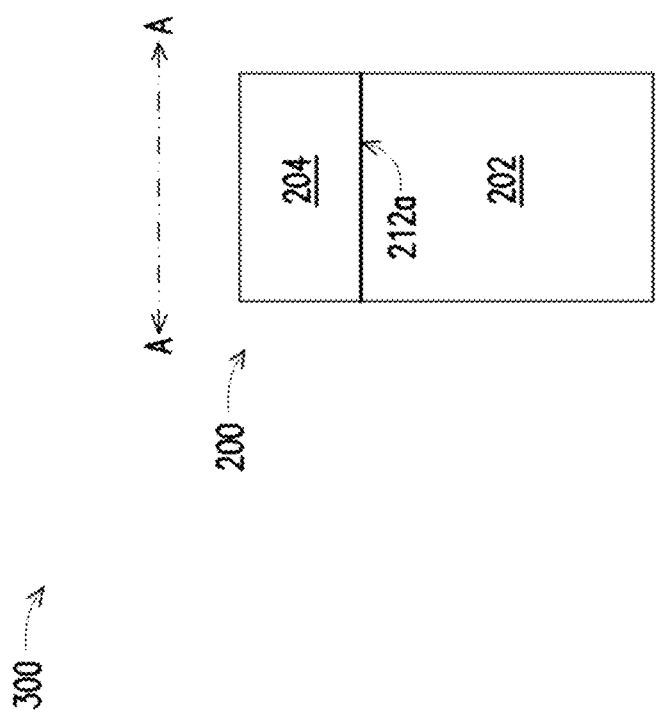

FIGS. 3A and 3B are diagrams of an example implementation 300 of the photonics structure 200 described herein. As shown in FIG. 3A, the photonics structure 200 includes the waveguide structure 202 and the optical attenuator structure 204. The photonics structure 200 includes a cladding structure 302 surrounding the waveguide structure 202 and the optical attenuator structure 204. In some implementations, the cladding structure 302 includes a combination of one or more cladding layers (e.g., sublayers).

The cladding structure 302 may include a silicon dioxide ($SiO_2$) material, among other examples. Additionally, or alternatively, the cladding structure 302 may include one or more optical properties. As an example, the cladding structure 302 may include a refractive index that is included in a range of approximately 1.26 to approximately 1.54. However, materials and optical properties for the cladding structure 302, including values and ranges for the refractive index, are within the scope of the present disclosure.

As shown in the section view A-A of FIG. 3B, the optical attenuator structure 204 includes a portion on a single sidewall of the plurality of sidewalls (e.g., a portion of the sidewall 212a of the plurality of sidewalls 212a-212d). The optical attenuator structure 204 excludes portions on sidewalls other than the portion on the single sidewall (e.g., excludes portions on the sidewalls 212b-212d). As described in connection with FIGS. 4A-4E, this occurs as a result of a forming an optical attenuator layer on a top surface of a waveguide layer, and removing portions of the optical attenuator layer.

As indicated above, FIGS. 3A and 3B are provided as examples. Other examples may differ from what is described with regard to FIGS. 3A and 3B.

FIGS. 4A-4E are diagrams of an example implementation 400 described herein. Example implementation 400 shows section view A-A of an example process for forming a photonics structure. In particular, the example implementation 400 includes an example process for forming the photonics structure 200 such that the optical attenuator structure 204 includes a portion on a single sidewall of the plurality of sidewalls (e.g., a portion of the sidewall 212a of the plurality of sidewalls 212a-212d). The photonics structure may correspond to the photonics structure 200 of FIGS. 3A and 3B.

As shown in FIG. 4A, operation 402 includes multiple layers formed over a substrate 404 (e.g., a silicon substrate, a semiconductor substrate, or a semiconductor wafer, among other examples). As an example, a deposition tool (e.g., the deposition tool 102) may form a cladding layer 406a (e.g., a first cladding layer or cladding sublayer) on the substrate 404 using a CVD technique, a PVD technique, an epitaxial growth technique, an ALD technique, or another deposition technique. Additionally, or alternatively, the deposition tool may form a waveguide layer 408 on the cladding layer 406a using a CVD technique, a PVD technique, an epitaxial growth technique, an ALD technique, or another deposition technique.

Figure 4B:
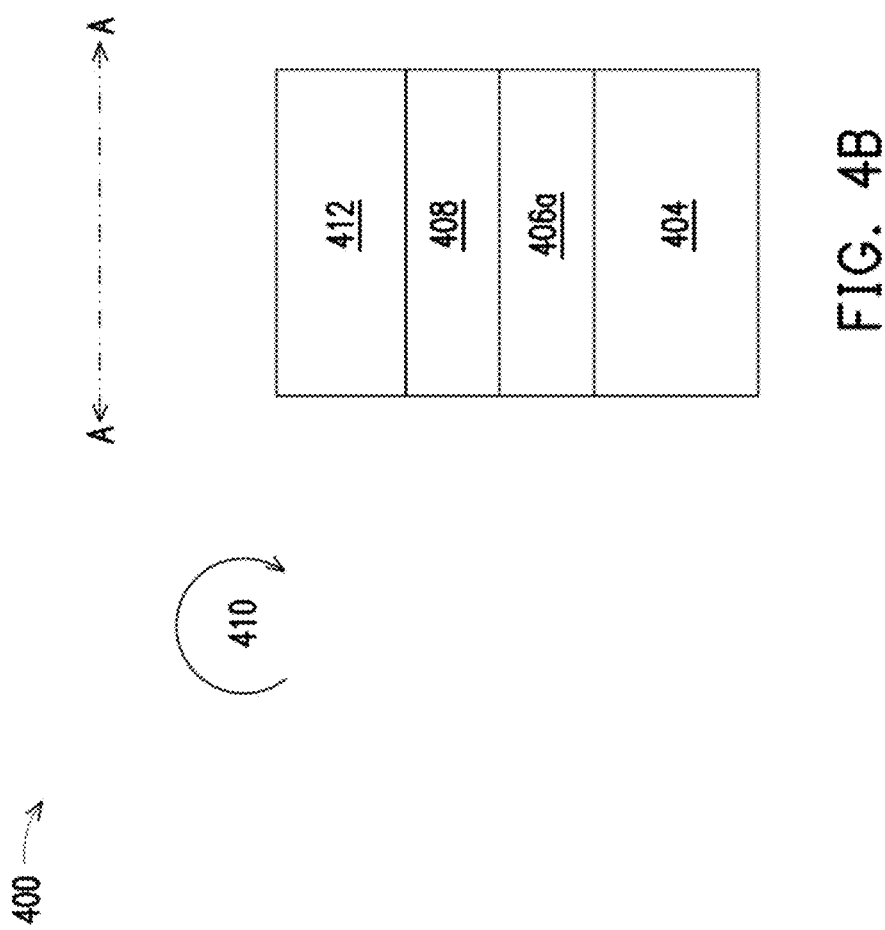

As shown in FIG. 4B, operation 410 includes forming an optical attenuator layer 412 on the waveguide layer 408. As an example, a deposition tool (e.g., the deposition tool 102) may form the optical attenuator layer 412 on the waveguide layer 408 using a CVD technique, a PVD technique, an epitaxial growth technique, an ALD technique, or another deposition technique.

Figure 4C:
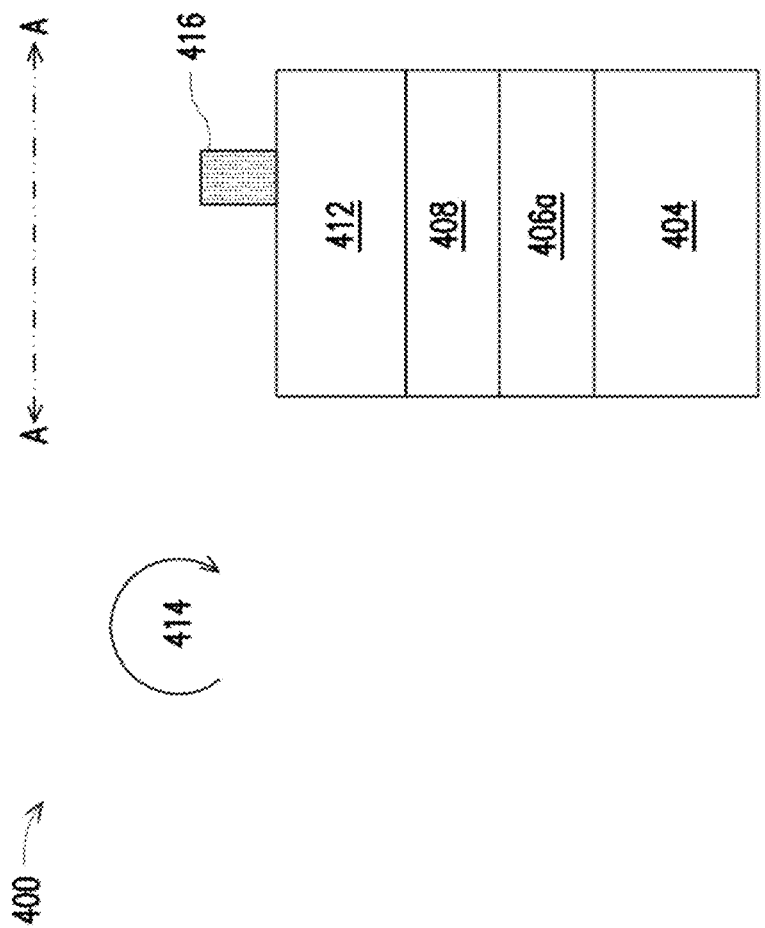

As shown in FIG. 4C, operation 414 includes forming a photoresist pattern 416 on the optical attenuator layer 412. As an example, and as part of operation 414, a deposition tool (e.g., the deposition tool 102) may form a layer of a photoresist material on the optical attenuator layer 412 using a dispense technique or another deposition technique. Additionally, or alternatively and as part of operation 414, an exposure tool (e.g., the exposure tool 104) may expose portions of the layer of the photoresist material to a radiation source, such as an ultraviolet light (UV) source (e.g., a deep UV light source, an extreme UV light (EUV) source, among other examples), an x-ray source, an electron beam (e-beam) source, among other examples. The developer tool (106) may dissolve (e.g., develop, remove) exposed (or unexposed) portions of the photoresist material to form the photoresist pattern 416 through the use of a chemical developer technique or another removal technique.

As shown in FIG. 4D, operation 418 includes removing portions of the cladding layer 406a, the waveguide layer 408, and the optical attenuator layer 412 to form the waveguide structure 202 and the optical attenuator structure 204. As an example, and as part of operation 418, an etch tool (e.g., the etch tool 108) may remove portions of the cladding layer 406a, the waveguide layer 408, and the optical attenuator layer 412 (e.g., portions that are not protected by the photoresist pattern 416) using a wet etch technique, a dry etch technique, a plasma-assisted etch technique, or another removal technique to form the waveguide structure 202 and the optical attenuator structure 204.

As shown in FIG. 4E, operation 420 includes forming a cladding layer 406b (a second cladding layer or sublayer). As an example, and after removal of the photoresist pattern 416 (e.g., removal of the photoresist pattern 416 through use of an ashing technique, among other examples) operation 420 may include a deposition tool (e.g., the deposition tool 102) forming the cladding layer 406b on surfaces of the substrate 404, the cladding layer 406a, the waveguide structure 202, and the optical attenuator structure 204. The deposition tool may form the cladding layer 406b using a CVD technique, a PVD technique, an epitaxial growth technique, an ALD technique, or another deposition technique. In some implementations, and as shown in FIG. 4E, the cladding layer 406a and the cladding layer 406b combine to form the cladding structure 302.

As indicated above, FIGS. 4A-4E are provided as examples. Other examples may differ from what is described with regard to FIGS. 4A-4E.

Figure 5A:
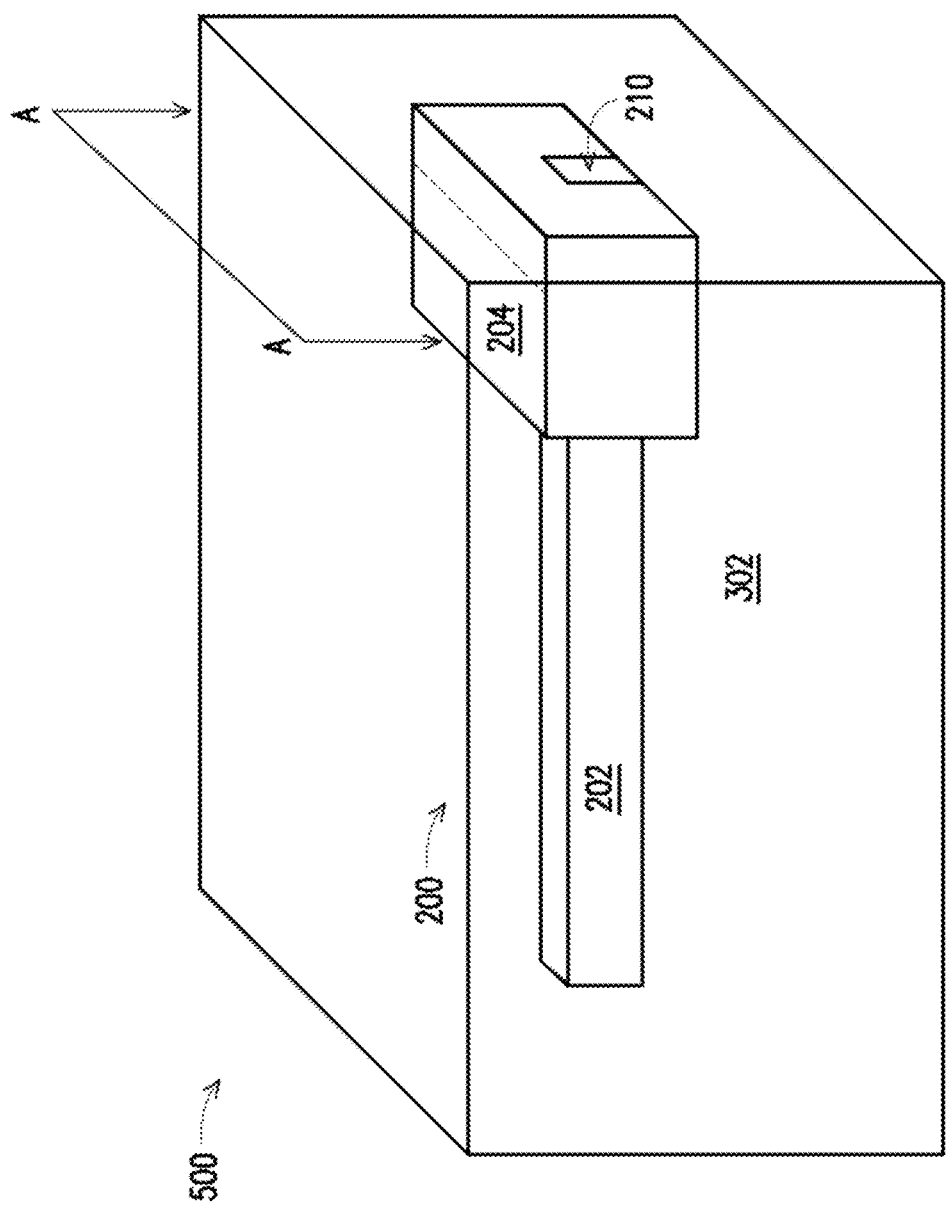
FIGS. 5A and 5B are diagrams of diagrams of an example implementation of the photonics structure described herein.
Figure 5B:
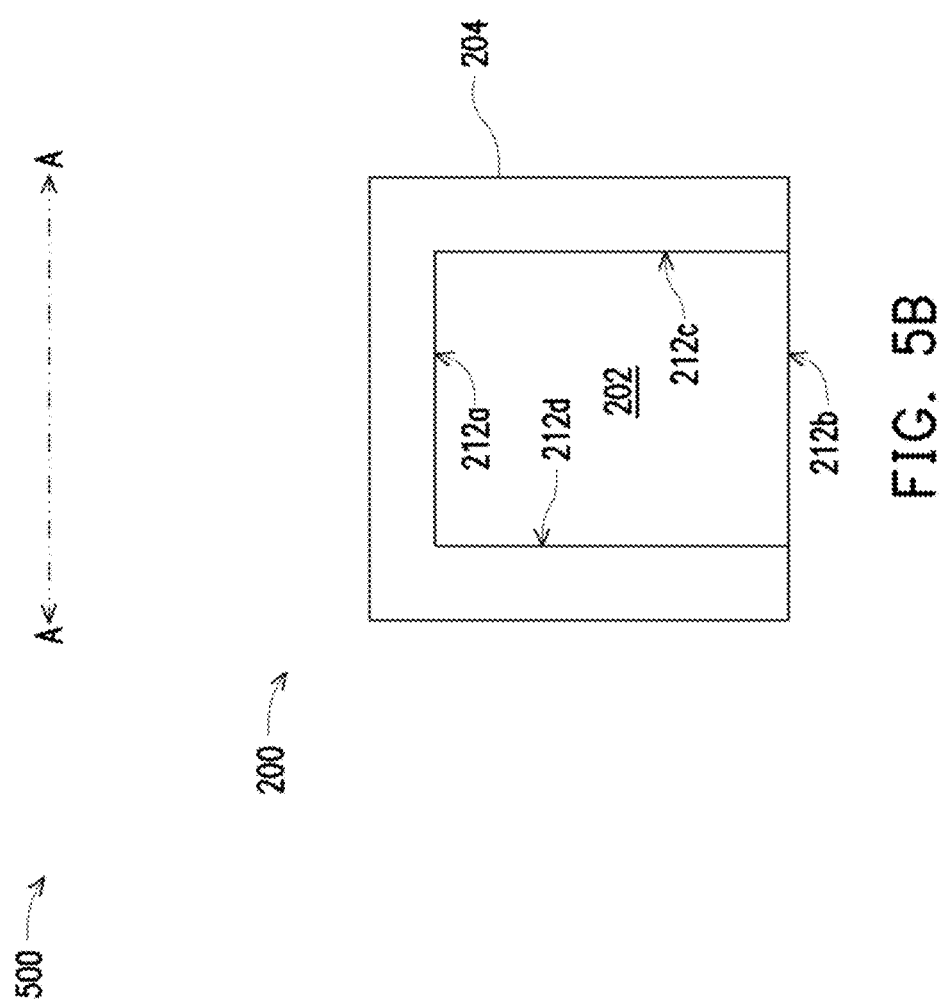

FIGS. 5A and 5B are diagrams of an example implementation 500 of the photonics structure 200 described herein. As shown in FIG. 5A, the photonics structure 200 includes the waveguide structure 202 and the cladding structure 302.

However, and as described in greater detail in connection with FIG. 5B, the optical attenuator structure 204 includes portions on opposing sidewalls of the waveguide structure 202 and on a sidewall between the opposing sidewalls of the waveguide structure 202.

The section view A-A of FIG. 5B shows the optical attenuator structure 204 on the waveguide structure 202. The optical attenuator structure 204 includes portions on opposing sidewalls of the plurality of sidewalls (e.g., portions on the sidewalls 212c and 212d) and a portion on a sidewall between the opposing sidewalls (e.g., a portion on the sidewall 212a between the sidewalls 212c and 212d). In some implementations, and as further shown in FIG. 5B, the optical attenuator structure 204 excludes another portion on at least one other sidewall (e.g., excludes another portion on the sidewall 212b). As described in greater detail and in connection with FIGS. 6A-6D, the example photonics structure 200 may result from removing portions of a waveguide layer prior to forming the optical attenuator structure 204.

As indicated above, FIGS. 5A and 5B are provided as examples. Other examples may differ from what is described with regard to FIGS. 5A and 5B.

FIGS. 6A-6D are diagrams of an example implementation 600 described herein. Example implementation 600 shows section views A-A of an example process for forming a photonics structure. In particular, the example implementation 600 includes an example process for forming a photonics structure such that the optical attenuator structure 204 includes portions on opposing sidewalls of waveguide structure 202 and on a sidewall between the opposing sidewalls of the waveguide structure 202. The photonics structure may correspond to the photonics structure 200 of FIGS. 5A and 5B.

As shown in FIGS. 6A-6D, the example implementation 600 mostly follows the example process of the example implementation 400. Accordingly, similar process details are not reiterated for purposes of brevity.

For example, as similarly described in FIG. 4A, operation 602 of FIG. 6A includes forming the cladding layer 406a on the substrate 404. Operation 602 further includes forming the waveguide layer 408 on the cladding layer 406a. As similarly described in FIGS. 4C and 4D, operation 604 of FIG. 6B includes forming a photoresist pattern 416a and performing a removal operation (e.g., etching exposed portions of the waveguide layer 408) to form the waveguide structure 202. As similarly described in FIG. 4B, operation 606 of FIG. 6C includes forming the optical attenuator layer 412 on the waveguide structure 202 and on portions of the cladding layer 406a. And, as similarly described in FIGS. 4C and 4D and as shown in FIG. 6D, operation 608 includes forming a photoresist pattern 406b and performing a removal operation (e.g., etching exposed portions of the optical attenuator layer 412) to from the optical attenuator structure 204.

As shown and described in connection with FIGS. 6A-6D, the photoresist pattern 416a of FIG. 6B enables the operation 604 to remove portions of the waveguide layer 408 prior to formation of the optical attenuator structure 204 (e.g., prior operation 606 of FIG. 6C that includes formation of the optical attenuator layer 412 and prior to operation 608 of FIG. 6D that includes formation of the optical attenuator structure 204).

As indicated above, FIGS. 6A-6D are provided as examples. Other examples may differ from what is described with regard to FIGS. 6A-6D.

Figure 7A:
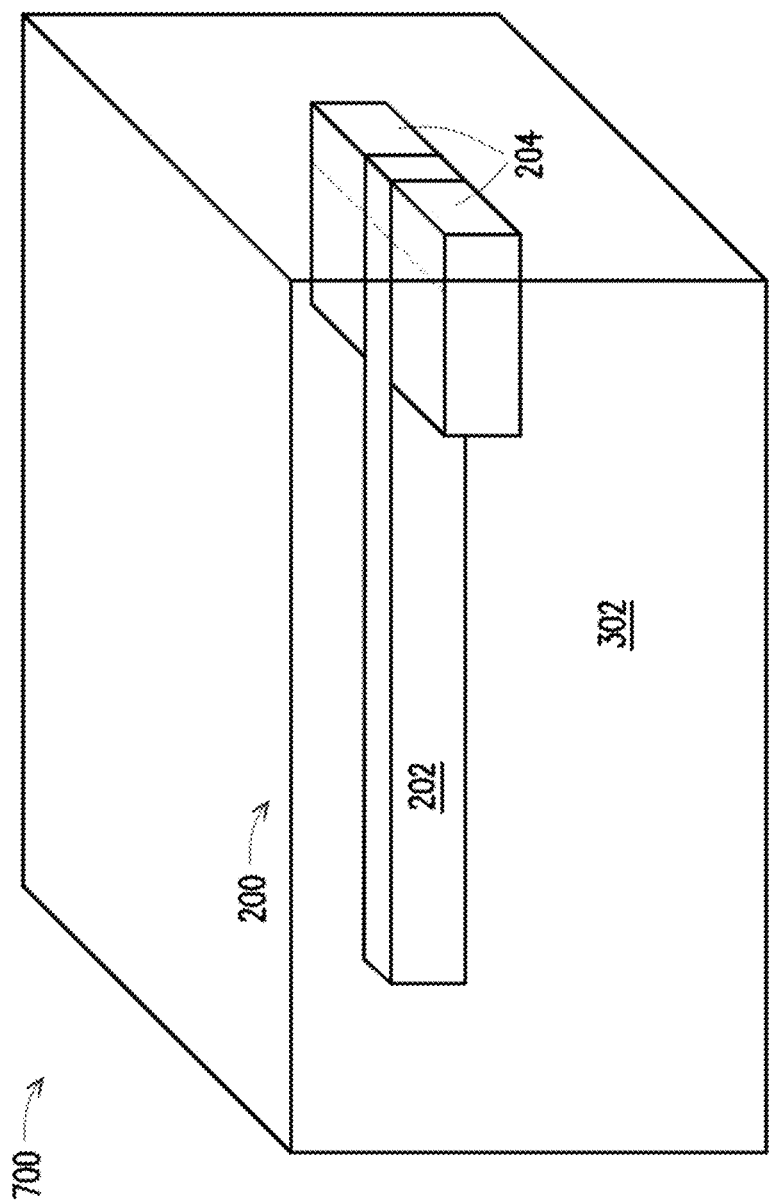

FIGS. 7A and 7B are diagrams of an example implementation 700 of the photonics structure 200 described herein.

As shown in FIG. 7A, the photonics structure 200 includes the waveguide structure 202 and the cladding structure 302. However, and as described in greater detail in connection with FIG. 7B, the optical attenuator structure 204 includes portions on opposing sidewalls of the waveguide structure 202.

The section view A-A of FIG. 7B shows the optical attenuator structure 204 on the waveguide structure 202. The optical attenuator structure 204 includes portions on opposing sidewalls of the plurality of sidewalls (e.g., portions on the sidewalls 212c and 212d). In some implementations, and as further shown in FIG. 7B, the optical attenuator structure 204 excludes portions on sidewalls other than the portions on the opposing sidewalls (e.g., excludes portions on the sidewalls 212a and 212b). As described in greater detail and in connection with FIGS. 8A-8D, the example photonics structure 200 may result from removing portions of an optical attenuator layer that are on a top surface of the waveguide structure 204.

As indicated above, FIGS. 7A and 7B are provided as examples. Other examples may differ from what is described with regard to FIGS. 7A and 7B.

FIGS. 8A-8D are diagrams of an example implementation 800 described herein. Example implementation 800 shows section views A-A of an example process for forming a photonics structure. In particular, the example implementation 800 includes an example process for forming a photonics structure such that the optical attenuator structure 204 includes portions on opposing sidewalls of waveguide structure 202 and excludes portions on sidewalls other than the portions on the opposing sidewalls. The photonics structure may correspond to the photonics structure 200 of FIGS. 7A and 7B.

As shown in FIGS. 8A-8D, the example implementation 800 mostly follows the example process of the example implementations 400. Accordingly, similar process details are not reiterated for purposes of brevity.

For example, as similarly described in FIG. 4A, operation 802 of FIG. 8A includes forming the cladding layer 406a on the substrate 404. Operation 802 further includes forming the waveguide layer 408 on the cladding layer 406a. As similarly described in FIGS. 4C and 4D, operation 604 of FIG. 6B includes forming a photoresist pattern 416 and performing a removal operation (e.g., etching exposed portions of the waveguide layer 408) to form the waveguide structure 202. As similarly described in FIG. 4B, operation 806 of FIG. 8C includes forming the optical attenuator layer 412 on the waveguide structure 202 and on portions of the cladding layer 406a.

As shown in FIG. 8D however, operation 808 includes removing portions of the optical attenuator layer 212 that are on a top surface of the waveguide structure 202. In some implementations, operation 808 may include an etch tool (e.g., the etch tool 108, among other examples) performing a directional etching operation (e.g., a vertically oriented etch back operation, among other examples) to remove portions of the optical attenuator layer 212 from the top surface of the waveguide structure 202 (and other portions of the optical attenuator layer 212 from top surfaces of the cladding layer 406a).

As indicated above, FIGS. 8A-8D are provided as examples. Other examples may differ from what is described with regard to FIGS. 8A-8D.

Figure 9A:
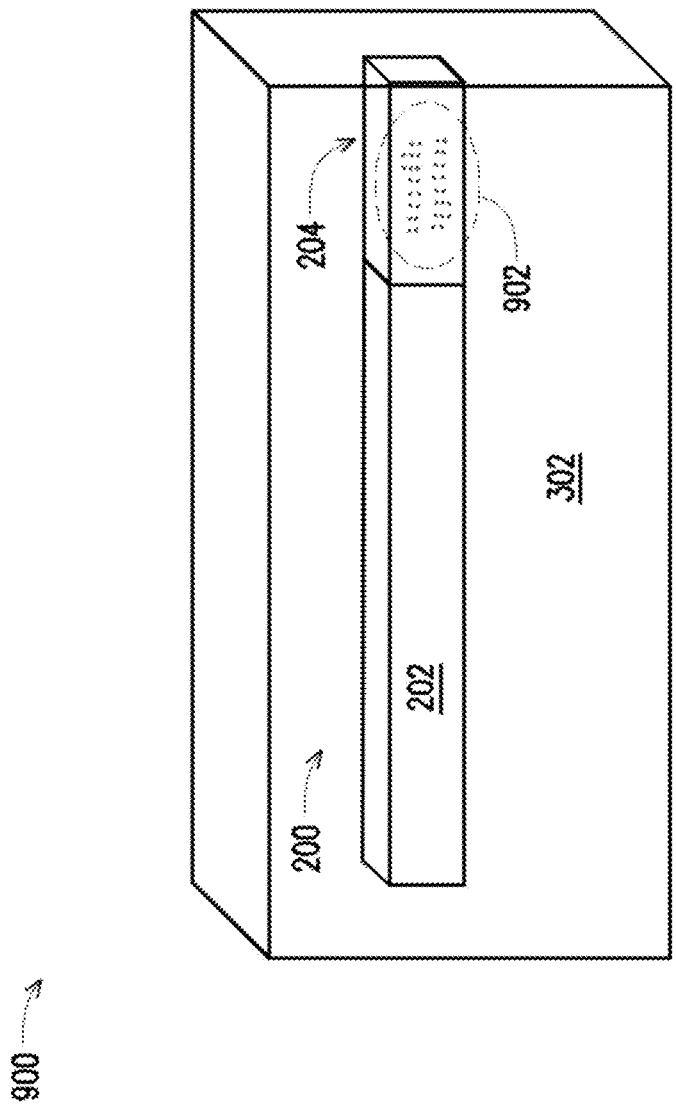
FIGS. 9A and 9B are diagrams of an example implementation of the photonics structure described herein.
Figure 9B:
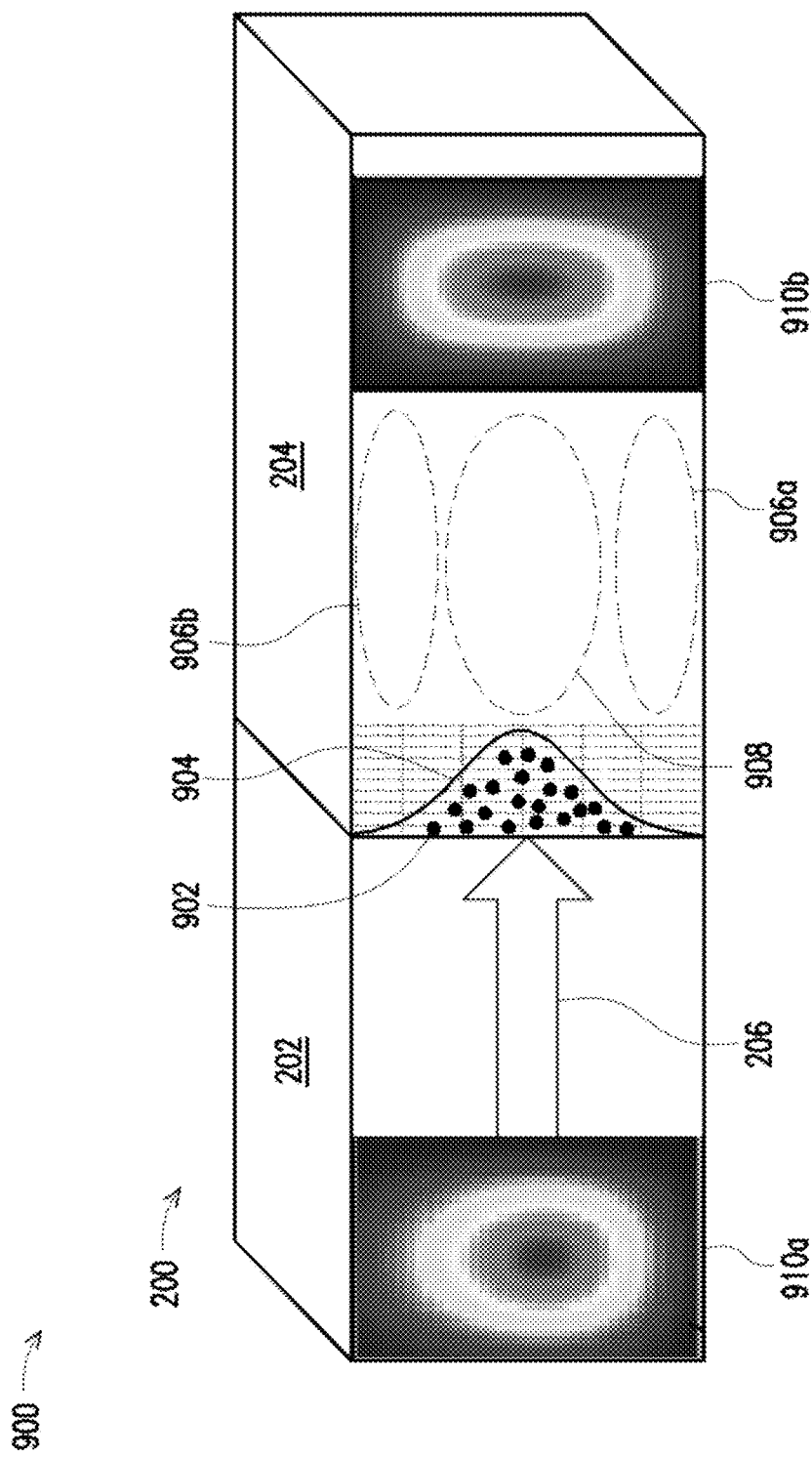

FIGS. 9A and 9B are diagrams of an example implementation 900 of the photonics structure 200 described herein. As shown in FIG. 9A, the photonics structure 200 includes the waveguide structure 202 and the cladding structure 302.

The photonics structure 200 further includes the optical attenuator structure 204 including dopants 902 (e.g., a phosphorus (P) dopant, an arsenic (As) dopant, or a boron (B) dopant, among other examples) within a portion of waveguide structure 202. Using techniques described in greater detail in connection with FIGS. 10A-10G and elsewhere herein, one or more of the semiconductor processing tools 102-116 (e.g., the ion implantation tool 114 and the annealing tool 116, among other examples) may perform a series of operations to implant the dopants 902. A presence of the dopants 902 may transform a portion of the waveguide structure 202 into the optical attenuator structure 204.

As shown in FIG. 9B, the waveguide structure 202 propagates the electromagnetic waves 206 (e.g., light) to the optical attenuator structure 204. Using techniques described in greater detail in connection with FIGS. 11A-12D and elsewhere herein, one or more of the semiconductor processing tools 102-116 (e.g., the ion implantation tool 114 and the annealing tool 116, among other examples) may perform a series of operations to form a gaussian doping profile 904 from the dopants 902.

The gaussian doping profile 904 may induce a low-absorption region 906a, a low-absorption region 906b, and a high-absorption region 908 within the optical attenuator structure 204 (e.g., the low-absorption regions 906a and 906b have a higher refractive index relative to the high-absorption region 908). The optical attenuator structure 204 including the gaussian doping profile 904 may alter an incoming optical mode field 910a of the electromagnetic waves 206. Altering the incoming optical mode field 910a may include redistributing the electromagnetic waves 206 to form an outgoing optical mode field 910b that includes a more uniform distribution of the electromagnetic waves 206 relative to the incoming optical mode field 910a. In such a case, the optical attenuator structure 204 may have a high absorption efficiency relative to the waveguide structure 202, effective to reduce reflection of the electromagnetic waves 206 within the photonics structure 200 (and reduce distortion or noise in a PIC device including the photonics structure 200).

As indicated above, FIGS. 9A and 9B are provided as examples. Other examples may differ from what is described with regard to FIGS. 9A and 9B.

FIGS. 10A-10G are diagrams of an example implementation 1000 described herein. Example implementation 1000 shows section views A-A of an example process for forming a photonics structure. In particular, the example implementation 900 includes an example process for forming the photonics structure such that the optical attenuator structure 204 includes dopants (e.g., the dopants 902). The photonics structure may correspond to the photonics structure 200 of FIG. 9A.

A shown in FIG. 10A, operation 1002 includes multiple layers formed over the substrate 404. As an example, a deposition tool (e.g., the deposition tool 102) may form a cladding layer 406a (e.g., a first cladding layer or cladding sublayer) on the substrate 404 using a CVD technique, a PVD technique, an epitaxial growth technique, an ALD technique, or another deposition technique. Additionally, or alternatively, the deposition tool may form a waveguide layer 408 on the cladding layer 406a using a CVD technique, a PVD technique, an epitaxial growth technique, an ALD technique, or another deposition technique.

As shown in FIG. 10B, operation 1004 includes forming a photoresist pattern 416a on the waveguide layer 408 to expose a portion of the waveguide layer 408. As an example, and as part of operation 1004, a deposition tool (e.g., the deposition tool 102) may form a layer of a photoresist material on the waveguide layer 408 using a dispense technique or another deposition technique. Additionally, or alternatively and as part of operation 1004, an exposure tool (e.g., the exposure tool 104) may expose portions of the layer of the photoresist material to a radiation source, such as an ultraviolet light (UV) source (e.g., a deep UV light source or an extreme UV light (EUV) source, among other examples), an x-ray source or an electron beam (e-beam) source, among other examples. The developer tool (106) may dissolve (e.g., develop, remove) exposed (or unexposed) portions of the photoresist material to form the photoresist pattern 416a through the use of a chemical developer technique or another removal technique.

As shown in FIG. 10C, operation 1006 includes implanting ions (e.g., the dopants 902) in a portion of the waveguide layer 408. As an example, an ion implantation tool (e.g., the ion implantation tool 114) may direct an ion beam at the exposed portion of the waveguide layer 408 such that the ions (e.g., phosphorus (P) ions, arsenic (As) ions, or boron (B) ions, among other examples) are implanted below a surface of the waveguide layer 408 to dope the waveguide layer 408. In some implementations, and as described in greater detail in connection with FIG. 13 and elsewhere herein, operation 1006 may include multiple ion implantation cycles having different ion implantation energies or different ion implantation doses.

As shown in FIG. 10D, operation 1008 includes removing the photoresist pattern 416a and performing an annealing operation to electrically activate the dopants 902 and repair damage in the waveguide layer 408 (e.g., facilitate movement of the dopants 902 into substitutional lattice sites and recrystallize portions of the waveguide layer 408 damaged during operation 1006). As an example, and after removal of the photoresist pattern 416a (e.g., removal of the photoresist pattern 416a through use of an ashing technique, among other examples), the annealing tool 116 may heat the substrate 404, the cladding layer 406a, and the waveguide layer 408 as part of activating the dopants 902 and repairing the damage to the waveguide layer. Additionally, or alternatively, a laser tool may provide energy to the waveguide layer 408 to activate the dopants 902 and repair the damage to the waveguide layer 408.

As shown in FIG. 10E, operation 1010 includes forming a photoresist pattern 416b on the waveguide layer 408 and over the dopants 902. As an example, and as part of operation 1010, a deposition tool (e.g., the deposition tool 102) may form a layer of a photoresist material on the waveguide layer 408 using a dispense technique or another deposition technique. Additionally, or alternatively and as part of operation 1010, an exposure tool (e.g., the exposure tool 104) may expose portions of the layer of the photoresist material to a radiation source, such as an ultraviolet light (UV) source (e.g., a deep UV light source or an extreme UV light (EUV) source, among other examples), an x-ray source or an electron beam (e-beam) source, among other examples. The developer tool (106) may dissolve (e.g., develop, remove) exposed (or unexposed) portions of the photoresist material to form the photoresist pattern 416b through the use of a chemical developer technique or another removal technique.

As shown in FIG. 10F, operation 1012 includes removing portions of the waveguide layer 408 to form the waveguide structure 202 and the optical attenuator structure 204. As an example, and as part of operation 1012, an etch tool (e.g., the etch tool 108) may remove portions of the waveguide layer 408 (e.g., portions that are not protected by the photoresist pattern 416b) using a wet etch technique, a dry etch technique, a plasma-assisted etch technique, or another removal technique to form the waveguide structure 202 and the optical attenuator structure 204.

As shown in FIG. 10G, operation 1014 includes forming a cladding layer 406b (a second cladding layer or sublayer). As an example, and after removal of the photoresist pattern 416b (e.g., removal of the photoresist pattern 416b through use of an ashing technique, among other examples) operation 1014 may include a deposition tool (e.g., the deposition tool 102) forming the cladding layer 406b on surfaces of the substrate 404, the cladding layer 406a, the waveguide structure 202, and optical attenuator structure 204 including the dopants 902. The deposition tool may form the cladding layer 406b using a CVD technique, a PVD technique, an epitaxial growth technique, an ALD technique, or another deposition technique. In some implementations, and as shown in FIG. 10G, the cladding layer 406a and the cladding layer 406b combine to form the cladding structure 302.

As indicated above, FIGS. 10A-10G are provided an examples. Other examples may differ from what is described with regard to FIGS. 10A-10G.

Figure 11A:
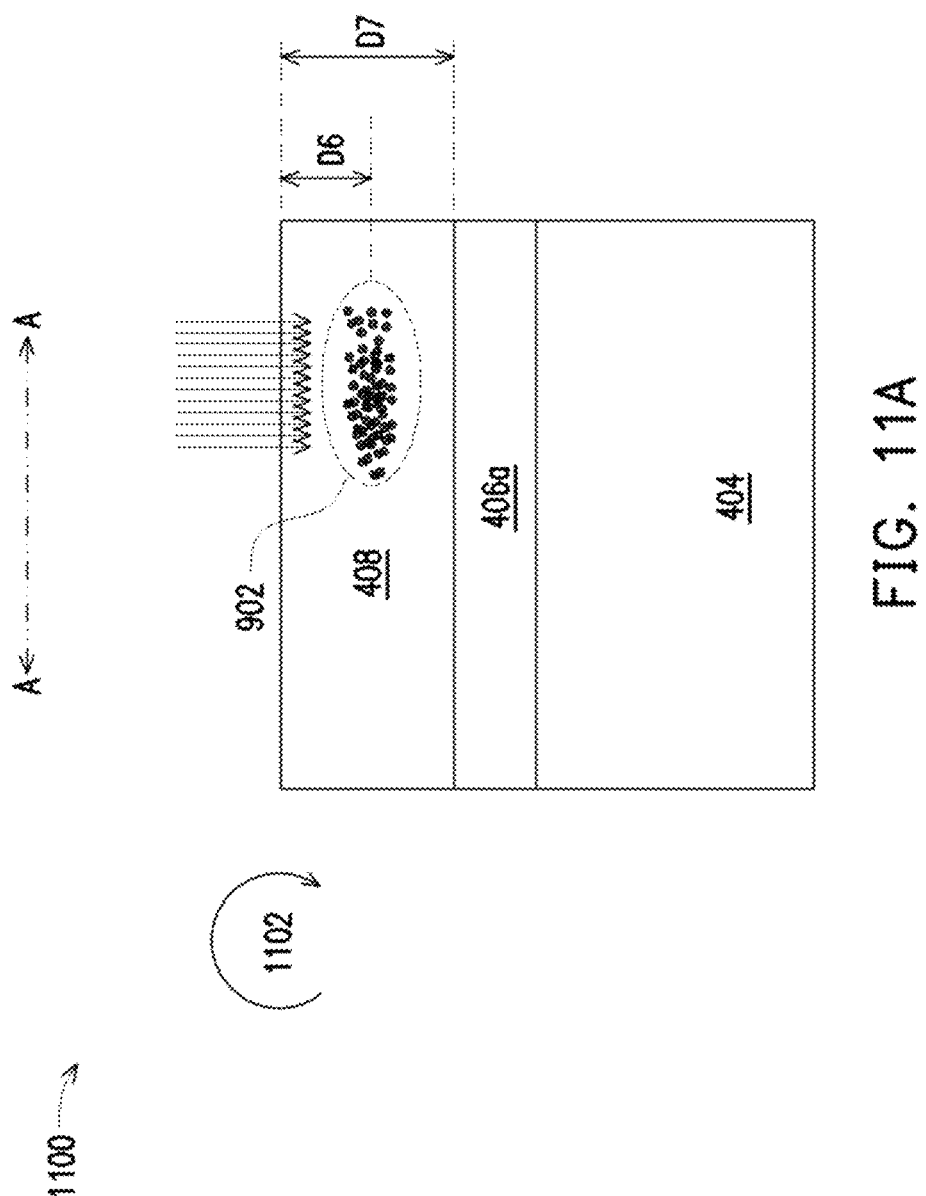
Figure 11B:
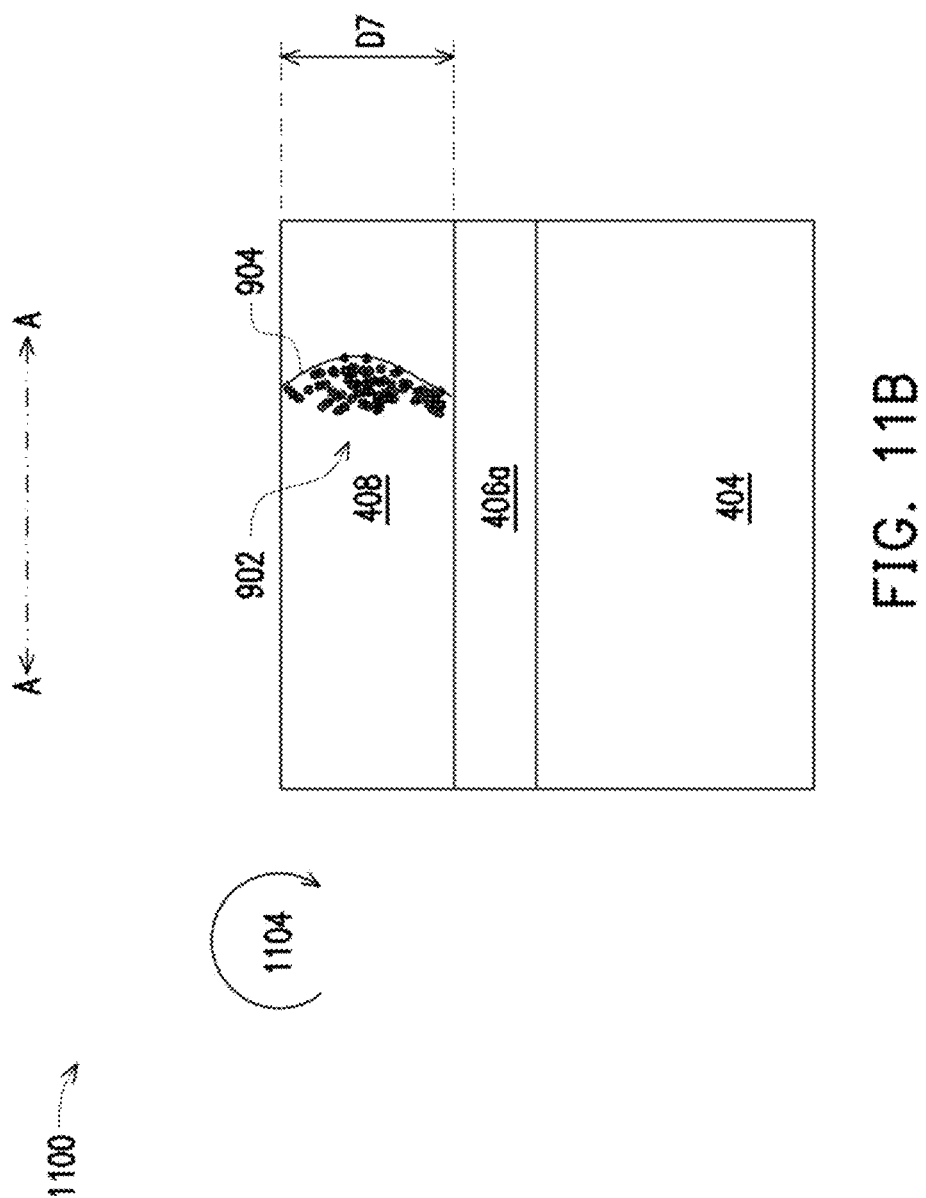

FIGS. 11A and 11B are diagrams of an example implementation 1100 described herein. Example implementation 1100 shows section views A-A of an example process for forming a gaussian doping profile within a layer of a photonics structure (e.g., the gaussian doping profile 904 within the waveguide layer 408 of the photonics structure 200 of FIG. 9B).

As shown in FIG. 11A, operation 1102 includes implanting ions (e.g., the dopants 902) in a portion of the waveguide layer 408. As an example, an ion implantation tool (e.g., the ion implantation tool 114) may direct an ion beam at the waveguide layer 408 such that the ions (e.g., phosphorus (P) ions, arsenic (As) ions, or boron (B) ions, among other examples) are implanted below a surface of the waveguide layer 408 to form the dopants 902 in the waveguide layer 408.

In some implementations, a target depth D6 of implantation may be approximately one-half a thickness D7 of the waveguide layer 408. Furthermore, an implant energy may be dependent on the target depth D6. As an example, for a thickness D7 of approximately 3.0 microns, the target depth D6 may be approximately 1.5 microns. For the target depth D6 of approximately 1.5 microns, the implant energy may be included in a range of approximately 1400 kiloelectron volts (keV) to approximately 1600 keV. If the implant energy (for the target depth D6 of approximately 1.5 microns), is less than approximately 1400 keV, a location of the dopants 902 may be biased towards an upper surface of the waveguide layer 408. If the implant energy (for the target depth D6 of approximately 1.5 microns), is greater than approximately 1600 keV, a location of the dopants 902 may be biased towards a lower surface of the waveguide layer 408. However, other values and ranges for the target depth D6, the thickness D7, and the implant energy are within the scope of the present disclosure.

As shown in FIG. 11B, operation 1104 includes performing an annealing operation that, in addition to electrically activating the dopants 902 and repairing the waveguide layer 408, diffuses the dopants 902 into the gaussian doping profile 904.

As an example, an annealing tool (e.g., the annealing tool 116) may heat the substrate 404, the cladding layer 406a, and the waveguide layer 408 to diffuse the dopants 902. As an example, and for the thickness D7 equal to approximately 3 microns, the operation 1104 may include the annealing tool 116 perform a multiple step annealing operation that heats the substrate 404, the cladding layer 406a, and the waveguide layer 408 to temperatures that are included in a range of approximately 800 degrees Celsius (° C.) to approximately 1300° C. Additionally, or alternatively, durations of the each of the one or more heating operations may be included in a range of approximately 30 minutes to approximately 6 hours. However, other values and ranges for temperatures and durations, for each of the one or more annealing operations included as part of the operation 1104, are within the scope of the present disclosure.

As indicated above, FIGS. 11A and 11B are provided as examples. Other examples may differ from what is described with regard to FIGS. 11A and 11B.

FIGS. 12A-12D are diagrams of an example implementation 1200 described herein. Example implementation 1200 shows section views A-A of an example process for forming a gaussian doping profile within a layer of a photonics structure (e.g., the gaussian doping profile 904 within the waveguide layer 408 of the photonics structure 200 of FIG. 9B).

A shown in FIG. 12A, operation 1202 includes forming multiple layers over the substrate 404. As an example, a deposition tool (e.g., the deposition tool 102) may form the cladding layer 406a on the substrate 404 using a CVD technique, a PVD technique, an epitaxial growth technique, an ALD technique, or another deposition technique. Additionally, or alternatively, the deposition tool may form a sublayer 408a (e.g., a first sublayer of the waveguide layer 408) on the cladding layer 406a using a CVD technique, a PVD technique, an epitaxial growth technique, an ALD technique, or another deposition technique.

As shown in FIG. 12B, operation 1204 includes implanting ions (e.g., the dopants 902) in a portion of the sublayer 408a. As an example, an ion implantation tool (e.g., the ion implantation tool 114) may direct an ion beam at the sublayer 408a such that the ions (e.g., phosphorus (P) ions, arsenic (As) ions, or boron (B) ions, among other examples) are implanted below a surface of the waveguide layer 408 to form the dopants 902 in the sublayer 408a.

As shown in FIG. 12C, operation 1206 includes a deposition tool (e.g., the deposition tool 102) forming a sublayer layer 408b (e.g., a second sublayer of the waveguide layer 408) on the sublayer 408a using a CVD technique, a PVD technique, an epitaxial growth technique, an ALD technique, or another deposition technique.

Figure 12D:
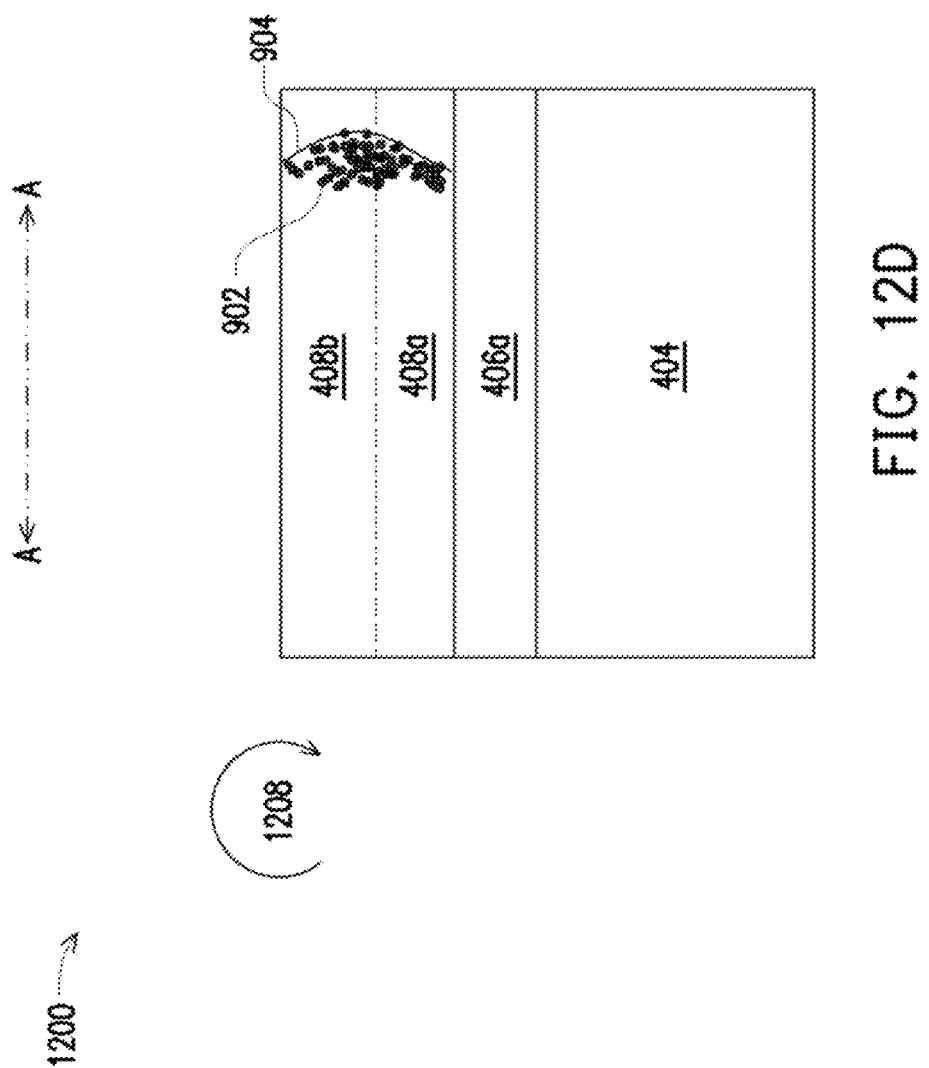

As shown in FIG. 12D, operation 1208 includes performing an annealing operation that, in addition to electrically activating the dopants 902 and repairing the waveguide layer 408, diffuses the dopants 902 into the gaussian doping profile 904. As an example, annealing tool (e.g., the annealing tool 116) may heat the substrate 404, the cladding layer 406a, and the sublayers 408a and 408b as part of diffusing the dopants 902 to form the gaussian doping profile 904 across the sublayers 408a and 408b.

As indicated above, FIGS. 12A-12D are provided as examples. Other examples may differ from what is described with regard to FIGS. 12A-12D.

FIG. 13 is a diagram of an example implementation 1300 described herein. Example implementation 1300 shows section views A-A including an example process for forming a gaussian doping profile within a layer of a photonics structure (e.g., the gaussian doping profile 904 within the waveguide layer 408 of the photonics structure 200 of FIG. 9B). In some implementations, and as shown in FIG. 13, an ion implantation tool (e.g., the ion implantation tool 114) may perform implanting operation 1302 (e.g., a first implanting operation), implanting operation 1304 (e.g., a second implanting operation), and implanting operation 1306 (e.g., a third implanting operation) using different recipes (e.g., different combinations of implantation energies and implantation doses).

For a waveguide layer 408 having the thickness D7 of approximately 3 microns, the implanting operation 1302 may use a recipe (e.g., a first recipe) targeting a depth D8 of approximately 0.5 microns (or another depth). For example, the recipe may include an energy (e.g., a first energy) in a range of approximately 40 keV to approximately 60 keV and a dose (e.g., a first dose) of phosphorous (P) included in a range of approximately $1 \times 10^{13}$ atoms per cubic centimeter to approximately $5 \times 10^{13}$ atoms per cubic centimeter.

Additionally, or alternatively, the implanting operation 1304 may use a recipe (e.g., a second recipe) targeting the depth D6 of approximately 1.5 microns (or another depth). For example, the recipe may include an energy (e.g., a second energy) in a range of approximately 1300 keV to approximately 1600 keV and a dose (e.g., a second dose) of phosphorous (P) included in a range of approximately $1 \times 10^{15}$ atoms per cubic centimeter to approximately $5 \times 10^{15}$ atoms per cubic centimeter. In such a case, the energy of implanting operation 1304 is greater relative to the energy of the implanting operation 1302, and the dose of the implanting operation 1304 is greater relative to the dose of the implanting operation 1302.

Additionally, or alternatively, implanting operation 1306 may use a recipe (e.g., a third recipe) targeting a depth D9 of approximately 2.5 microns (or another depth). For example, the recipe may include an energy (e.g., a third energy) in a range of approximately 1300 keV to approximately 1600 keV and a dose (e.g., a third dose) of phosphorous (P) included in a range of approximately $1 \times 10^{13}$ atoms per cubic centimeter to approximately $5 \times 10^{13}$ atoms per cubic centimeter. In such a case, the energy of implanting operation 1306 is similar to the energy of the implanting operation 1304, and the dose of the implanting operation 1306 is similar to the dose of the implanting operation 1302.

As indicated above, FIG. 13 is provided as an example. Other examples may differ from what is described with regard to FIG. 13. For example, other values and ranges for the thickness D7 and the depths D6, D8, and D9 (which may vary based on a targeted gaussian profile, a targeted optical performance of a PIC device, or a material included in the waveguide layer 408, among other examples) are within the scope of the present disclosure. Additionally, or alternatively, different recipes (e.g., different combinations of energy or doses associated with the operations 1302-1306) are within the scope of the present disclosure.

Figure 14:
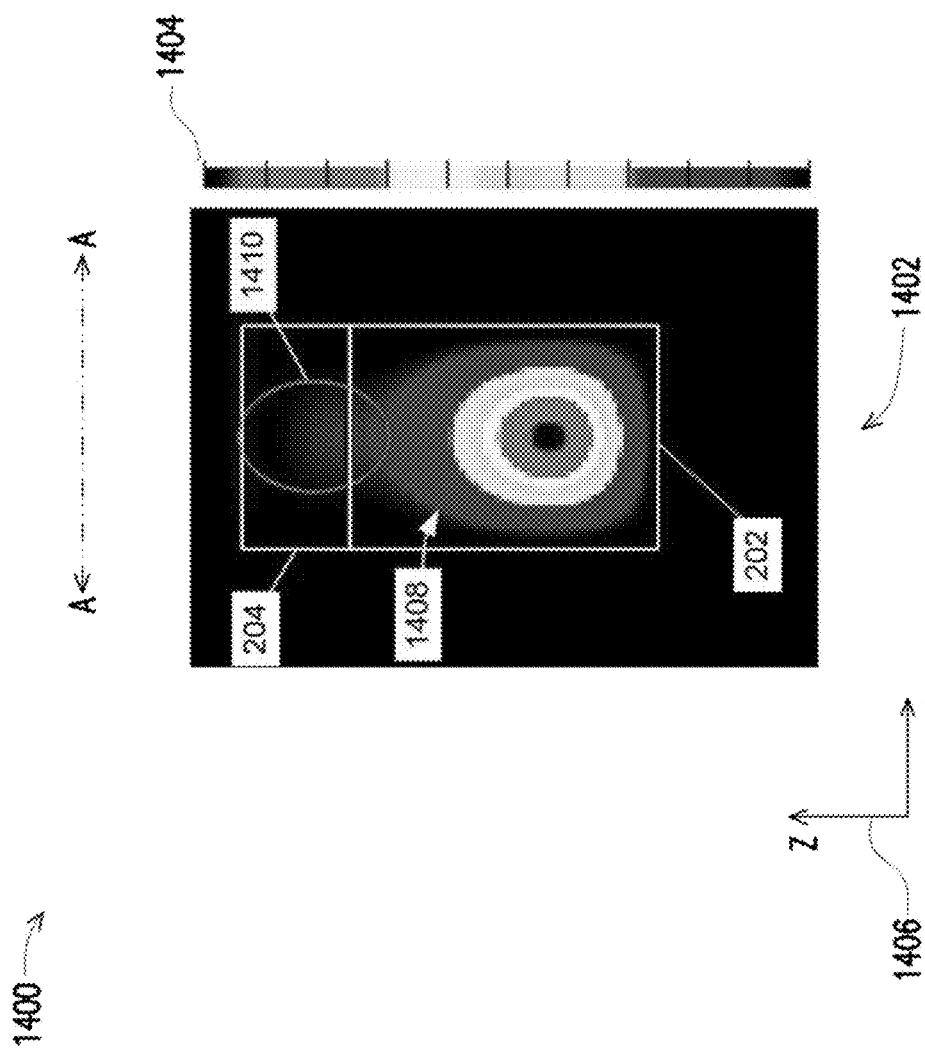

FIG. 14 is a diagram of example data 1400 described herein. FIG. 14 shows a view that may correspond to the cross-sectional view A-A of a photonics structure (e.g., the photonics structure 200) including the waveguide structure 202 and the optical attenuator structure 204 as described in connection with FIGS. 3A-4D and elsewhere herein.

Example 1402 of FIG. 14 includes a normalized intensity 1404 of light (e.g., the electromagnetic waves 206) with respect to locations in the waveguide structure 202 and the optical attenuator structure 204 (e.g., horizontal and vertical locations corresponding to coordinates of an x-z coordinate system 1406). An optical mode field 1408 shows the normalized intensity 1404 of the light with respect to the locations.

As shown in region 1410, the optical attenuator structure 204 (e.g., the optical attenuator structure 204 including the metal or the doped material, among other examples) absorbs a portion of the light passing through the waveguide structure 202. In some implementations, and as shown in example 1402, the absorption of light by the optical attenuator structure 204 may induce a loss (e.g., an attenuation) to the photonics structure corresponding to approximately 39.5 decibels per millimeter (dB/mm). However, and as described in greater detail in connection with 15A-18B, the optical attenuator structure 204 may induce different magnitudes of losses based on a configuration (e.g., based a cross-section of the optical attenuator structure 204 or an amount of the dopant 902 included in the optical attenuator structure 204, among other examples). As such, other magnitudes of losses induced to the photonics structure by the optical attenuator structure are 204 within the scope of the present disclosure.

As indicated above, FIG. 14 is provided as an example. Other examples may differ from what is described with regard to FIG. 14.

Figure 15A:
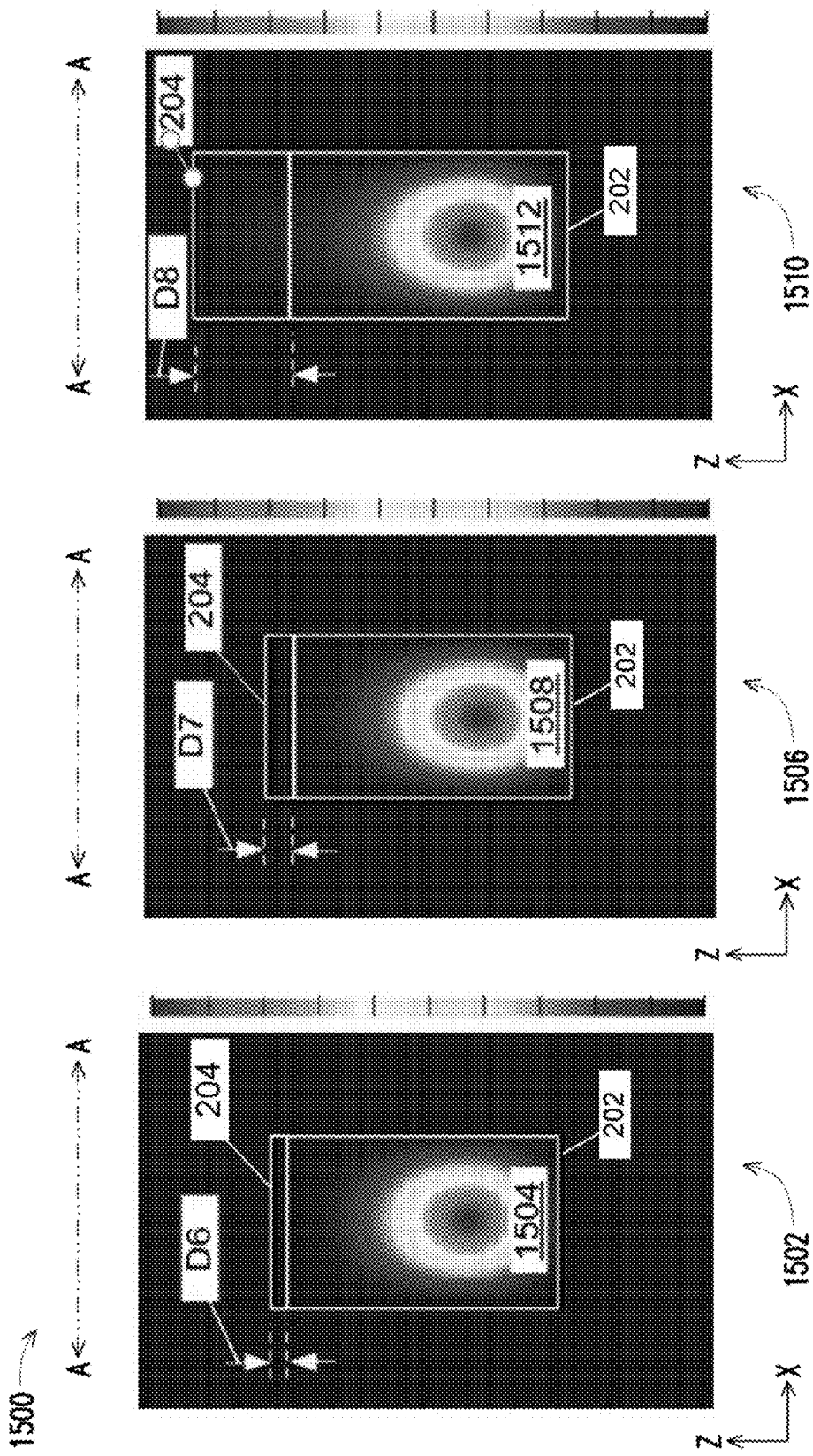
Figure 15B:
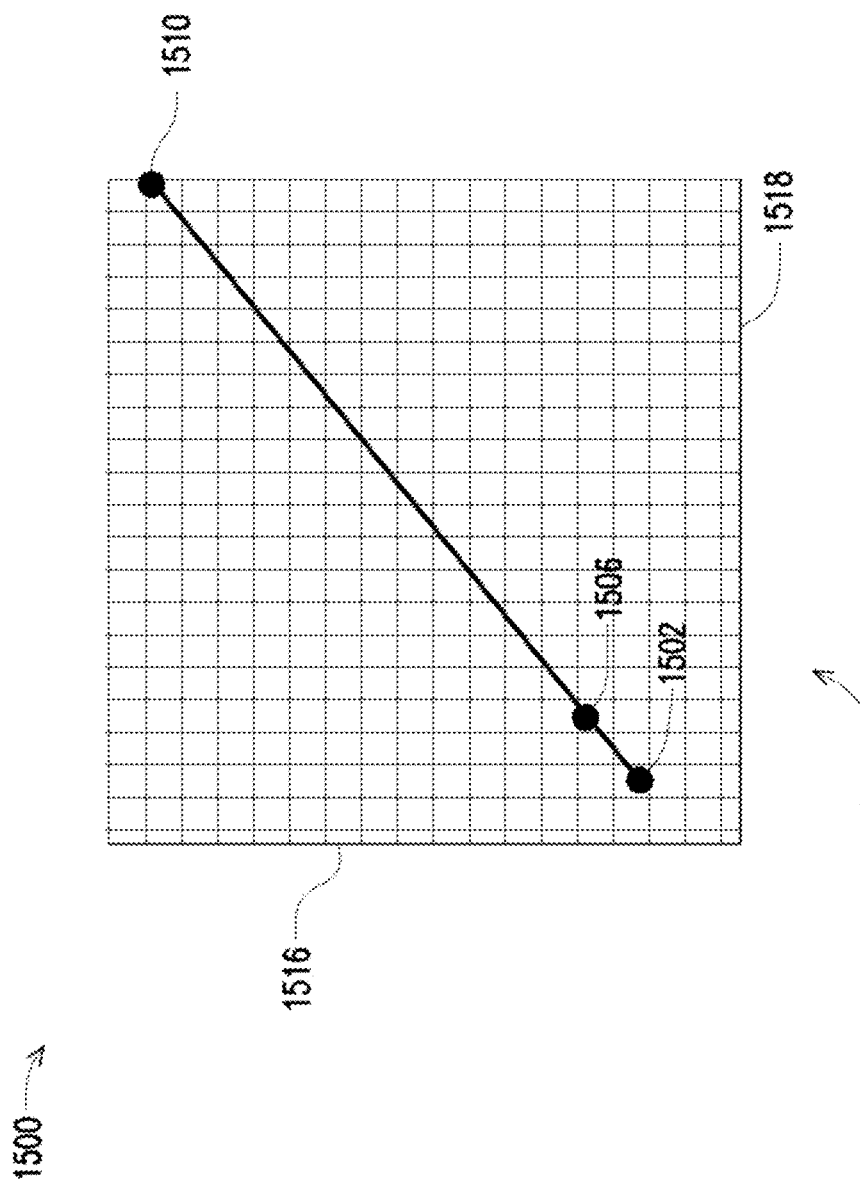
Figure 15C:
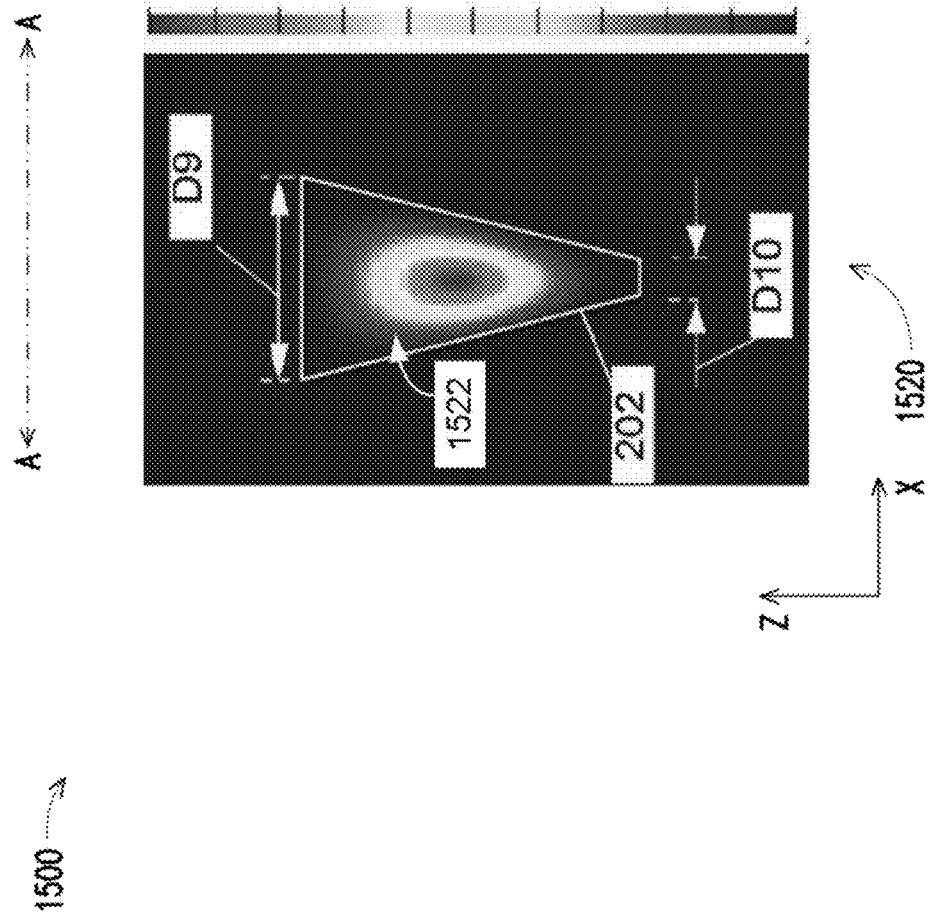

FIGS. 15A-15C are diagrams of example data 1500 described herein. FIGS. The example data 1500 of FIGS. 15A-15C shows example variations based on one or more properties of the waveguide structure 202 or the optical attenuator structure 204.

FIG. 15A shows views that may correspond to cross-sectional view A-A of a photonics structure (e.g., the photonics structure 200) including the waveguide structure 202 and the optical attenuator structure 204. The waveguide structure 202 and the optical attenuator structure 204 of FIG. 15A may correspond to the waveguide structure 202 and the optical attenuator structure 204 as described in connection with FIG. 2 and elsewhere herein. In some implementations, the optical attenuator structure 204 of FIG. 15A includes a doped polyimide material.

Example 1502 of FIG. 15A includes an optical mode field 1504 indicating a performance of a photonics structure (e.g., the photonics structure 200) including the optical attenuator structure 204. In example 1502, a thickness D6 of the doped polyimide material included in the optical attenuator structure may be approximately 1000 angstroms. A loss (e.g., absorption rate of light) induced by the optical attenuator structure 204 may correspond to approximately 34.9 dB/mm (or another value).

Example 1506 of FIG. 15A includes an optical mode field 1508 indicating a performance of the photonics structure including the optical attenuator structure 204. In example 1506, a thickness D7 of the doped polyimide material included in the optical attenuator structure 204 may be approximately 2000 angstroms. A loss (e.g., absorption rate of light) induced to the photonics structure by the optical attenuator structure 204 of example 1506 may correspond to approximately 35.4 dB/mm (or another value).

Example 1510 of FIG. 15A includes an optical mode field 1512 indicating a performance of the photonics structure including the optical attenuator structure 204. In example 1506, a thickness D8 of the doped polyimide material included in the optical attenuator structure 204 may be approximately 10,000 angstroms. A loss (e.g., absorption rate of light, or an attenuation of light) induced to the photonics structure by the optical attenuator structure 204 of example 1510 may correspond to approximately 39.5 dB/mm (or another value).

Example 1514 of FIG. 15B shows a relationship between a loss magnitude 1516 (e.g., in dB/mm) and a doped polyimide thickness magnitude 1518 (e.g., in angstroms). Example 1514 may include data corresponding to the examples 1502, 1506, and 1510 as described in connection with FIG. 15A. As shown in example 1514, the relationship between the loss magnitude 1516 and the doped polyimide thickness magnitude 1518 may be approximately linear. However, other relationships (e.g., non-linear relationships, among other examples) between the loss magnitude 1516 and the doped polyimide thickness magnitude 1518 are within the scope of the present disclosure.

FIG. 15C includes a view that may correspond to a cross-sectional view A-A of a photonics structure (e.g., the photonics structure 200) including the waveguide structure 202. Example 1520 of FIG. 15C includes an optical mode field 1522 indicating a performance of the photonics structure including the waveguide structure 202. In example 1506, a top width D9 of the waveguide structure 202 may be approximately 2.6 microns. Additionally, or alternatively and as shown in example 1520, a bottom width D10 of the waveguide structure 202 may be 0.6 microns. Narrowing the waveguide structure 202 may, in some implementations, induce to the photonics structure a loss of approximately 80.5 dB/mm (or another value). However, other values and ranges for the widths D9 and D10 and losses induced to the photonics structure based on such widths are within the scope of the present disclosure.

As indicated above, FIGS. 15A-15C are provided as one or more examples. Other examples may differ from what is described with regards to FIGS. 15A-15C.

FIGS. 16A-16D are diagrams of example data 1600 described herein. FIGS. 16A-16D may include data corresponding to one or more doping operations as described in connection with FIGS. 9A-13 and elsewhere herein.

Example 1602 of FIG. 16A includes data corresponding to a multiple step operation including a combination of implanting and annealing operations that may be used to form a gaussian doping profile (e.g., the gaussian doping profile 904). In some implementations, the multiple step operation corresponds to doping operations 1102 and 1104 as described in connection with FIGS. 11A and 11B. The data of example 1602 corresponds to a secondary ion mass spectrometry (SIMS) profile showing a change in a doping profile based on the combination of operations, where the doping profile is defined by a junction depth 1604 (e.g., microns) versus a concentration of dopant 1606 (e.g., 1/centimeter$^2$).

Example profile 1608 of FIG. 16A may correspond to operation 1102, where an ion implantation tool (e.g., the ion implantation tool 114) performs an ion implantation operation using an implanting energy of approximately 1500 keV (or another implant energy) and an implanting dose of approximately $1\times10^{15}$ atoms per cubic centimeter (or another implanting dose). The peak of example profile 1608 may correspond to a depth of approximately 1.5 microns (e.g., the depth D6 of FIG. 11A). In some implementations, forming the example profile 1608 excludes the annealing tool performing an annealing operation.

Example profile 1610 of FIG. 16A may correspond to operation 1104, where an annealing tool (e.g., the annealing tool 116) performs a combination of annealing operations. For example, the combination of annealing operations corresponding to example profile 1610 may include a first annealing operation performed at approximately 800° C. (or another temperature) for a duration of approximately 2 hours (or another duration). The combination of annealing operations corresponding to the example profile may include a second annealing performed at approximately 1097° C. (or another temperature) for a duration of approximately 55 seconds (or another duration).

Additionally, or alternatively, example profile 1612 of FIG. 16A may correspond to operation 1104, where the annealing tool performs a single annealing operation. For example, the single annealing operation corresponding to example profile 1612 may include a single annealing operation performed at approximately 1100° C. (or another temperature) for a duration of approximately 2 hours (or another duration).

Example 1614 of FIG. 16B shows example depth 1616 (e.g., a depth along the z-axis of the waveguide layer 408 in microns) versus implanting dose 1618 (e.g., atoms per cubic centimeter) profiles for different implanting energies. The data of example 1614 may include technology computer-aided design (TCAD) simulation data. In some implementations, the example depth 1616 versus implanting dose 1618 profiles of FIG. 16B may be applicable to one or more implanting operations (e.g., the implanting operations 1302-1306) as described in connection with FIG. 13.

Example profile 1620 may correspond to an implanting energy of approximately 800 keV (or another implanting energy). A peak depth of the example profile 1620 may correspond to approximately 1 um (or another depth), and correspond to an implanting dose of approximately $1.2\times10^{18}$ atoms per cubic centimeter (or another implanting dose).

Example profile 1622 may correspond to an implanting energy of approximately 1000 keV (or another implanting energy). A peak depth of the example profile 1622 may correspond to approximately 1.2 um (or another depth), and correspond to an implanting dose of approximately $1.0\times10^{18}$ atoms per cubic centimeter (or another implanting dose).

Example profile 1624 may correspond to an implanting energy of approximately 1500 keV (or another implanting energy). A peak depth of the example profile 1624 may correspond to approximately 1.7 um (or another depth), and correspond to an implanting dose of approximately $7.5\times10^{17}$ atoms per cubic centimeter (or another implanting dose).

Example profile 1626 may correspond to an implanting energy of approximately 2500 keV (or another implanting energy). A peak depth of the example profile 1626 may correspond to approximately 2.5 um (or another depth), and correspond to an implanting dose of approximately $5.2\times10^{17}$ atoms per cubic centimeter (or another implanting dose).

Example profile 1628 may correspond to an implanting energy of approximately 3000 keV (or another implanting energy). A peak depth of the example profile 1628 may correspond to approximately 2.8 um (or another depth), and correspond to an implanting dose of approximately $5.0\times10^{17}$ atoms per cubic centimeter (or another implanting dose).

Example profile 1630 may correspond to an implanting energy of approximately 4000 keV (or another implanting energy). A peak depth of the example profile 1630 may correspond 0107-0217 to approximately 2.8 um (or another depth), and correspond to an implanting dose of approximately $5.0\times10^{17}$ atoms per cubic centimeter (or another implanting dose).

Figure 16C:
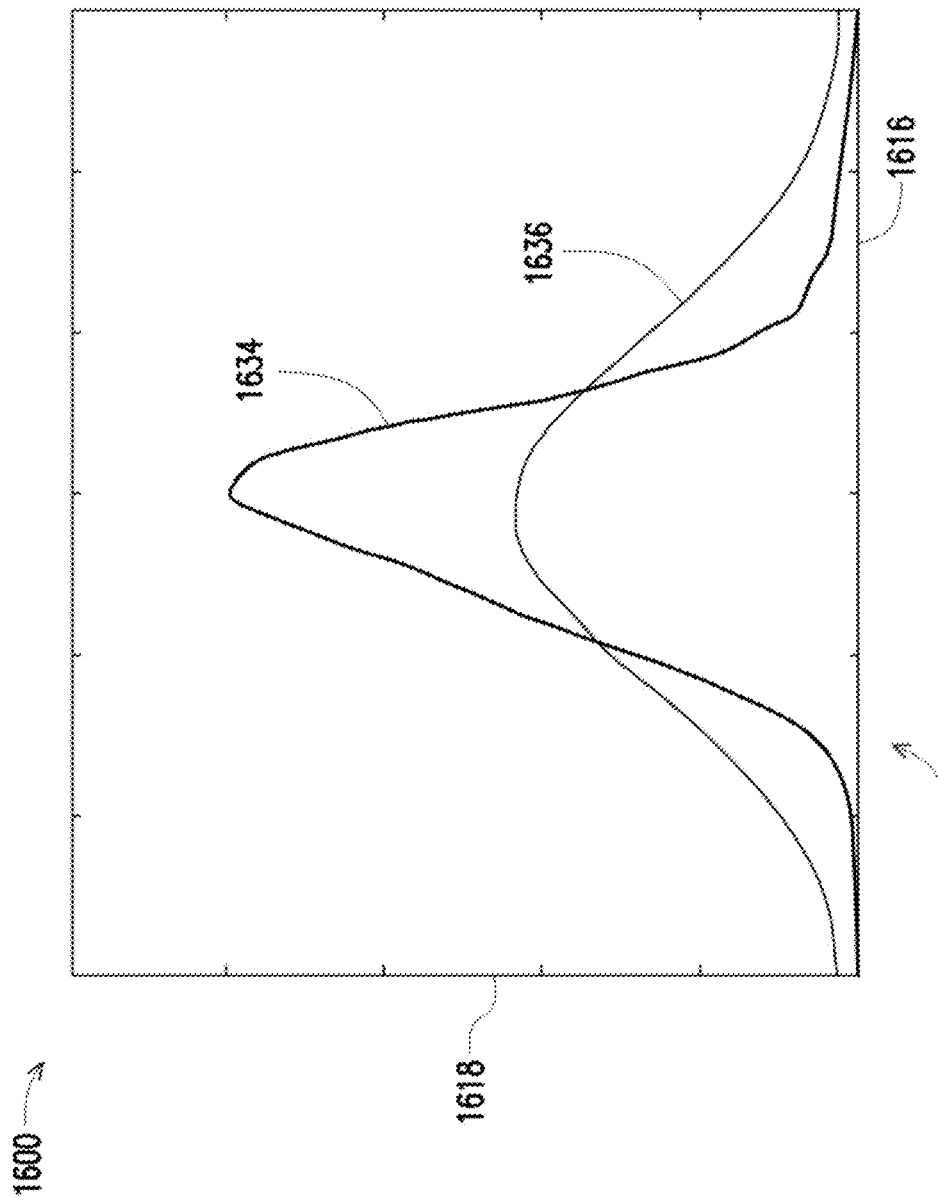

Example 1632 of FIG. 16C shows example depth 1616 versus implanting dose 1618 profiles for doping operations using a same implanting energy but different annealing parameters. The data of example 1632 may include technology computer-aided design (TCAD) simulation data. In some implementations, the example depth 1616 versus implanting dose 1618 profiles of FIG. 16C may be applicable to one or more implanting or annealing operations as described in connection with FIGS. 9A-13 and elsewhere herein.

Example profile 1634 may correspond to a combination of doping operations including a first implanting operation performed by the ion implantation tool using an implanting energy of approximately 1500 keV (or another implanting energy). The combination of doping operations corresponding to profile 1634 includes a second implanting operation performed by the ion implantation tool using an implanting energy of approximately 1000 keV (or another implanting energy). In some implementations, forming the example profile 1634 excludes the annealing tool performing an annealing operation. A peak depth of the example profile 1634 may correspond to approximately 1.5 um (or another depth), and correspond to an implanting dose of approximately $2.0 \times 10^{18}$ atoms per cubic centimeter (or another implanting dose).

Example profile 1636 may correspond to a combination of doping operations including a first implanting operation performed by the ion implantation tool using an implanting energy of approximately 1500 keV (or another implanting energy). The combination of doping operations corresponding to profile 1636 includes a second implanting operation performed by the ion implantation tool using an implanting energy of approximately 1000 keV (or another implanting energy). A peak depth of the example profile 1636 may correspond to approximately 1.5 um (or another depth), and correspond to an implanting dose of approximately $2.0 \times 10^{18}$ atoms per cubic centimeter (or another implanting dose). In some implementations, forming the example profile 1636 includes the annealing tool performing an annealing operation after the second annealing operation. For example, the annealing tool may perform the annealing operation at approximately 1100° C. (or another temperature) for a duration of approximately 2 hours (or another duration). A peak depth of the example profile 1636 may correspond to approximately 1.5 um (or another depth), and correspond to an implanting dose of approximately $1.0 \times 10^{18}$ atoms per cubic centimeter (or another implanting dose).

Figure 16D:
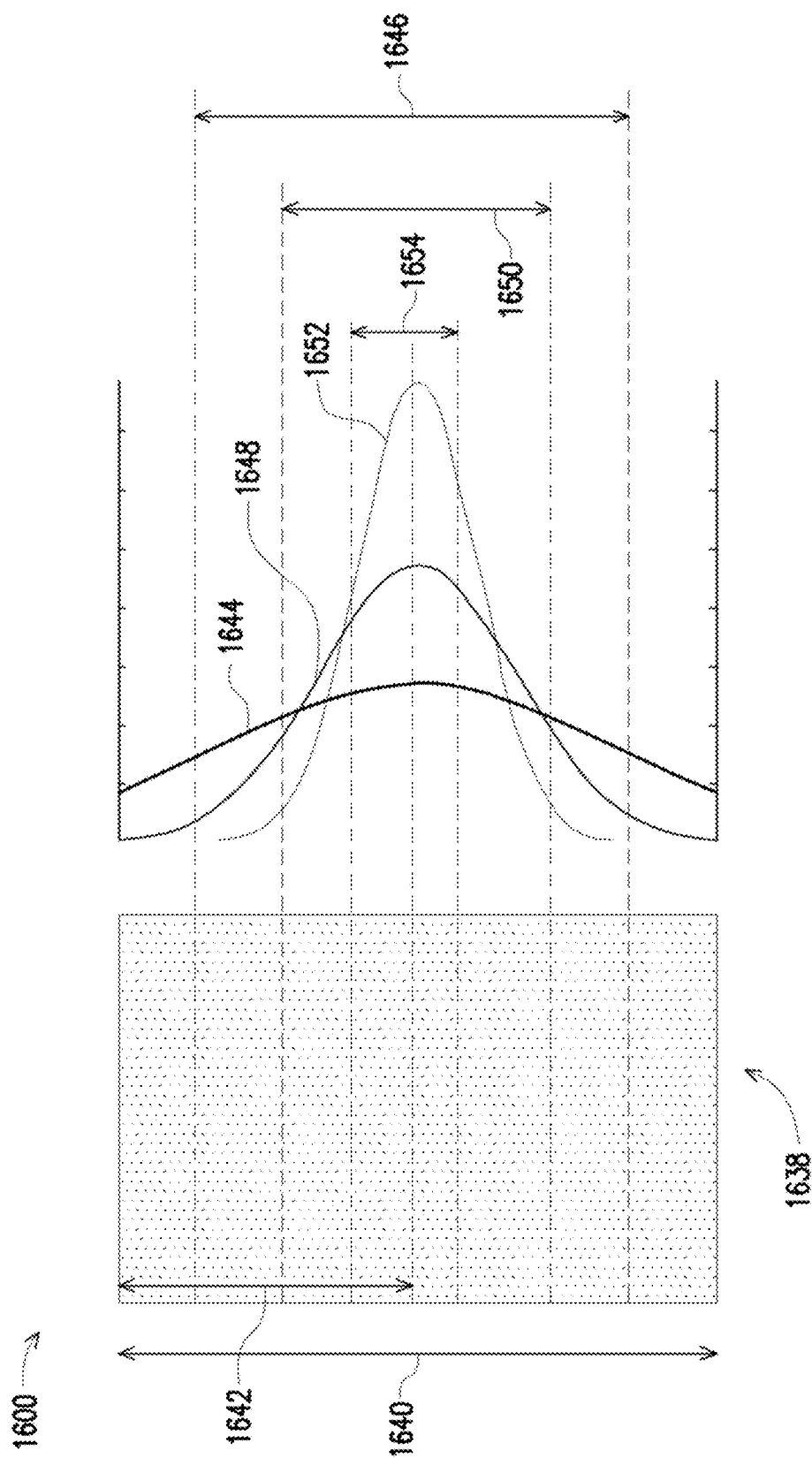

Example 1638 of FIG. 16D shows example simulation data corresponding to gaussian shapes (e.g., distributions) that may be achieved using one or more techniques described in connection with FIGS. 9A-12D. For a waveguide layer (e.g., the waveguide layer 408) having a thickness 1640, the example gaussian shapes of FIG. 16D may peak at depth 1642 corresponding to approximately one-half the thickness 1640 (or another depth) of the waveguide layer.

Example gaussian shape 1644 may correspond to a distribution having a standard deviation of approximately 0.3 (e.g., $\sigma \sim 0.3$). For the example gaussian shape 1644, approximately 68.3% of an implanting dose (e.g., an implanting dose in atoms per cubic centimeter) may peak at the depth 1642 and be distributed within a band 1646 corresponding to approximately two-thirds of the thickness 1640.

Example gaussian shape 1648 may correspond to a distribution having a standard deviation of approximately 0.5 (e.g., $\sigma \sim 0.5$). For the example gaussian shape 1648, approximately 68.3% of an implanting dose (e.g., an implanting dose in atoms per cubic centimeter) may peak at the depth 1642 and be distributed within a band 1650 corresponding to approximately one-third of the thickness 1640.

Example gaussian shape 1652 may correspond to a distribution having a standard deviation of approximately 1.0 (e.g., $\sigma \sim 1.0$). For the example gaussian shape 1652, approximately 68.3% of an implanting dose (e.g., an implanting dose in atoms per cubic centimeter) may peak at the depth 1642 and be distributed within a band 1654 corresponding to approximately one-fifth of the thickness 1640.

As indicated above, FIGS. 16A-16D are provided as one or more examples. Other examples may differ from what is described with regards to FIGS. 16A-16D. Accordingly, the such examples may include different energies, implanting doses, annealing temperatures, durations, or profiles than those described in FIGS. 16A-16D and are within the scope of the present disclosure.

Figure 17A:
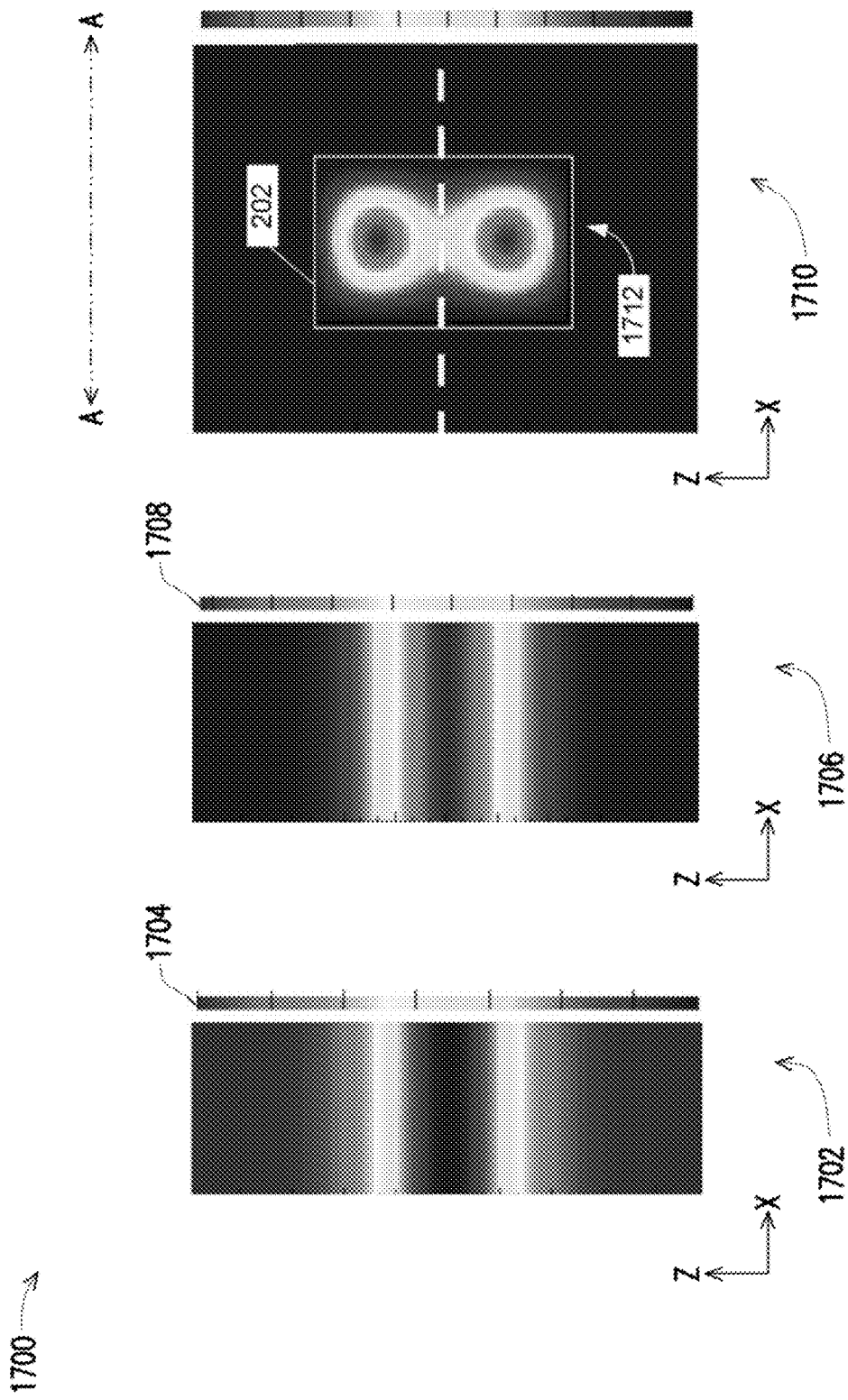
Figure 17B:
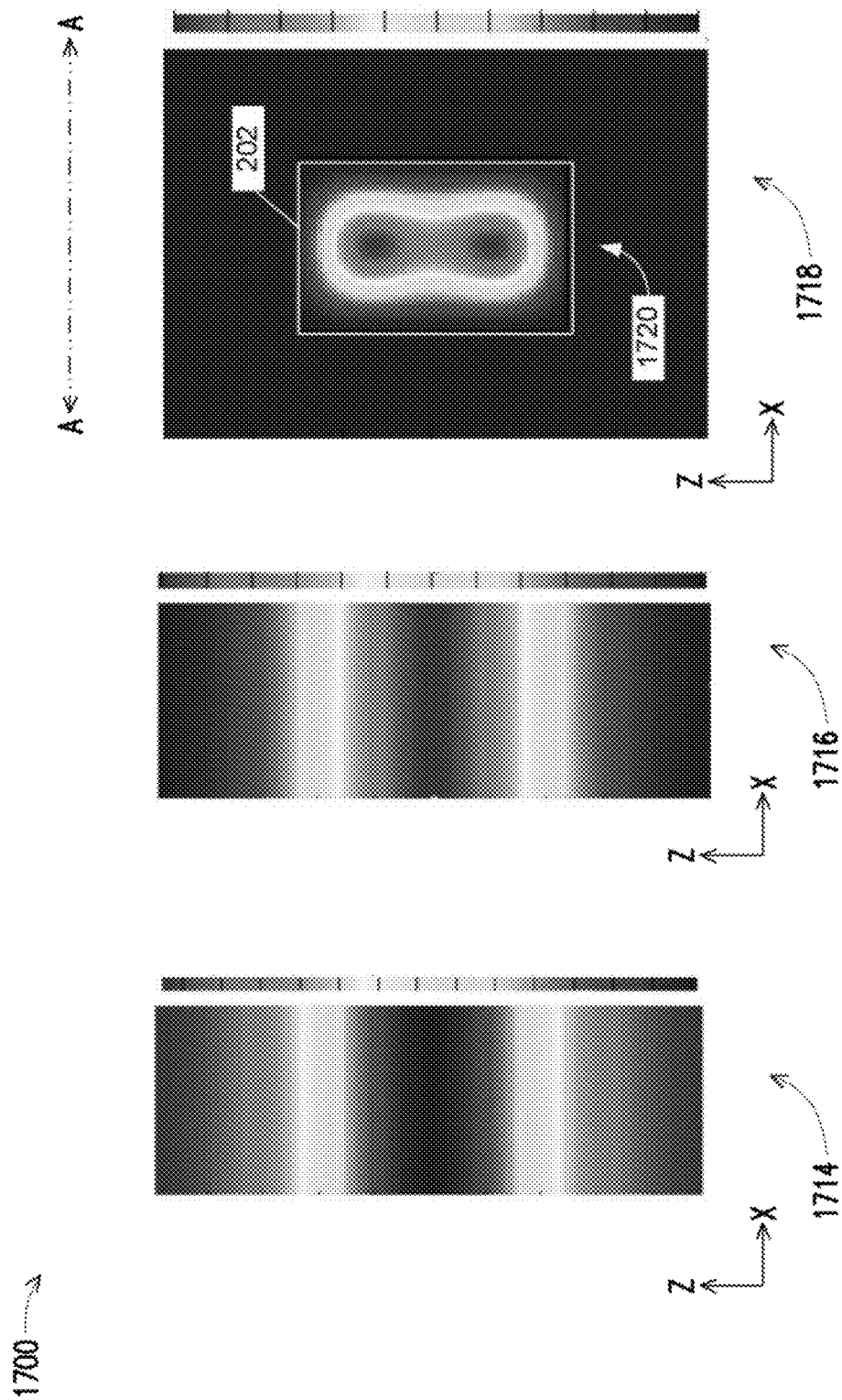
Figure 17C:
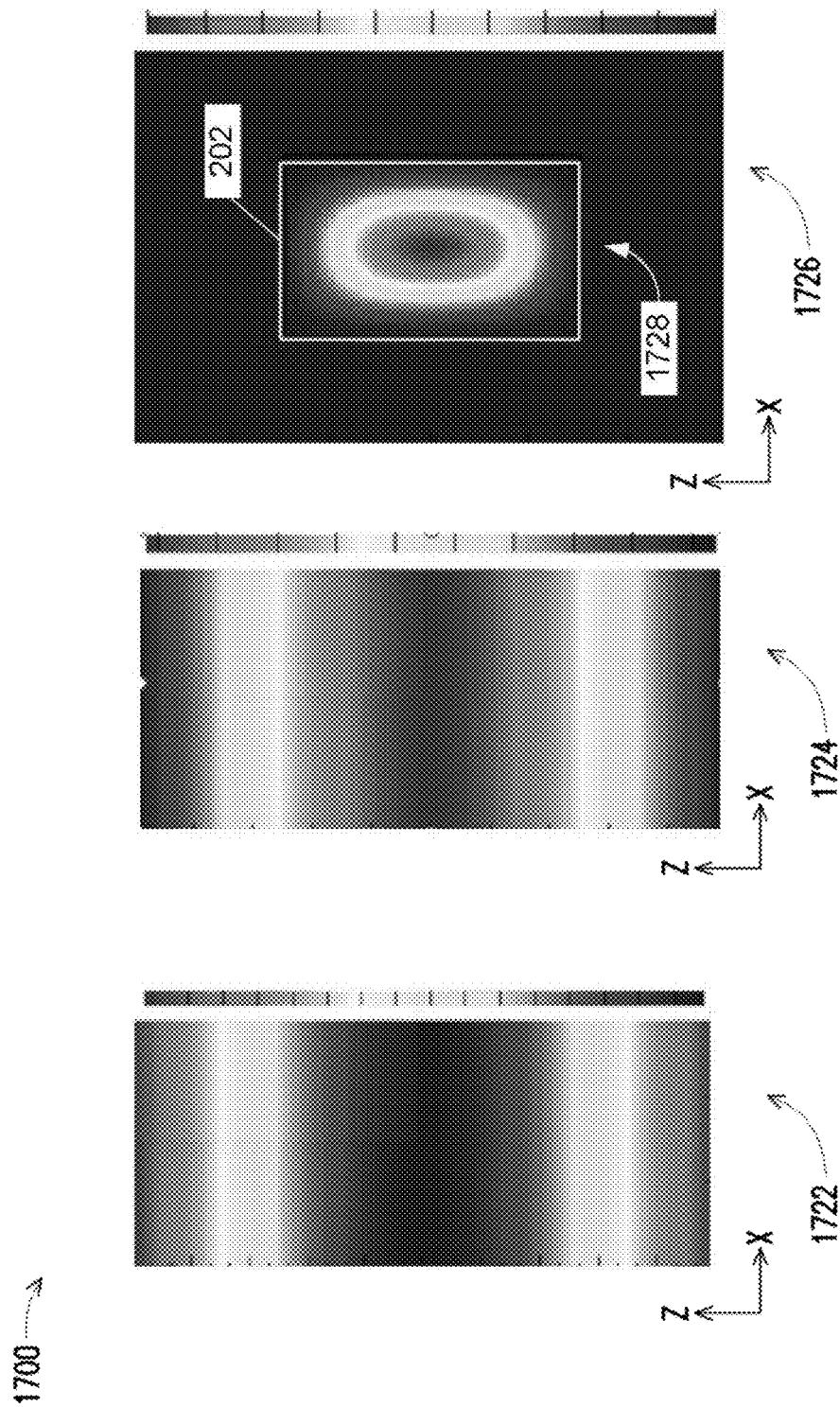

FIGS. 17A-17C are diagrams of example data 1700 described herein. FIGS. 17A-17C may include data corresponding to one or more doping operations as described in connection with FIGS. 9A-13 and elsewhere herein. The example data 1700 includes examples of secondary ion mass spectrometry (SIMS) data for a fixed implanting dose (e.g., a fixed implanting dose in atoms per cubic centimeter) that is redistributed to a gaussian shape. In some implementations, an ion implantation tool (e.g., the ion implantation tool 114) may provide the fixed implanting dose to a waveguide (e.g., the waveguide structure 202) and an annealing tool (e.g., the annealing tool 116) may redistribute the fixed implanting dose to a gaussian shape as described in connection with FIGS. 9A-12D and elsewhere herein.

FIG. 17A includes an example refractive index chart 1702 for a waveguide structure formed from a material (e.g., the waveguide structure 202 formed from silicon, among other examples). In some implementations described by FIG. 17A, a gaussian shape of a distribution of a dopant (e.g., the dopant 902) corresponds to the gaussian shape 1644 of FIG. 16D (e.g., a gaussian shape having a standard deviation ($\sigma$) of approximately 0.3).

As shown in the refractive index chart 1702, a refractive index 1704 (e.g., corresponding to the optical constant "n", a dimensionless ratio of a velocity of the electromagnetic waves 206 in a vacuum to a velocity of the electromagnetic waves 206 in a material of waveguide structure 202) may vary based on horizontal and vertical locations within a material used to form the waveguide structure 202.

FIG. 17A further includes an example absorption chart 1706 (e.g., corresponding to the optical constant "k", an extinction coefficient 1708 that measures a rate of transmitted light via scattering and absorption for the material of the waveguide structure 202 in $molar^{-1}$ $centimeter^{-1}$). As shown in the absorption chart 1706, absorption may vary based on horizontal and vertical locations within a material used to form the waveguide structure 202.

Example 1710 of FIG. 17A shows a cross-sectional view A-A of the waveguide structure 202 including an optical mode field 1712. For example 1710, a dopant (e.g., the dopant 902 in the waveguide structure 202 having a distribution corresponding to the gaussian shape 1644, among other examples) may induce a loss of approximately 63.8 dB/mm to the waveguide structure 202.

FIG. 17B includes an example refractive index chart 1714 for a waveguide structure formed from a material (e.g., the waveguide structure 202 formed from silicon, among other examples). In some implementations described by FIG. 17B, a gaussian shape of a distribution of a dopant (e.g., the dopant 902) corresponds to the gaussian shape 1648 of FIG. 16D (e.g., a gaussian shape having a standard deviation ($\sigma$) of approximately 0.5).

As shown in the refractive index chart 1714, a refractive index may vary based on horizontal and vertical locations within a material used to form the waveguide structure 202. Additionally, or alternatively and as shown by example absorption chart 1716, absorption may vary based on horizontal and vertical locations within a material used to form the waveguide structure 202.

Example 1718 of FIG. 17B shows a cross-sectional view A-A of the waveguide structure 202 including an optical mode field 1720. For example 1718, a dopant (e.g., the dopant 902 in the waveguide structure 202 having a distribution corresponding to the gaussian shape 1648, among other examples) may induce a loss of approximately 87.5 dB/mm to the waveguide structure 202.

FIG. 17C includes an example refractive index chart 1722 for a waveguide structure formed from a material (e.g., the waveguide structure 202 formed from silicon, among other examples). In some implementations described by FIG. 17B, a gaussian shape of a distribution of a dopant (e.g., the dopant 902) corresponds to the gaussian shape 1652 of FIG. 16D (e.g., a gaussian shape having a standard deviation (σ) of approximately 1.0).

As shown in the refractive index chart 1722, a refractive index may vary based on horizontal and vertical locations within a material used to form the waveguide structure 202. Additionally, or alternatively and as shown by example absorption chart 1724, absorption may vary based on horizontal and vertical locations within a material used to form the waveguide structure 202.

Example 1726 of FIG. 17C a cross-sectional view A-A of the waveguide structure 202 including an optical mode field 1728. For example 1726, a dopant (e.g., the dopant 902 in the waveguide structure 202 having a distribution corresponding to the gaussian shape 1652, among other examples) may induce a loss of approximately 84.6 dB/mm to the waveguide structure.

As indicated above, FIGS. 17A-17C are provided as examples. Other examples may differ from what is described with regard to FIGS. 17A-17C. Accordingly, such other examples may include different refractive index properties, different absorption properties, or different gaussian shapes than those described in FIGS. 17A-17C and are within the scope of the present disclosure.

Figure 18A:
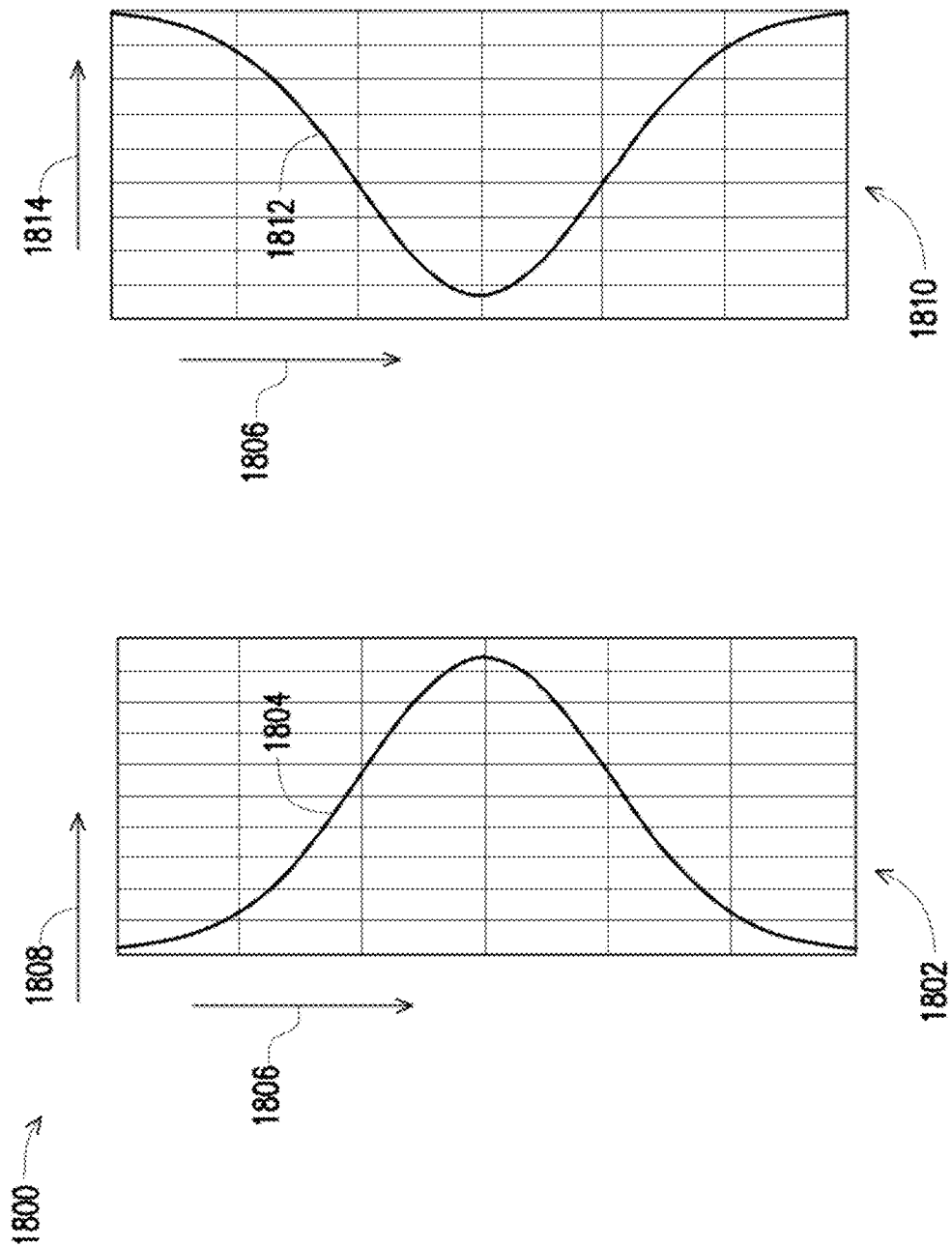
Figure 18B:
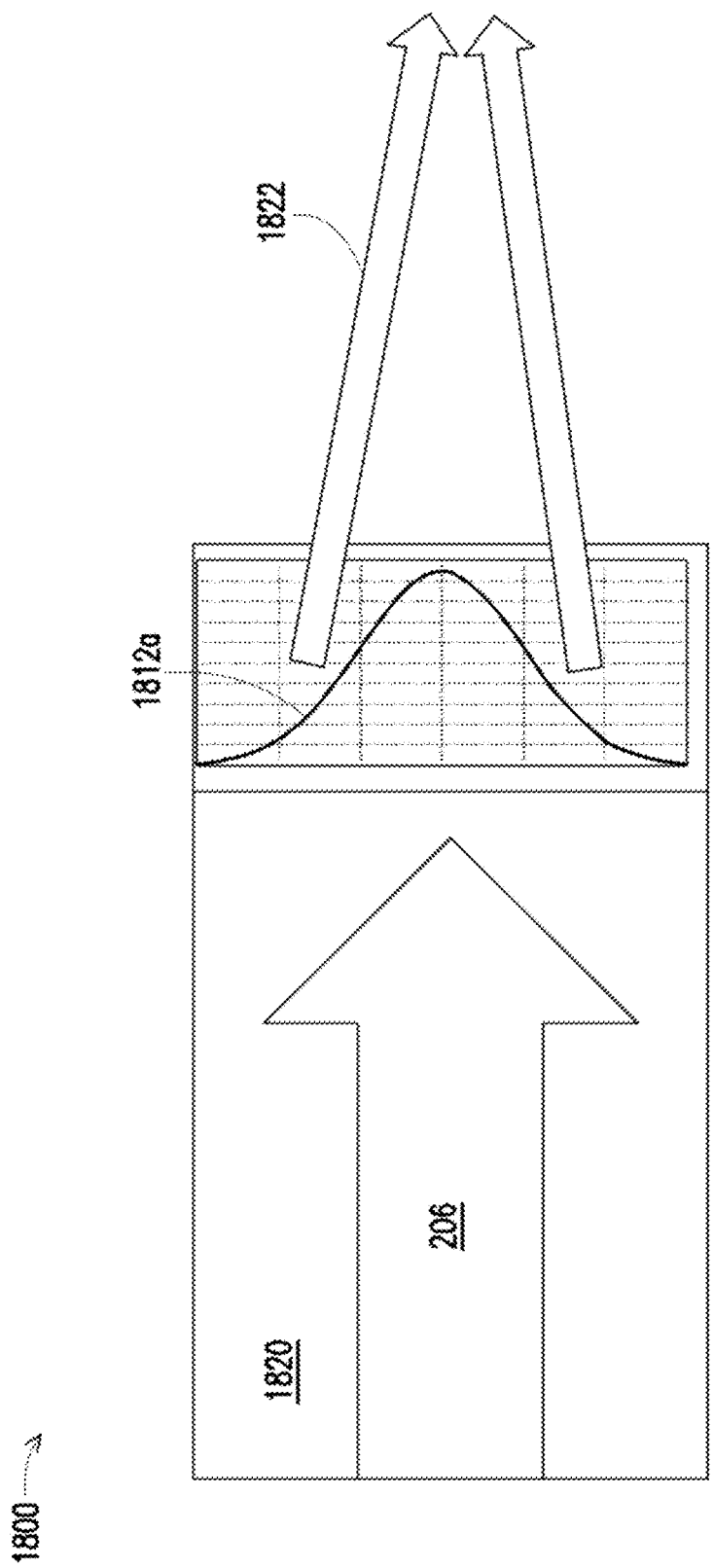
Figure 18C:
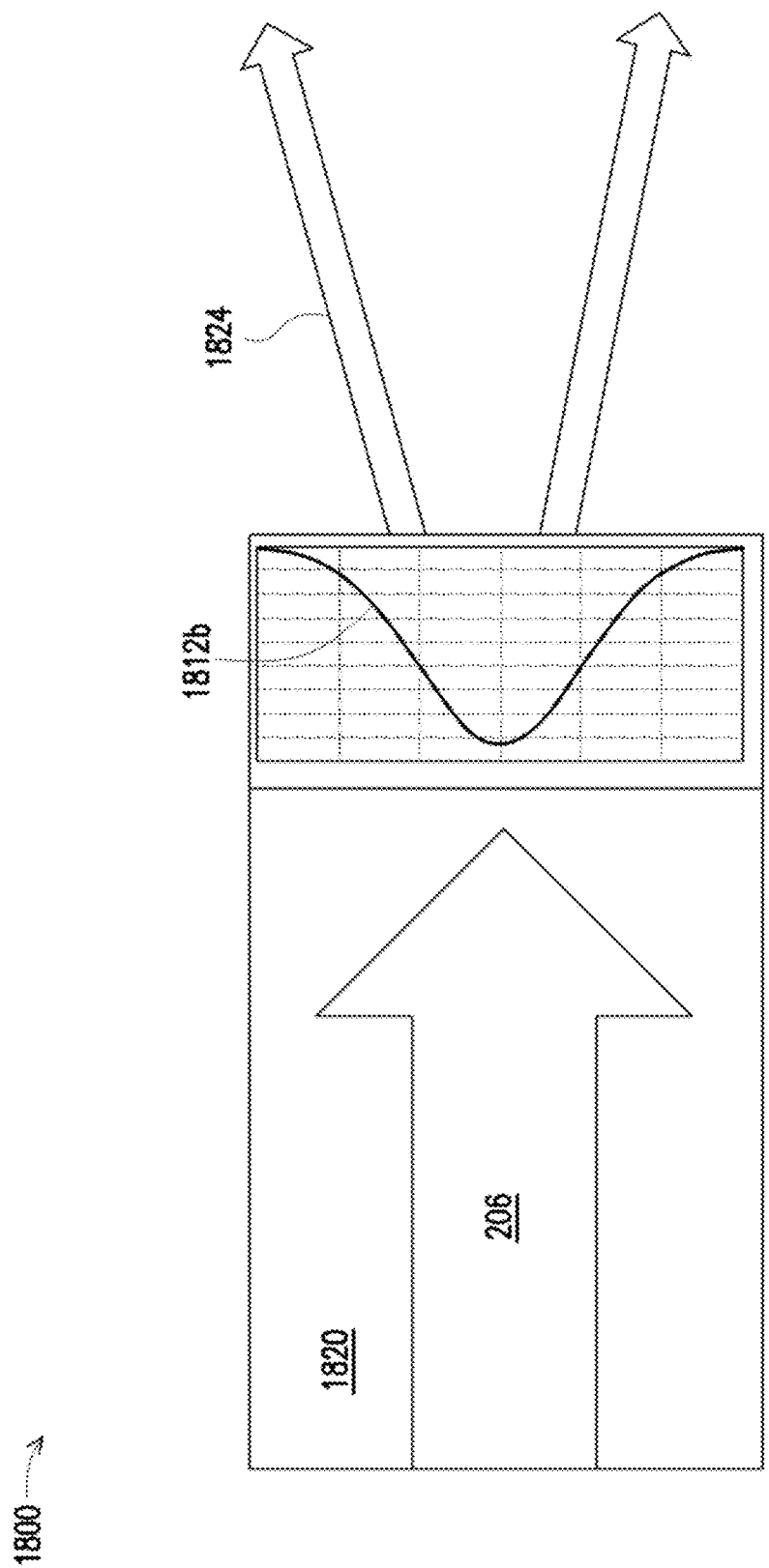

FIGS. 18A-18C are diagrams of example data 1800 described herein. The example data 1800 may be related to gaussian profiles associated with a dopant (e.g., the dopant 902) implanted in a photonics structure (e.g., the photonics structure 200) as described in connection with FIGS. 9A-12D and elsewhere herein.

The example data 1800 of FIG. 18A includes an example 1802 showing an example gaussian shape 1804. The gaussian shape 1804 may correspond to a distribution of a dopant (e.g., the dopant 902) in a photonics structure, where the distribution has a standard deviation of approximately 0.5 (e.g., σ~0.5). Example 1802 shows a relationship between a depth 1806 (e.g., in microns) the dopant and a concentration 1808 of the dopant (e.g., in atoms per cubic centimeter).

Example 1810 of FIG. 18A shows a gaussian shape 1812. The gaussian shape 1812 is approximately inverse to the gaussian shape 1804, and may correspond to a refractive index 1814 (e.g., a dimensionless ratio) to the depth 1806. As shown in examples 1802 and 1810, the refractive index 1814 and the concentration 1808 may have an approximately inverse relationship.

FIG. 18B shows an example application using the relationship between a refractive index and a concentration of a dopant (e.g., the refractive index 1814 and the concentration 1808 of the dopant 902) as described in FIG. 18A. FIG. 18B shows an edge coupler 1820 (e.g., a type of photonics structure) propagating the electromagnetic waves 206 (e.g., light). As shown in FIG. 18B, the gaussian shape 1812a (e.g., corresponding to a refractive index of the edge coupler 1820) induces a convergence effect 1822 on the electromagnetic waves 206. The gaussian shape 1812a may have a relationship that is approximately inverse to a concentration of a dopant (e.g., the dopant 902) in the edge coupler 1820. For example, the concentration of the dopant may be lower at a midpoint (e.g., middle depth) of the edge coupler 1820 relative to a concentration of the dopant at top and bottom surfaces of the edge coupler 1820. Forming the gaussian shape 1812a in the edge coupler 1820 may increase a beam pointing characteristic or a coupling efficiency of the edge coupler 1820.

FIG. 18C shows an example application using the relationship between a refractive index and a concentration of a dopant (e.g., the refractive index 1814 and the concentration 1808 of the dopant 902) as described in FIG. 18A. FIG. 18C shows the edge coupler 1820 (e.g., a type of photonics structure) propagating the electromagnetic waves 206 (e.g., light). As shown in FIG. 18C, the gaussian shape 1812b (e.g., corresponding to a refractive index of the edge coupler 1820) induces a divergence effect 1824 on the electromagnetic waves 206. The gaussian shape 1812b may have a relationship that is approximately inverse to a concentration of a dopant (e.g., the dopant 902) in the edge coupler 1820. For example, the concentration of the dopant may be higher at a midpoint (e.g., middle depth) of the edge coupler 1820 relative to a concentration of the dopant at top and bottom surfaces of the edge coupler 1820. Forming the gaussian shape 1812b in the edge coupler 1820 may be suitable for a sensing application (e.g., a sensing application detecting a large area) using the edge coupler 1820.

As indicated above, FIGS. 18A-18C are provided as examples. Other examples may differ from what is described with regard to FIGS. 18A-18C.

FIG. 19 is a diagram of example components of a device 1900, which may correspond to one or more of the semiconductor processing tools 102-116. In some implementations, the semiconductor processing tools 102-116 include one or more devices 1900 or one or more components of device 1900. As shown in FIG. 19, device 1900 may include a bus 1910, a processor 1920, a memory 1930, an input component 1940, an output component 1950, and a communication component 1960.

Bus 1910 includes one or more components that enable wired or wireless communication among the components of device 1900. Bus 1910 may couple together two or more components of FIG. 19, such as via operative coupling, communicative coupling, electronic coupling, or electric coupling. Processor 1920 includes a central processing unit, a graphics processing unit, a microprocessor, a controller, a microcontroller, a digital signal processor, a field-programmable gate array, an application-specific integrated circuit, or another type of processing component. Processor 1920 is implemented in hardware, firmware, or a combination of hardware and software. In some implementations, processor 1920 includes one or more processors capable of being programmed to perform one or more operations or processes described elsewhere herein.

Memory 1930 includes volatile or nonvolatile memory. For example, memory 1930 may include random access memory (RAM), read only memory (ROM), a hard disk drive, or another type of memory (e.g., a flash memory, a magnetic memory, or an optical memory). Memory 1930 may include internal memory (e.g., RAM, ROM, or a hard disk drive) or removable memory (e.g., removable via a universal serial bus connection). Memory 1930 may be a non-transitory computer-readable medium. Memory 1930 stores information, instructions, or software (e.g., one or more software applications) related to the operation of device 1900. In some implementations, memory 1930 includes one or more memories that are coupled to one or more processors (e.g., processor 1920), such as via bus 1910.

Input component 1940 enables device 1900 to receive input, such as user input or sensed input. For example, input component 1940 may include a touch screen, a keyboard, a keypad, a mouse, a button, a microphone, a switch, a sensor, a global positioning system sensor, an accelerometer, a gyroscope, or an actuator. Output component 1950 enables device 1900 to provide output, such as via a display, a speaker, or a light-emitting diode. Communication component 1960 enables device 1900 to communicate with other devices via a wired connection or a wireless connection. For example, communication component 1960 may include a receiver, a transmitter, a transceiver, a modem, a network interface card, or an antenna.

Device 1900 may perform one or more operations or processes described herein. For example, a non-transitory computer-readable medium (e.g., memory 1930) may store a set of instructions (e.g., one or more instructions or code) for execution by processor 1920. Processor 1920 may execute the set of instructions to perform one or more operations or processes described herein. In some implementations, execution of the set of instructions, by one or more processors 1920, causes the one or more processors 1920 or the device 1900 to perform one or more operations or processes described herein. In some implementations, hardwired circuitry is used instead of or in combination with the instructions to perform one or more operations or processes described herein. Additionally, or alternatively, processor 1920 may be configured to perform one or more operations or processes described herein. Thus, implementations described herein are not limited to any specific combination of hardware circuitry and software.

The number and arrangement of components shown in FIG. 19 are provided as an example. Device 1900 may include additional components, fewer components, different components, or differently arranged components than those shown in FIG. 19. Additionally, or alternatively, a set of components (e.g., one or more components) of device 1900 may perform one or more functions described as being performed by another set of components of device 1900.

Figure 20:
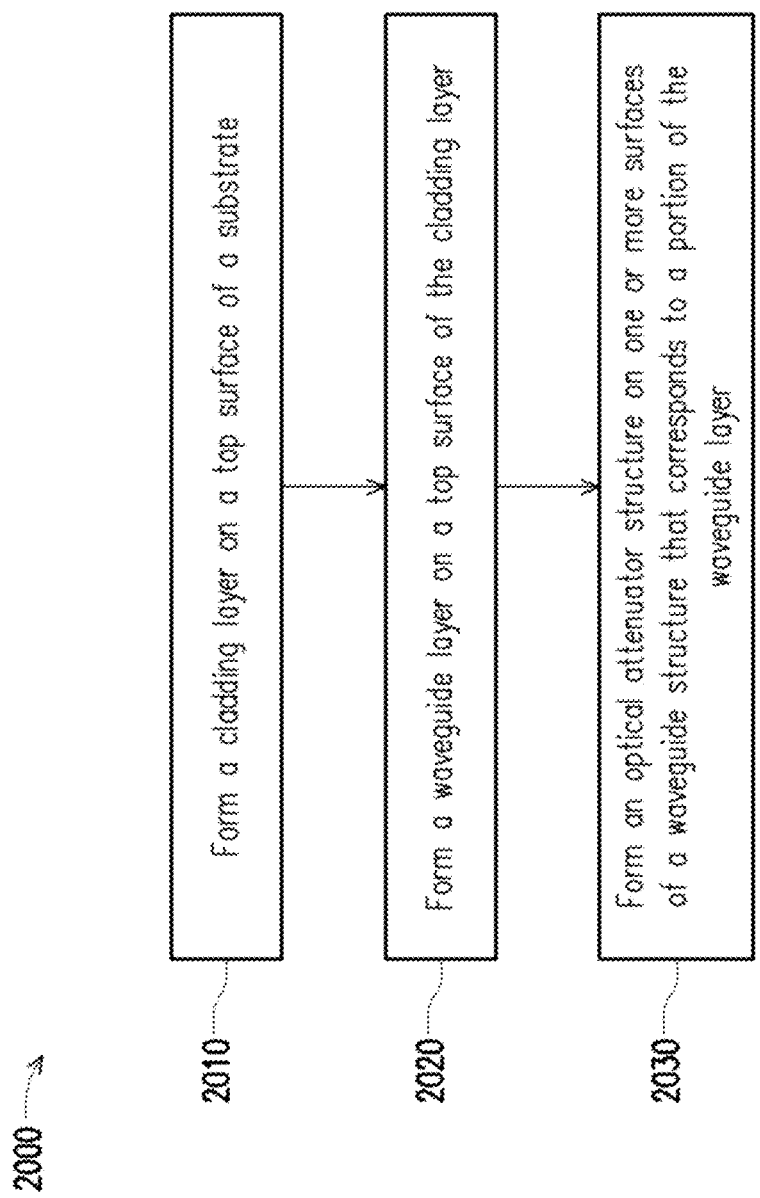
FIGS. 20 and 21 are flowcharts of example processes associated with forming a semiconductor device including the photonics structure described herein.

FIG. 20 is a flowchart of an example process 2000 associated with forming a semiconductor device including the photonics structure described herein. In some implementations, one or more process blocks of FIG. 20 are performed by one or more of the semiconductor processing tools 102-116. Additionally, or alternatively, one or more process blocks of FIG. 20 may be performed by one or more components of device 1900, such as processor 1920, memory 1930, input component 1940, output component 1950, or communication component 1960.

As shown in FIG. 20, process 2000 may include forming a cladding layer on a top surface of a substrate (block 2010). For example, a combination of one or more of the semiconductor processing tools 102-116, such as the deposition tool 102, among other examples, may perform a series of operations to form a cladding layer 406*a* on a top surface of a substrate 404, as described above.

As further shown in FIG. 20, process 2000 may include forming a waveguide layer on a top surface of the cladding layer (block 2020). For example, the one or more of the semiconductor processing tools 102-116, such as the deposition tool 102, may form a waveguide layer 408 on a top surface of the cladding layer 406*a*, as described above.

As further shown in FIG. 20, process 2000 may include forming an optical attenuator structure on one or more surfaces of a waveguide structure that corresponds to a portion of the waveguide layer (block 2030). For example, a combination of one or more of the semiconductor processing tools 102-116, such as the deposition tool 102, the exposure tool 104, the developer tool 106, or the etch tool 108, among other examples, may perform a series operations to form an optical attenuator structure 204 on one or more surfaces (e.g., one or more of the surfaces 212*a*-212*c*) of a waveguide structure 202 that corresponds to a portion of the waveguide layer 408, as described above.

Process 2000 may include additional implementations, such as any single implementation or any combination of implementations described below or in connection with one or more other processes described elsewhere herein.

In a first implementation, process 2000 includes removing portions of the waveguide layer 408 to form the waveguide structure 202 prior to forming the optical attenuator structure 204.

In a second implementation, alone or in combination with the first implementation, forming the optical attenuator structure 204 on the one or more surfaces of the waveguide structure 202 includes forming an optical attenuator layer 412 on a top surface (e.g., the sidewall 212*a*) of the waveguide layer 408, and removing portions of the optical attenuator layer 412.

In a third implementation, alone or in combination with one or more of the first and second implementations, removing the portions of the optical attenuator layer 412 includes removing portions of the optical attenuator layer 412 that are on a top surface of the cladding layer 406*a*.

In a fourth implementation, alone or in combination with one or more of the first through third implementations, removing the portions of the optical attenuator layer 412 includes removing portions of the optical attenuator layer 412 that are on a top surface (e.g., the sidewall 212*a*) of the waveguide structure 202.

In a fifth implementation, alone or in combination with one or more of the first through fourth implementations, forming the cladding layer 406*a* on the top surface of the substrate 404 corresponds to forming a first cladding layer 406*a* on the top surface of the substrate and further includes forming a second cladding layer 406*b* on the attenuator structure 204.

Although FIG. 20 shows example blocks of process 2000, in some implementations, process 2000 includes additional blocks, fewer blocks, different blocks, or differently arranged blocks than those depicted in FIG. 20. Additionally, or alternatively, two or more of the blocks of process 2000 may be performed in parallel.

Figure 21:
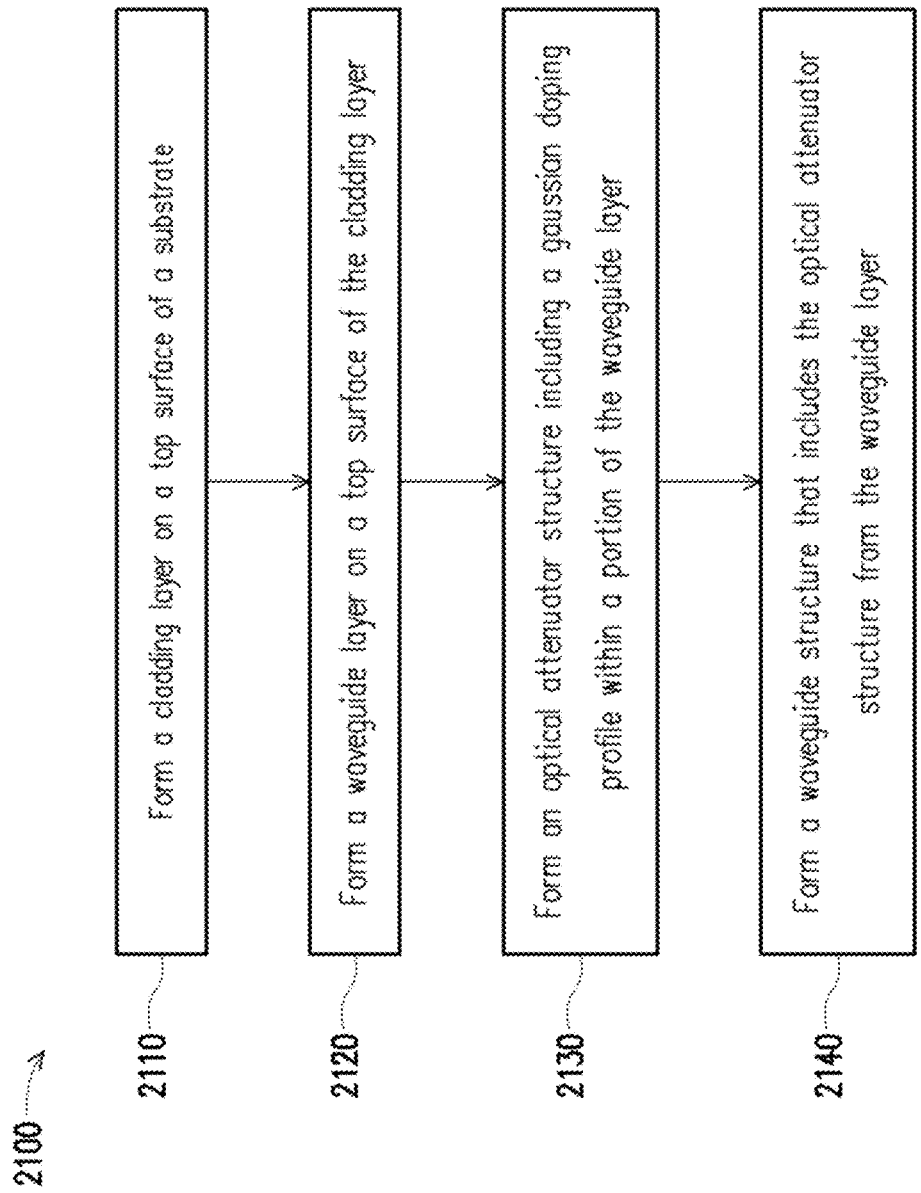

FIG. 21 is a flowchart of an example process 2100 associated with forming a semiconductor device including the photonics structure described herein. In some implementations, one or more process blocks of FIG. 20 are performed by one or more of the semiconductor processing tools 102-116. Additionally, or alternatively, one or more process blocks of FIG. 20 may be performed by one or more components of device 1900, such as processor 1920, memory 1930, input component 1940, output component 1950, or communication component 1960.

As shown in FIG. 21, process 2100 may include forming a cladding layer on a top surface of a substrate (block 2110). For example, a combination of one or more of the semiconductor processing tools 102-116, such as the deposition tool 102, among other examples, may perform a series of operations 1002 to form a cladding layer 406*a* on a top surface of a substrate 404, as described above.

As further shown in FIG. 21, process 2100 may include forming a waveguide layer on a top surface of the cladding layer (block 2120). For example, a combination of one or more of the semiconductor processing tools 102-116, such as the deposition tool 102, among other examples, may perform a series of operations to form a waveguide layer 408 on a top surface of the cladding layer 406a, as described above.

As further shown in FIG. 21, process 2100 may include forming an optical attenuator structure including a gaussian doping profile within a portion of the waveguide layer (block 2130). For example, a combination of one or more of the semiconductor processing tools 102-116, such as such as the deposition tool 102, the exposure tool 104, the developer tool 106, the etch tool 108, or the, or the annealing tool 116, among other examples, may perform a series of operations to form an optical attenuator structure 204 including a gaussian doping profile 904 within a portion of the waveguide layer 408, as described above.

As further shown in FIG. 21, process 2100 may include forming a waveguide structure that includes the optical attenuator structure from the waveguide layer (block 2140). For example, a combination of or more of the semiconductor processing tools 102-116, such as the deposition tool 102, the exposure tool 104, the developer tool 106, or the etch tool 108, among other examples, may perform a series of operations to form a waveguide structure 202 that includes the optical attenuator structure 204 from the waveguide layer 408, as described above.

Process 2100 may include additional implementations, such as any single implementation or any combination of implementations described below or in connection with one or more other processes described elsewhere herein.

In a first implementation, forming the optical attenuator structure 204 including the gaussian doping profile 904 includes performing an implanting operation that includes implanting an n-type dopant and includes implanting a p-type dopant.

In a second implementation, alone or in combination with the first implementation, forming the optical attenuator structure 204 including the gaussian doping profile 904 includes performing a first implanting operation using a first recipe including a first energy and a first dose, and performing a second implanting operation using a second recipe including a second energy and a second dose. In some implementations, the second energy is greater relative to the first energy. In some implementations, the second dose is greater relative to the first dose.

In a third implementation, alone or in combination with one or more of the first and second implementations, forming the optical attenuator structure 204 including the gaussian doping profile 904 within the portion of the waveguide layer 408 includes performing an annealing operation.

In a fourth implementation, alone or in combination with one or more of the first through third implementations, forming the waveguide layer 408 on the top surface of the cladding layer 406a includes performing a first epitaxial growth operation to form a first sublayer 408a of the waveguide layer 408, and performing a second epitaxial growth operation to form a second sublayer 408b of the waveguide layer 408.

In a fifth implementation, alone or in combination with one or more of the first through fourth implementations, forming the optical attenuator structure 204 includes performing, after the first epitaxial growth operation, an implanting operation, and performing, after the second epitaxial growth operation, an annealing operation.

Although FIG. 21 shows example blocks of process 2100, in some implementations, process 2100 includes additional blocks, fewer blocks, different blocks, or differently arranged blocks than those depicted in FIG. 21. Additionally, or alternatively, two or more of the blocks of process 2100 may be performed in parallel.

Some implementations described herein include a PIC device including a photonics structure. The photonics structure includes a waveguide structure and an optical attenuator structure. In some implementation, the optical attenuator structure is formed on an end region of the waveguide structure and includes a metal material or a doped material. In some implementations, the optical attenuator structure includes a gaussian doping profile within a portion of the waveguide structure. The optical attenuator structure may absorb electromagnetic waves at the end of the waveguide structure with an efficiency that is improved relative to a spiral optical attenuator structure or metal cap optical attenuator structure.

By efficiently absorbing the electromagnetic waves at the end of the waveguide structure, a likelihood of a reflection of electromagnetic waves may be reduced relative to a photonics structure including a spiral optical attenuator structure or a metal cap optical attenuator structure. In this way, noise or distortion within the PIC device may be reduced to improve a performance of the PIC device.

As described in greater detail above, some implementations described herein provide a photonics structure. The photonics structure includes a waveguide structure including a plurality of sidewalls and an end surface. In some implementations, the waveguide structure is configured to propagate an electromagnetic wave along an approximately linear path between the plurality of sidewalls towards the end surface. In some implementations, the end surface is oriented approximately orthogonal to the approximately linear path. The photonics structure includes an optical attenuator structure on one or more of the plurality of sidewalls near the end surface, where a length of the optical attenuator structure corresponds to a portion of a length of the waveguide structure.

As described in greater detail above, some implementations described herein provide a method. The method includes forming a cladding layer on a top surface of a substrate. The method includes forming a waveguide layer on a top surface of the cladding layer. The method includes forming an optical attenuator structure on one or more surfaces of a waveguide structure that corresponds to a portion of the waveguide layer.

As described in greater detail above, some implementations described herein provide a method. The method includes forming a cladding layer on a top surface of a substrate. The method includes forming a waveguide layer on a top surface of the cladding layer. The method includes forming an optical attenuator structure including a gaussian doping profile within a portion of the waveguide layer. The method includes forming a waveguide structure that includes the optical attenuator structure from the waveguide layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A photonics structure, comprising:
   a substrate;
   a cladding layer on a top surface of the substrate;
   a waveguide structure, on a top surface of the cladding layer, comprising:
      a plurality of sidewalls, and
      an end surface,
         wherein the waveguide structure is configured to propagate an electromagnetic wave along an approximately linear path between the plurality of sidewalls towards the end surface, and
         wherein the end surface is oriented approximately orthogonal to the approximately linear path; and
   an optical attenuator structure comprising portions directly on surfaces of opposing sidewalls of the plurality of sidewalls near the end surface,
      wherein a length of the optical attenuator structure corresponds to a portion of a length of the waveguide structure,
      wherein an optical attenuator material is excluded from sidewalls, of the plurality of sidewalls, other than the opposing sidewalls,
      wherein the optical attenuator structure comprises a doped material, and
      wherein the doped material comprises a polysilicon material, a germanium material, or a silicon material.

2. The photonics structure of claim 1, wherein the optical attenuator structure comprises:
   a metal material.

3. The photonics structure of claim 2, wherein the metal material comprises:
   an aluminum material, a copper material, a salicide material, or a tungsten material.

4. A method, comprising:
   forming a cladding layer on a top surface of a substrate;
   forming a waveguide layer on a top surface of the cladding layer; and
   forming an optical attenuator structure directly on surfaces of opposing sidewalls of a waveguide structure that corresponds to a portion of the waveguide layer,
      wherein forming the optical attenuator structure comprises:
         forming an optical attenuator layer on a top surface of the waveguide layer, and
         removing portions of the optical attenuator layer,
            wherein an optical attenuator material is removed from a sidewall, of the waveguide structure, other than the opposing sidewalls to form the optical attenuator structure.

5. The method of claim 4, further comprising:
   removing portions of the waveguide layer to form the waveguide structure prior to forming the optical attenuator structure.

6. The method of claim 4, wherein removing the portions of the optical attenuator layer comprises:
   removing portions of the optical attenuator layer that are on the top surface of the cladding layer.

7. The method of claim 4, wherein removing the portions of the optical attenuator layer comprises:
   removing portions of the optical attenuator layer that are on the top surface of the waveguide structure.

8. The method of claim 4, wherein forming the cladding layer on the top surface of the substrate corresponds to forming a first cladding layer on the top surface of the substrate; and
   wherein the method further comprises:
      forming a second cladding layer on the optical attenuator structure.

9. A photonics structure, comprising:
   a substrate;
   a cladding layer on a top surface of the substrate;
   a waveguide layer on a top surface of the cladding layer; and
   an optical attenuator structure, including a Gaussian doping profile, on one or more surfaces of a waveguide structure that corresponds to a portion of the waveguide layer,
      wherein the optical attenuator structure including the Gaussian doping profile comprises:
         a first dose of a dopant at a first depth; and
         a second dose of the dopant at a second depth,
            wherein the second dose is greater relative to the first dose.

10. The photonics structure of claim 9, wherein the optical attenuator structure including the Gaussian doping profile comprises:
    an n-type dopant and a p-type dopant.

11. The photonics structure of claim 9, wherein the optical attenuator structure including the Gaussian doping profile further comprises:
    a third dose of the dopant at a third depth.

12. The photonics structure of claim 9, wherein the waveguide layer comprises:
    a first sublayer of the waveguide layer, and
    a second sublayer of the waveguide layer.

13. The photonics structure of claim 12, wherein the optical attenuator structure comprises the Gaussian doping profile across the first sublayer and the second sublayer.

14. The photonics structure of claim 1, wherein the optical attenuator structure comprises:
    a first substructure including a layer of an oxide material; and
    a second substructure including a layer of a doped polysilicon material.

15. The photonics structure of claim 14, wherein a thickness of the first substructure is in a range of 90 angstroms to 110 angstroms; and
    wherein a thickness of the second substructure is in a range of up to 10,000 angstroms.

16. The photonics structure of claim 1, wherein a thickness of the waveguide structure is in a range of 2.7 microns to 3.3 microns.

17. The photonics structure of claim 1, wherein the doped material is doped with a phosphorus dopant, an arsenic dopant, or a boron dopant.

18. The photonics structure of claim 1, wherein the doped material is doped with a dopant corresponding to a combination of a p-type dopant and an n-type dopant.

19. The method of claim 4, further comprising:
    forming a photoresist pattern on the optical attenuator layer,
       wherein the portions of the optical attenuator layer are removed based on the photoresist pattern.

20. The photonics structure of claim 9, wherein the optical attenuator structure comprises a low-absorption region and a high-absorption region.

* * * * *